United States Patent
Tsai et al.

(10) Patent No.: US 12,432,033 B2
(45) Date of Patent: Sep. 30, 2025

(54) USER EQUIPMENT AND METHOD FOR TIMING ALIGNMENT

(71) Applicant: SHARP KABUSHIKI KAISHA, Sakai (JP)

(72) Inventors: Hsin-Hsi Tsai, Taipei (TW); Mei-Ju Shih, Taipei (TW); Heng-Li Chin, Taipei (TW); Yung-Lan Tseng, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 499 days.

(21) Appl. No.: 17/870,243

(22) Filed: Jul. 21, 2022

(65) Prior Publication Data

US 2023/0044028 A1 Feb. 9, 2023

Related U.S. Application Data

(60) Provisional application No. 63/225,382, filed on Jul. 23, 2021.

(51) Int. Cl.
H04L 5/00 (2006.01)
H04W 74/00 (2009.01)
H04W 74/0833 (2024.01)

(52) U.S. Cl.
CPC ......... *H04L 5/0051* (2013.01); *H04W 74/006* (2013.01); *H04W 74/0833* (2013.01)

(58) Field of Classification Search
None
See application file for complete search history.

(56) References Cited

U.S. PATENT DOCUMENTS

| | | | |
|---|---|---|---|
| 2009/0232107 A1 | 9/2009 | Park et al. | |
| 2011/0038361 A1 | 2/2011 | Park et al. | |
| 2015/0215885 A1 | 7/2015 | Park et al. | |
| 2016/0226576 A1 | 8/2016 | Park et al. | |

(Continued)

FOREIGN PATENT DOCUMENTS

| | | |
|---|---|---|
| CN | 101946425 A | 1/2011 |
| WO | 2012177060 A2 | 12/2012 |
| WO | 2021136474 A1 | 7/2021 |

OTHER PUBLICATIONS

Huawei et al. "Small data transmission with CG-based scheme", 3GPP TSG RAN WG2 #115-e Electronic Meeting, Aug. 9-27, 2021, R2-2107492, section 2.3.

(Continued)

*Primary Examiner* — Jamaal Henson
(74) *Attorney, Agent, or Firm* — ScienBiziP, P.C.

(57) ABSTRACT

A method and a user equipment (UE) for timing alignment is provided. The method includes maintaining a Timing Advance (TA) value as a first TA value; receiving, from a Base Station (BS), a TA command during a Random Access (RA) procedure; applying the TA command to set the TA value to a second TA value included in the TA command in a case that a first timing alignment timer is not running; determining whether a contention resolution for the RA procedure is successful; and when the contention resolution is not successful, setting the TA value to the first TA value in a case that a Configured Grant-based Small Data Transmission (CG-SDT) procedure is ongoing.

20 Claims, 15 Drawing Sheets

(56) References Cited

U.S. PATENT DOCUMENTS

2019/0215862 A1* 7/2019 Kim .................. H04W 74/006
2024/0357698 A1* 10/2024 Mao ........................ H04W 4/20

OTHER PUBLICATIONS

Huawei, et al. "Small data transmission with CG-based scheme", R2-2110183, 3GPP TSG RAN WG2 Meeting #116-e Electronic, Nov. 1-12, 2021, section 2.3.
Interdigital, "CG-based SDT selection and configuration", R2-2101506, 3GPP RAN WG2 Meeting #113-e Jan. 25-Feb. 5, 2021, section 2.
Interdigital, "Configuration and selection of CG-based SDT resource", R2-2010107, 3GPP RAN WG2 Meeting #112e eMeeting Nov. 2-13, 2020, section 2.
Huawei, et al. "Running MAC CR for Small Data", R2-2105032, 3GPP TSG-RAN2 Meeting #114e Electronic, May 19-25, 2021. section 5.2.
3GPP TS 38.300, "3rd Generation Partnership Project; Techical Specification Group Radio Access Network; NR; NR and NG-RAN Overall Description; Stage 2 (Release 16)", V16.5.0 (Mar. 2021).
3GPP TS 38.212, "3rd Generation Partnership Project; Technical Specification Group Radio Access Network; NR; Multiplexing and channel coding (Release 16)", V16.5.0 (Mar. 2021).
3GPP TS 37.213, "3rd Generation Partnership Project; Technical Specification Group Radio Access Network; Physical ayer procedures for shared spectrum channel access (Release 16)", V16.0.0 (Dec. 2019).
3GPP TS 38.331, "3rd Generation Partnership Project; Technical Specification Group Radio Access Network; NR; Radio Resource Control (RRC) protocol specification (Release 16)", V16.4.1 (Mar. 2021).
3GPP TS 38.133, "3rd Generation Partnership Project; Technical Specification Group Radio Access Network; NR; Requirements for support of radio resource management (Release 16)", V16.3.0 (Mar. 2020).
3GPP TS 38.211, "3rd Generation Partnership Project; Technical Specification Group Radio Access Network; NR; Physical channels and modulation (Release 16)", V16.4.0 (Dec. 2020).
3GPP TS 38.321, "3rd Generation Partnership Project; Technical Specification Group Radio Access Network; NR; Medium Access Control (MAC) protocol specification (Release 16)", V16.4.0 (Mar. 2021).
3GPP TS 38.213, "3rd Generation Partnership Project; Technical Specification Group Radio Access Network; NR; Physical layer procedures for control (Release 16)", V16.5.0 (Mar. 2021).
3GPP TS 38.214, "3rd Generation Partnership Project; Technical Specification Group Radio Access Network; NR; Physical layer procedures for data (Release 16)", V16.5.0 (Mar. 2021).

* cited by examiner

100

| | |
|---|---|
| R \| Timing Advance Command | Oct 1 |
| Timing Advance Command \| UL Grant | Oct 2 |
| UL Grant | Oct 3 |
| UL Grant | Oct 4 |
| UL Grant | Oct 5 |
| Temporary C-RNTI | Oct 6 |
| Temporary C-RNTI | Oct 7 |

| | |
|---|---|
| UE Contention Resolution Identity | Oct 1 |
| UE Contention Resolution Identity | Oct 2 |
| UE Contention Resolution Identity | Oct 3 |
| UE Contention Resolution Identity | Oct 4 |
| UE Contention Resolution Identity | Oct 5 |
| UE Contention Resolution Identity | Oct 6 |
| R \| Channel Access-CPext \| TPC \| HARQ Feedback Timing Indicator | Oct 7 |
| PUCCH Resource Indicator \| Timing Advance Command | Oct 8 |
| Timing Advance Command | Oct 9 |
| C-RNTI | Oct 10 |
| C-RNTI | Oct 11 |

USER EQUIPMENT AND METHOD FOR TIMING ALIGNMENT

CROSS-REFERENCE TO RELATED APPLICATION(S)

The present disclosure claims the benefit of and priority to U.S. Provisional Patent Application Ser. No. 63/225,382, filed on Jul. 23, 2021, entitled "TIMING ADVANCE IN SMALL DATA TRANSMISSION," the content of which is hereby incorporated fully by reference herein into the present disclosure for all purposes.

FIELD

The present disclosure is related to wireless communication and, more specifically, to timing alignment in a wireless communication system.

BACKGROUND

Various efforts have been made to improve different aspects of wireless communication for cellular wireless communication systems, such as fifth-generation (5G) New Radio (NR), by improving data rate, latency, reliability, and mobility in these systems. The 5G NR system is designed to provide flexibility and configurability to optimize network services and types, accommodating various use cases, such as enhanced Mobile Broadband (eMBB), massive Machine-Type Communication (mMTC), and Ultra-Reliable and Low-Latency Communication (URLLC). However, as the demand for radio access continues to increase, there exists a need for further improvements in the art, such as improvements in timing alignment for wireless communication.

SUMMARY

The present disclosure is related to timing alignment in a wireless communication system.

In a first aspect of the present disclosure, a method performed by a User Equipment (UE) for timing alignment is provided. The method includes maintaining a Timing Advance (TA) value as a first TA value; receiving, from a Base Station (BS), a TA command during a Random Access (RA) procedure; applying the TA command to set the TA value to a second TA value included in the TA command in a case that a first timing alignment timer is not running; determining whether a contention resolution for the RA procedure is successful; and when the contention resolution is not successful, setting the TA value to the first TA value in a case that a Configured Grant-based Small Data Transmission (CG-SDT) procedure is ongoing.

In an implementation of the first aspect, the method further includes when the contention resolution is successful, starting or restarting a CG-SDT timing alignment timer in a case that the CG-SDT procedure is ongoing.

In an implementation of the first aspect, the CG-SDT timing alignment timer is configured by a Radio Resource Control (RRC) release message.

In an implementation of the first aspect, the method further includes when the contention resolution is successful, stopping the first timing alignment timer in a case that the CG-SDT procedure is ongoing.

In an implementation of the first aspect, the method further includes starting the first timing alignment timer in a case that the first timing alignment timer is not running.

In an implementation of the first aspect, the TA command is received in a Random Access Response (RAR).

In an implementation of the first aspect, the TA command is received in a Message B (MSGB).

In an implementation of the first aspect, the method further includes maintaining the TA value when a CG-SDT timing alignment timer expires.

In an implementation of the first aspect, the method further includes receiving, from the BS, a TA command Medium Access Control (MAC) Control Element (CE); and in a case that the CG-SDT procedure is ongoing, starting or restarting a CG-SDT timing alignment timer in response to receiving the TA command MAC CE.

In an implementation of the first aspect, the method further includes in a case that the CG-SDT procedure is ongoing, starting or restarting the first timing alignment timer in response to receiving the TA command MAC CE.

In a second aspect of the present disclosure, a UE in a wireless communication system for timing alignment is provided. The UE includes at least one processor; and at least one memory coupled to the at least one processor, the at least one memory storing a computer-executable program that, when executed by the at least one processor, causes the UE to maintain a Timing Advance (TA) value as a first TA value; receive, from a Base Station (BS), a TA command during a Random Access (RA) procedure; apply the TA command to set the TA value to a second TA value included in the TA command in a case that a first timing alignment timer is not running; determine whether a contention resolution for the RA procedure is successful; and when the contention resolution is not successful, set the TA value to the first TA value in a case that a Configured Grant-based Small Data Transmission (CG-SDT) procedure is ongoing.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

FIG. 10 illustrates a format of a fallbackRAR, according to an example implementation of the present disclosure.

FIG. 11 illustrates a format of a successRAR, according to an example implementation of the present disclosure.

DESCRIPTION

Figure 1:
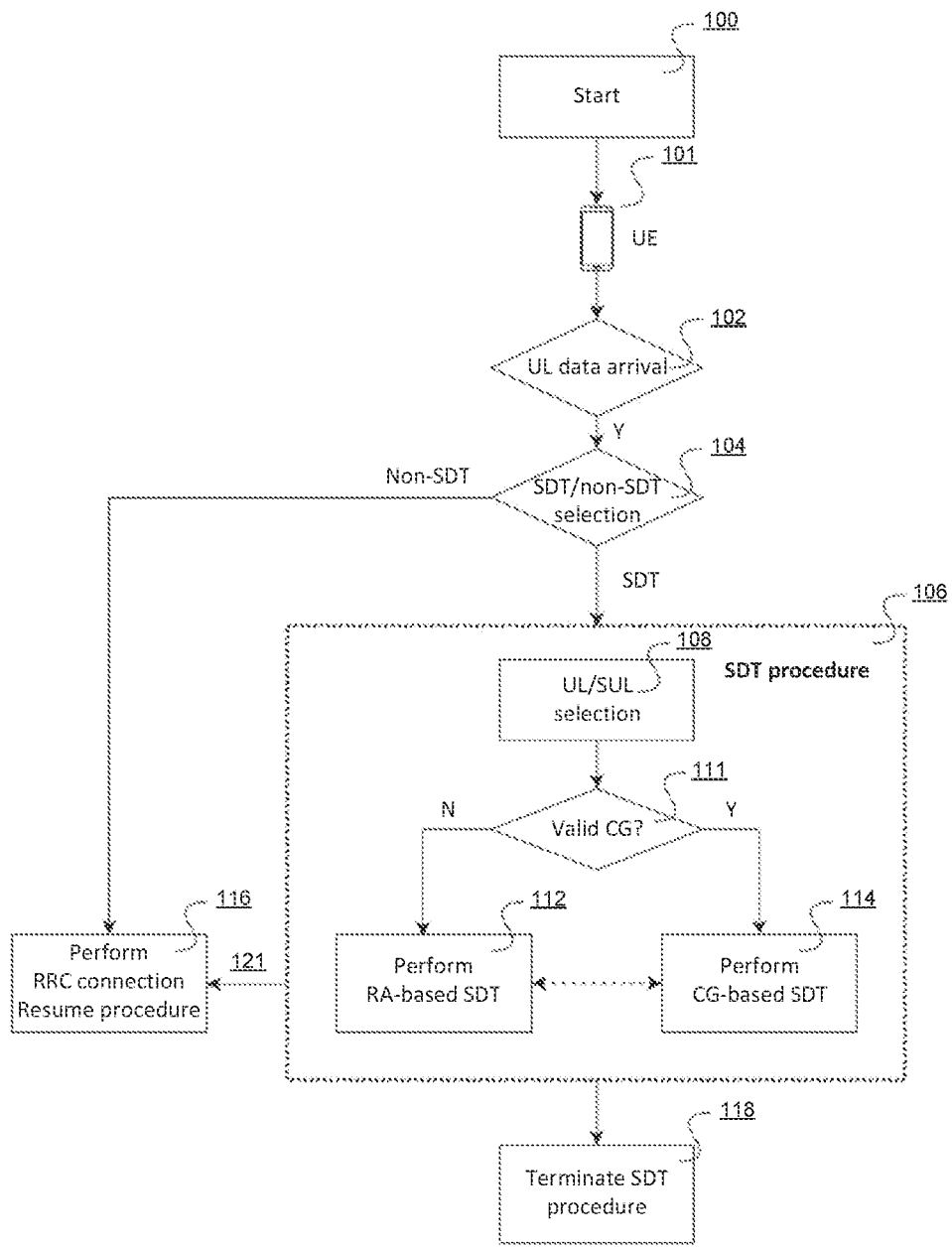
FIG. 1 illustrates a flowchart of an SDT procedure, according to an example implementation of the present disclosure.

Abbreviations used in this disclosure include:

| Abbreviation | Full name |
|---|---|
| 3GPP | 3rd Generation Partnership Project |
| ACK | Positive Acknowledgement |
| AS | Access Stratum |
| BS | Base Station |
| BSR | Buffer Status Report |
| BWP | Bandwidth Part |
| CBRA | Contention Based Random Access |
| CCCH | Common Control Channel |
| CE | Control Element |
| CFRA | Contention Free Random Access |
| CG | Configured Grant |
| CN | Core Network |
| CORESET | Control Resource Set |
| C-RNTI | Cell-Radio Network Temporary Identifier |
| CS-RNTI | Configured Scheduling-Radio Network Temporary Identifier |
| CSI | Channel State Information |
| CSS | Common Search Space |
| CP | Cyclic Prefix |
| DCI | Downlink Control Information |
| DFI | Downlink Feedback Information |
| DL | Downlink |
| DMRS | DeModulation Reference Signal |
| DRB | Data Radio Bearer |
| DRX | Discontinuous Reception |
| eNB | Evolved Node B |
| FR | Frequency Range |
| gNB | Next Generation Node B |
| HARQ | Hybrid Automatic Repeat Request |
| ID | Identifier/Identity |
| IE | Information Element |
| L1 | Layer 1 |
| LCH | Logical Channel |
| LCID | Logical Channel Identifier |
| LCP | Logical Channel Prioritization |
| MAC | Medium Access Control |
| MCG | Master Cell Group |
| MN | Master Node |
| MO | Mobile Originated |
| MSG | Message |
| NACK | Negative Acknowledgement |
| NAS | Non-Access Stratum |
| NDI | New Data Indicator |
| NR | New Radio |
| NW | Network |
| NUL | Normal Uplink |
| OFDM | Orthogonal Frequency Division Multiplexing |
| PBCH | Physical Broadcast Channel |
| PCell | Primary Cell |
| PDCCH | Physical Downlink Control Channel |
| PDCP | Packet Data Convergence Protocol |
| PDSCH | Physical Downlink Shared Channel |
| PDU | Protocol Data Unit |
| PHR | Power Headroom Reporting |
| PHY | Physical Layer |
| PRACH | Physical Random Access Channel |
| PSCell | Primary Secondary Cell |
| PTAG | Primary Timing Advance Group |
| PUCCH | Physical Uplink Control Channel |
| PUSCH | Physical Uplink Shared Channel |
| QCL | Quasi Co Location |
| RA | Random Access |
| RA-RNTI | Random Access-Radio Network Temporary Identifier |
| RACH | Random Access Channel |
| RAR | Random Access Response |
| RAN | Radio Access Network |
| RB | Radio Bearer |
| Rel | Release |
| RF | Radio Frequency |
| RLC | Radio Link Control |
| RNA | RAN Notification Area |
| RNTI | Radio Network Temporary Identifier |
| RO | RACH Occasion |
| RRC | Radio Resource Control |
| RS | Reference Signal |
| RSRP | Reference Signal Received Power |
| RX | Reception |
| SCell | Secondary Cell |
| SCG | Secondary Cell Group |
| SCS | Sub Carrier Spacing |
| SDAP | Service Data Adaptation Protocol |
| SDT | Small Data Transmission |
| SDU | Service Data Unit |
| SFN | System Frame Number |
| SI | System Information |
| SIB | System Information Block |
| SL | Sidelink |
| SN | Secondary Node |
| SPS | Semi-Persistent Scheduling |
| SR | Scheduling Request |
| SRB | Signaling Radio Bearer |
| SRS | Sounding Reference Signal |
| SpCell | Special Cell |
| SS | Search Space |
| SSB | Synchronization Signal and PBCH Block |
| SS-RSRP | Synchronization Signal-Reference Signal Received Power |
| SUL | Supplementary Uplink |
| TA | Timing Advance |
| TAG | Timing Advance Group |
| TAT | Timing Advance Timer |
| TBS | Transport Block Size |
| TRP | Transmission and Reception Point |
| TS | Technical Specification |
| Tx | Transmission |
| UE | User Equipment |
| UL | Uplink |
| USS | UE-specific Search Space |
| URLLC | Ultra-Reliable and Low Latency Communication |

The following contains specific information related to implementations of the present disclosure. The drawings and their accompanying detailed disclosure are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purposes of consistency and ease of understanding, like features may be identified (although, in some examples, not illustrated) by the same numerals in the drawings. However, the features in different implementations may be different in other respects and shall not be narrowly confined to what is illustrated in the drawings.

The phrases "in one implementation," or "in some implementations," may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the so-disclosed combination, group, series, or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

Additionally, for the purpose of non-limiting explanation, specific details, such as functional entities, techniques, protocols, standards, and the like, are set forth for providing an understanding of the disclosed technology. In other examples, a detailed disclosure of well-known methods, technologies, systems, architectures, and the like are omitted in order not to obscure the present disclosure with unnecessary details.

Persons skilled in the art will immediately recognize that any NW function(s) or algorithm(s) in the present disclosure may be implemented by hardware, software, or a combination of software and hardware. Disclosed functions may correspond to modules that may be software, hardware, firmware, or any combination thereof. The software implementation may include computer-executable instructions stored on computer-readable media such as memory or other types of storage devices.

For example, one or more microprocessors or general-purpose computers with communication processing capability may be programmed with corresponding executable instructions and carry out the disclosed NW function(s) or algorithm(s). The microprocessors or general-purpose computers may be formed of Application-Specific Integrated Circuits (ASICs), programmable logic arrays, and/or using one or more Digital Signal Processor (DSPs). Although some of the example implementations in the present disclosure are directed to software installed and executing on computer hardware, alternative example implementations implemented as firmware, as hardware, or as a combination of hardware and software are well within the scope of the present disclosure.

The computer-readable medium includes but is not limited to Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication NW architecture (e.g., a Long-Term Evolution (LTE) system, an LTE-Advanced (LTE-A) system, or an LTE-Advanced Pro system) typically includes at least one BS, at least one UE, and one or more optional NW elements that provide connection towards an NW. The UE communicates with the NW (e.g., a CN, an Evolved Packet Core (EPC) NW, an Evolved Universal Terrestrial Radio Access NW (E-UTRAN), a Next-Generation Core (NGC), a 5G Core (5GC) Network or an Internet), through a RAN established by the BS/Cell.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE is configured to receive and transmit signals over an air interface to one or more cells in a RAN.

A BS may include, but not limited to, a Node B (NB) as in the Universal Mobile Telecommunication System (UMTS), an eNB as in the LTE-A, a Radio NW Controller (RNC) as in the UMTS, a Base Station Controller (BSC) as in the Global System for Mobile communications (GSM)/ GSM EDGE (Enhanced Data rates for GSM Evolution) Radio Access NW (GERAN), a Next Generation eNB (ng-eNB) as in an E-UTRA BS in connection with the 5GC, a gNB as in the 5G Access NW (5G-AN), and any other apparatus capable of controlling radio communication and managing radio resources within a cell. The BS may connect to serve the one or more UEs through a radio interface to the NW.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, enhanced LTE (eLTE), NR (often referred to as 5G), LTE-A Pro, and a next generation RAT. However, the scope of the present disclosure should not be limited to the protocols previously disclosed.

The BS may be operable to provide radio coverage to a specific geographical area using a plurality of cells included in the RAN. The BS may support the operations of the cells. Each cell is operable to provide services to at least one UE within its radio coverage. More specifically, each cell (often referred to as a serving cell) may provide services to serve one or more UEs within its radio coverage (e.g., each cell schedules the DL and optionally UL resources to at least one UE within its radio coverage for DL and optionally UL packet transmissions). The BS may communicate with one or more UEs in the radio communication system through the plurality of cells. A cell may allocate sidelink (SL) resources for supporting proximity service (ProSe). Each cell may have overlapped coverage areas with other cells.

In Multi-RAT Dual Connectivity (MR-DC) cases, the primary cell of an MCG or an SCG may be called a SpCell. A PCell may refer to the SpCell of an MCG. A PSCell may refer to the SpCell of an SCG. MCG refers to a group of serving cells associated with an MN, including the SpCell and optionally one or more SCells. SCG refers to a group of serving cells associated with a Secondary Node (SN), including the SpCell and optionally one or more SCells.

In some implementations, the UE may not have (LTE/NR) RRC connections with the concerned serving cells of the associated services. In other words, the UE may not have UE-specific RRC signal exchange with the serving cell. Instead, the UE may only monitor the DL synchronization signals (e.g., DL synchronization burst sets) and/or broadcast SI related to the concerned services from such serving cells. In addition, the UE may have at least one serving cell on one or more target SL frequency carriers for the associated services. In some other implementations, the UE may consider the RAN which configures one or more of the serving cells as a serving RAN.

As previously disclosed, the frame structure for NR supports flexible configurations for accommodating various next generation (e.g., 5G) communication requirements, such as eMBB, mMTC, and URLLC, while fulfilling high reliability, high data rate, and low latency requirements. The OFDM technology, as disclosed in 3GPP, may serve as a baseline for an NR waveform. The scalable OFDM numerology, such as the adaptive sub-carrier spacing, the channel bandwidth, and the CP, may also be used. Additionally, two coding schemes are considered for NR: (1) low-density parity-check (LDPC) code and (2) polar code. The coding scheme adaption may be configured based on the channel conditions and/or service applications.

It is also considered that in a transmission time interval of a single NR frame, at least DL transmission data, a guard period, and UL transmission data should be included. The respective portions of the DL transmission data, the guard period, and the UL transmission data should also be configurable, for example, based on the NW dynamics of NR. In addition, SL resources may also be provided in an NR frame to support ProSe services.

Any two or more than two of the following sentences, paragraphs, (sub)-bullets, points, actions, behaviors, terms, alternatives, aspects, examples, or claims described in the following invention(s) may be combined logically, reasonably, and properly to form a specific method.

Any sentence, paragraph, (sub)-bullet, point, action, behaviors, terms, alternatives, aspects, examples, or claims described in the following invention(s) may be implemented independently and separately to form a specific method.

Dependency, such as "based on", "more specifically", "preferably", "in one embodiment", "in one alternative", "in one example", "in one aspect", "in one implementation", etc., in the present disclosure is just one possible example which would not restrict the specific method.

SDT

In NR, until Rel-16, an RRC_INACTIVE state doesn't support data transmission (e.g., UL data transmission on a PUSCH and/or DL data transmission on a PDSCH). Hence, the UE needs to resume a connection (e.g., move to an RRC_CONNECTED state) for any DL reception and/or UL data transmission. A connection setup and a subsequently release to the RRC_INACTIVE state happens for each data transmission regardless of how small and infrequent the data packets are. This results in unnecessary power consumption and signaling overhead. Signaling overhead caused by transmission of small data packets for the UEs in the RRC_INACTIVE state is a general problem, and will become a critical issue, as the number of UEs increases in NR, not only for NW performance and efficiency but also for UE battery performance. In general, any device that has intermittent small data packets in the RRC_INACTIVE state will benefit from enabling small data transmission in the RRC_INACTIVE state. The key enablers for small data transmission in NR, e.g., the RRC_INACTIVE state, a 2-step RACH, a 4-step RACH, and/or a CG type-1 have already been specified as part of legacy. Thus, NR needs improvement to enable small data transmission in the RRC_INACTIVE state for NR.

An SDT may be a procedure that allows data transmission while the UE is in the RRC_INACTIVE state (e.g., without transitioning to the RRC_CONNECTED state). The SDT may be enabled on an RB basis and is initiated by the UE only if less than a configured amount of UL data awaits for transmission across all RBs (e.g., SRBs and/or DRBs), where the SDT is enabled and a measured RSRP in the cell is above a configured threshold.

The SDT is configured to either take place on a RACH (e.g., an RA-based SDT) or type 1 CG resources (e.g., a CG-based SDT). For the RACH, the NW may also consider whether the 2-step RA type and 4-step RA type can be used. When both the 2-step RA type and 4-step RA type can be used, the UE may select one of the RA types. When only the 2-step RA type can be used, the SDT may only be initiated if the criteria to select the 2-step RA type is also met.

Once the SDT is initiated, the SDT may continue as long as the UE is not explicitly directed to an RRC_IDLE state or the RRC_INACTIVE state (e.g., via an RRCRelease) or to the RRC_CONNECTED (e.g., via an RRCResume).

After an initial transmission of the SDT, subsequent transmissions may be handled depending on configured types of resources. In one example, when CG resources are used, the NW may schedule subsequent UL transmission using dynamic grants or next CG resource occasions. In another example, when RACH resources are used, the NW may schedule subsequent UL and DL transmissions using dynamic grants and/or assignments after completion of an RA procedure.

SDT Procedure

FIG. 1 illustrates a flowchart of an SDT procedure 10, according to an example implementation of the present disclosure. In some implementations, actions of the SDT procedure 10 are illustrated as separate actions represented as independent blocks. In some other implementations, these separate actions may not be construed as necessarily order dependent, where any two or more actions may also be performed and/or combined with each other or be integrated with other alternate methods, which is not limiting the scope of the implementation. Moreover, in some other implementations, one or more of the actions may be adaptively omitted.

As shown in FIG. 1, for action 101, the UE may be in the RRC_INACTIVE state. The UE may be configured with configurations for the SDT (e.g., via an IE sdt-Config and/or an IE sdt-ConfigCommon). The configurations for the SDT may be configured via an RRC release message (and/or via a suspend configuration), and/or via system information (e.g., an SIB). The configuration(s) for the SDT may include at least one of a RACH configuration (e.g., via an IE ra-SDT-config), a CG configuration (e.g., via an IE cg-SDT-config), configuration(s) for SRB/DRB used for the SDT, a DRB list (e.g., via an IE sdt-DRBList), and an SRB indication (e.g., via an IE SRB2Indication).

In action 102, UL data may be arrival for transmission. The UL data may be associated with a specific DRB/SRB/LCH. The specific DRB/SRB/LCH may be configured for the SDT. The specific DRB/SRB/LCH may be configured by a DRB list (e.g., via an IE sdt-DRBList) and/or an SRB indication (e.g., via an IE SRB2Indication). Then a UE may initiate a (resume) procedure for the SDT (e.g., an SDT procedure).

In action 104, the UE (or its MAC entity) may be configured by an RRC message with the SDT, and the SDT may be initiated by an RRC layer and/or a MAC layer. The SDT can be performed either by an RA procedure with a 2-step RA type or a 4-step RA type (e.g., an RA-SDT) or by a configured grant type 1 (e.g., a CG-SDT). For the SDT procedure, the UE (or its MAC entity) may consider the RBs configured with the SDT which are suspended for data volume calculation.

Specifically, the UE may determine whether to initiate the SDT procedure in action 106 (e.g., initiate the SDT procedure, initiate the RA procedure for the SDT, and/or initiate the SDT procedure with CG) or initiate a non-SDT procedure (e.g., an RRC connection resume procedure) in action 116, (e.g., by initiating an RA procedure for CCCH logical channel). The UE may determine whether to initiate the SDT procedure in action 106 or initiate a non-SDT procedure based on one or more criteria, e.g., DRB/SRB, data volume, and/or RSRP, etc.

In one implementation, the UE may initiate the SDT procedure when/after at least one LCH/DRB/SRB is configured for the SDT and has pending data. For example, data is available for transmission for only those LCHs/DRBs/SRBs for which SDT is enabled. The LCH/DRB/SRB configured for the SDT may be resumed/re-established when the UE initiates the SDT procedure. Alternatively, the UE may initiate the RRC connection resume procedure when/after at least one LCH/DRB/SRB is not configured for SDT and has pending data.

In one implementation, the UE may initiate the SDT procedure if a data volume for transmission (e.g., for the SDT) is lower than a configured threshold for the SDT. The data volume may only count the (total) volume of the LCHs/DRBs/SRBs configured for the SDT. Alternatively, the UE may initiate an RRC connection resume procedure if a data volume for transmission (e.g., for the SDT) is higher than a configured threshold for the SDT.

In one implementation, the UE may initiate the SDT procedure if an RSRP is larger than a configured RSRP threshold for the SDT. Alternatively, the UE may initiate the RRC connection resume procedure if an RSRP is lower than a configured RSRP threshold for the SDT.

In action 106, there may be two types of the SDT procedure. One is based on the RA procedure (e.g., the 2-step RA or the 4-step RA), e.g., an RA-based SDT (or referred to as an RA-SDT) in action 112. The other is based on a CG (e.g., a type 1 CG), e.g., a CG-based SDT (or referred to as a CG-SDT) in action 114. The UE may transmit the UL data (e.g., small data), via an MSG3, an MSGA, a CG resource, and/or PUSCH resources during the SDT procedure.

In action 108, the UE may perform UL carrier selection (e.g., if an SUL is configured in the cell, a UL carrier may be selected based on an RSRP threshold). After the UL carrier selection, the UE may perform the SDT procedure on the selected UL carrier (e.g., either a UL or an SUL).

In one implementation, the SDT procedure may be as introduced in Table 1.

TABLE 1

The UE/MAC entity may:
    1>   if the data volume of the pending UL data across all logical channels configured for the SDT is less than or equal to an sdt-DataVolumeThreshold:
        2>   if the Serving Cell for the SDT is configured with the SUL as specified in TS 38.331; and
        2>   if the RSRP of the DL pathloss reference is less than an sdt-RSRP-ThresholdSSB-SUL:
            3>   select the SUL carrier.
        2>   else:
            3>   select the NUL carrier.
NOTE: the procedure needs to be improved when sdt-RSRP-ThresholdSSB-SUL is not configured
        2>   if the RSRP of the DL pathloss reference is higher than an sdt-RSRP-Threshold, if configured:
            3>   if the CG type 1 is configured for the SDT, and the CG type 1 resource is valid:
                4>   initiate the SDT with the CG type 1 on the selected UL carrier;
                4>   indicate to the upper layer that conditions for initiating SDT are fulfilled.
            3>   else if RA Resources are configured for the SDT:
                4>   initiate the RA procedure on the selected UL carrier for the SDT;
                4>   indicate to the upper layer that conditions for initiating the SDT are fulfilled.
            3>   else:
                4>   initiate the RA procedure for CCCH logical channel (e.g., not for the SDT);
        2>   else:
            3>initiate the RA procedure for CCCH logical channel (e.g., not for the SDT);
    1>   else:
        2>   initiate the RA procedure for CCCH logical channel (e.g., not for the SDT);

In action 111, the UE may determine whether a CG resource/configuration is valid (during the SDT procedure) based on one or more of the following scenarios/criterions/implementations.

In one implementation, the UE may determine whether a CG resource/configuration is valid based on whether the associated beam is valid. Whether the associated beam is valid may be based on an RSRP threshold. The RSRP threshold may be configured in the RRC release message and/or the CG configuration. In one example, if there is at least one beam with an RSRP being above the RSRP threshold, the UE may consider the CG resource/configuration is valid. If there is no beam with an RSRP above the RSRP threshold, the UE may consider the CG resource/configuration is not valid.

In another implementation, the UE may determine whether a CG resource/configuration is valid based on whether a TA is valid. The UE may determine the CG resource/configuration is valid while the TA is valid. If the TA is not valid, the UE may consider the CG resource/configuration is not valid. In one example, whether a TA is valid may be based on a TA timer. Specifically, the UE may consider the TA is valid while the TA timer is running. The UE may consider the TA is not valid while the TA timer is not running. The (parameter of) TA timer may be configured in the RRC release message and/or the CG configuration. In another example, whether a TA is valid may be based on an RSRP change volume. Specifically, the UE may consider the TA is not valid if the RSRP change is higher than a threshold. The threshold (for the RSRP change) may be configured in the RRC release message and/or the CG configuration.

In one implementation, validation for the SDT using the CG may be as introduced in Table 2.

TABLE 2

The UE may consider the time alignment value for the SDT using a CG type 1 to be valid when the following conditions are fulfilled:
1> compared to the stored DL pathloss reference RSRP value, the RSRP has not increased by more than a cg-SDT-RSRP-ChangeThresholdIncrease, if configured; and
1> compared to the stored DL pathloss reference RSRP value, the RSRP has not decrease by more than a cg-SDT-RSRP-ChangeThresholdDecrease, if configured In some implementations, the UE may determine whether a CG resource/configuration is valid based on whether the CG configuration is configured. In one example, when the CG resource configuration is (re-)initialized, the CG resource configuration may be valid. In another example, when the CG resource configuration is released/suspended, the CG resource configuration may be invalid. In another example, the CG resource configuration may be configured in the RRC release message.

In some implementations, the UE may determine whether the CG resource/configuration is valid based on whether a timer (e.g., an SDT failure detection timer) is running. The timer may be configured in the RRC release message and/or the CG configuration. In one example, the UE may determine that the CG resource/configuration is valid while the timer is running. The UE may determine that CG resource/configuration is not valid while the timer is not running or when the timer expires. The timer may be used to detect a failure of the SDT. The timer may be (re-)started upon transmission of UL data when the UE is in the RRC_INACTIVE state. The timer may be (re-)started upon transmission of small data. The timer may be (re-)started upon transmission of an RRC resume request. The timer may be stopped upon reception of an RRCResume, an RRCSetup, an RRCRelease, an RRCRelease with suspendConfig or an RRCReject message, a cell re-selection and upon abortion of a connection establishment by upper layers. When the timer expires, the UE may enter the action upon going to the RRC_IDLE state (e.g., with a specific RRC resume cause).

In action 112, if the UE determines that the CG resource/configuration is not valid, e.g., one of the criteria for CG validity is not satisfied, the UE may perform the RA-based SDT. For example, the UE may initiate an RA procedure (for the SDT). The RA procedure may be either the 2-step type or the 4-step type based on the selection by the UE (e.g., according to an RSRP threshold). The UE may perform the transmission of the RA preamble, e.g., via the preamble/RA resource/PRACH resource that is configured for the SDT. The UE may perform UL transmission (e.g., small data) via an MSG3/MSGA.

In action 114, if the UE determines that the CG is valid, e.g., the criteria for CG validity is satisfied, the UE may perform the CG-based SDT. For example, the UE may perform UL transmission (for small data) via the CG resource.

In action 116, if the criteria (e.g., DRB/SRB, data volume, and/or RSRP) for initiating the SDT procedure is not satisfied, the UE may initiate the non-SDT procedure (e.g., an RRC connection resume procedure), e.g., the UE may initiate the RA procedure for a CCCH logical channel.

In action 118, the SDT procedure may be terminated/stopped/completed by an indication from the NW (e.g., via an RRC release message), by a timer (e.g., an SDT failure detection timer being expiring), and/or by a counter (e.g., the value of the counter reaching a maximum value).

In action 121, the SDT procedure may fallback/switch to the non-SDT procedure (e.g., an RRC connection resume procedure). For example, when the UE receives an indication (e.g., a fallback indication) from the NW (e.g., an RRC resume/RRC release message), the UE may stop/terminate/complete the SDT procedure and then may initiate an RRC connection resume procedure. For another example, if the initial UL transmission (e.g., in MSGA/MSG3/CG resources) fails a configured number of times, the UE may stop/terminate/complete the SDT procedure and then may initiate an RRC connection resume procedure.

RA-Based SDT (RA-SDT)

Figure 2:
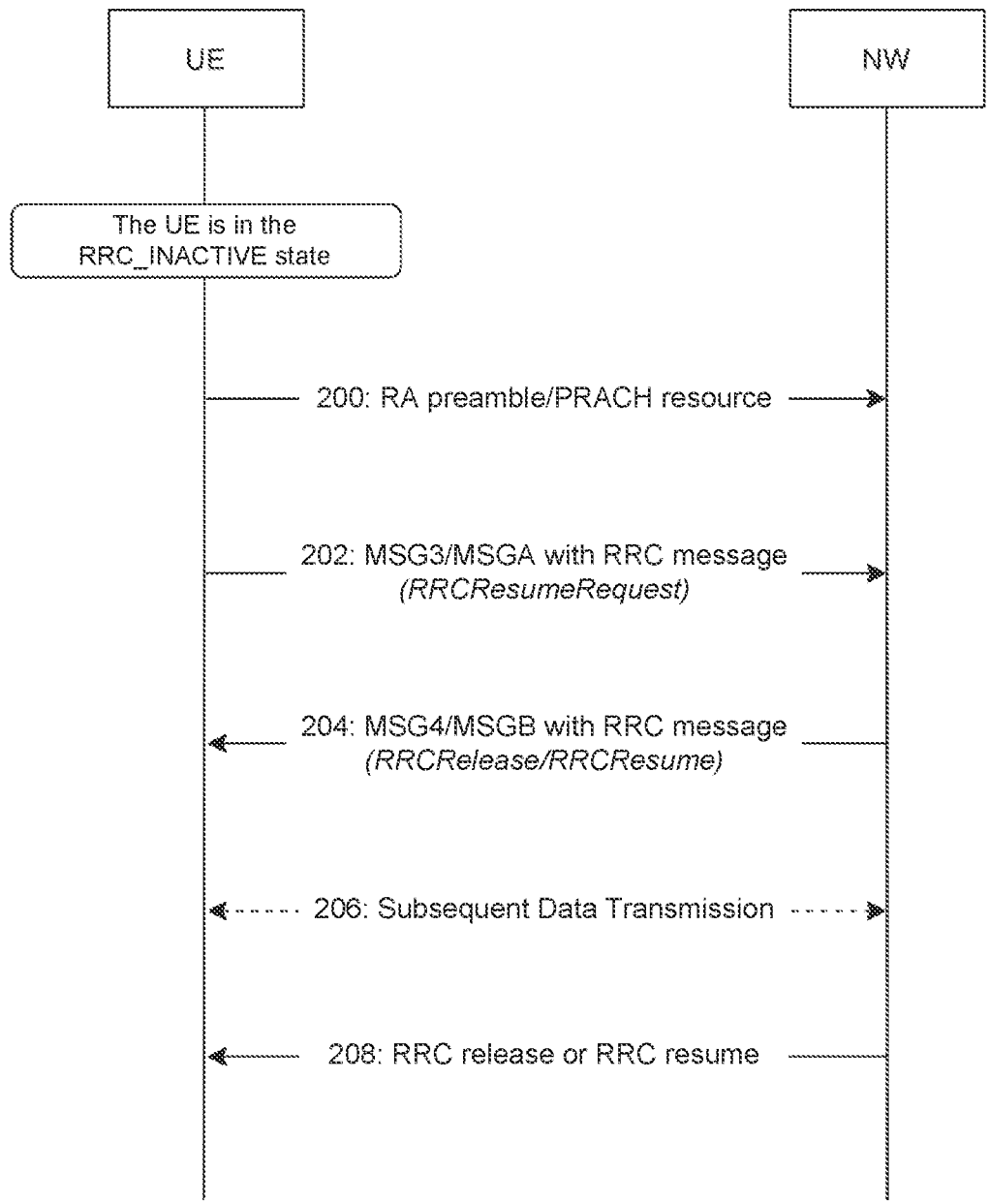
FIG. 2 illustrates a communication diagram of an RA-based SDT, according to an example implementation of the present disclosure.

FIG. 2 illustrates a communication diagram of an RA-based SDT 20, according to an example implementation of the present disclosure. As shown in FIG. 2, when a UE in the RRC_INACTIVE state has UL data available for transmission and/or an SDT procedure has been initiated, in action 200, the UE may initiate an RA-based SDT procedure for the transmission of the UL data (e.g., in a case that the CG is considered as not valid). The UE may select either a 4-step RA type or a 2-step RA type. Moreover, the preamble/PRACH resource for the RA-based SDT procedure (e.g., an RA preamble/a PRACH resource configured for the SDT) and the normal RA procedure (e.g., an RA preamble not configured for the SDT) may be different. Here, the UE may select the preamble/PRACH resource configured for the SDT.

In action 202, after transmitting the RA preamble, the UE may transmit an RRC message (e.g., a CCCH message), MAC CE(s), and/or UL data through an MSG3 (when the 4-step RA type is selected) or an MSGA (when the 2-step RA type is selected). The RRC message may be an RRCResumeRequest message. In addition to the RRC message, MAC CE (e.g., a BSR) and UL data (e.g., data associated with DRB(s) for the SDT) may be included in the MSG3/MSGA as well.

In action 204, once the MSG3/MSGA is transmitted, the UE may monitor (e.g., Temporary C-RNTI/C-RNTI/RA-RNTI/MSGB-RNTI for an MSG4 or an MSGB, in which the contention resolution ID will be carried. In addition, the NW may transmit an RRC message in the MSG4/MSGB. The RRC message may be an RRCRelease message (with a suspendConfig IE) or an RRCResume message. The UE may stay in the RRC_INACTIVE state if the UE receives an RRCRelease message (with the suspendConfig IE) or enters into the RRC_CONNECTED state if the UE receives an RRCResume message.

In action 206, once the RA procedure for the SDT is successfully completed, the UE may monitor a specific RNTI (e.g., C-RNTI) on a specific SS for subsequent data transmission. The subsequent data transmission may be the transmission of multiple UL and/or DL data packets as part of the SDT procedure without transitioning to the RRC_CONNECTED state (e.g., the UE is still in the RRC_INACTIVE state). The UE may monitor a PDCCH via a specific RNTI (e.g., a C-RNTI) to receive a dynamic scheduling for UL and/or DL new transmission and/or the corresponding retransmission. The UE may monitor the PDCCH via a UE-specific RNTI (e.g., a C-RNTI) to receive the dynamic scheduling for the retransmission of the UL transmission via a CG resource.

In action 208, the NW may send an RRC release (with a suspendconfig) message to keep the UE in the RRC_INACTIVE state or have the UE transition to the RRC_IDLE state. Alternatively, the NW may send an RRC resume message to have the UE transition to the RRC_CONNECTED state. Once the RRCRelease message (with the suspendConfig IE) is received, the UE may terminate the SDT procedure based on the RRCRelease message, and/or stop monitoring the C-RNTI, and/or stay in the RRC_INACTIVE state.

CG Based-SDT (CG-SDT)

Figure 3:
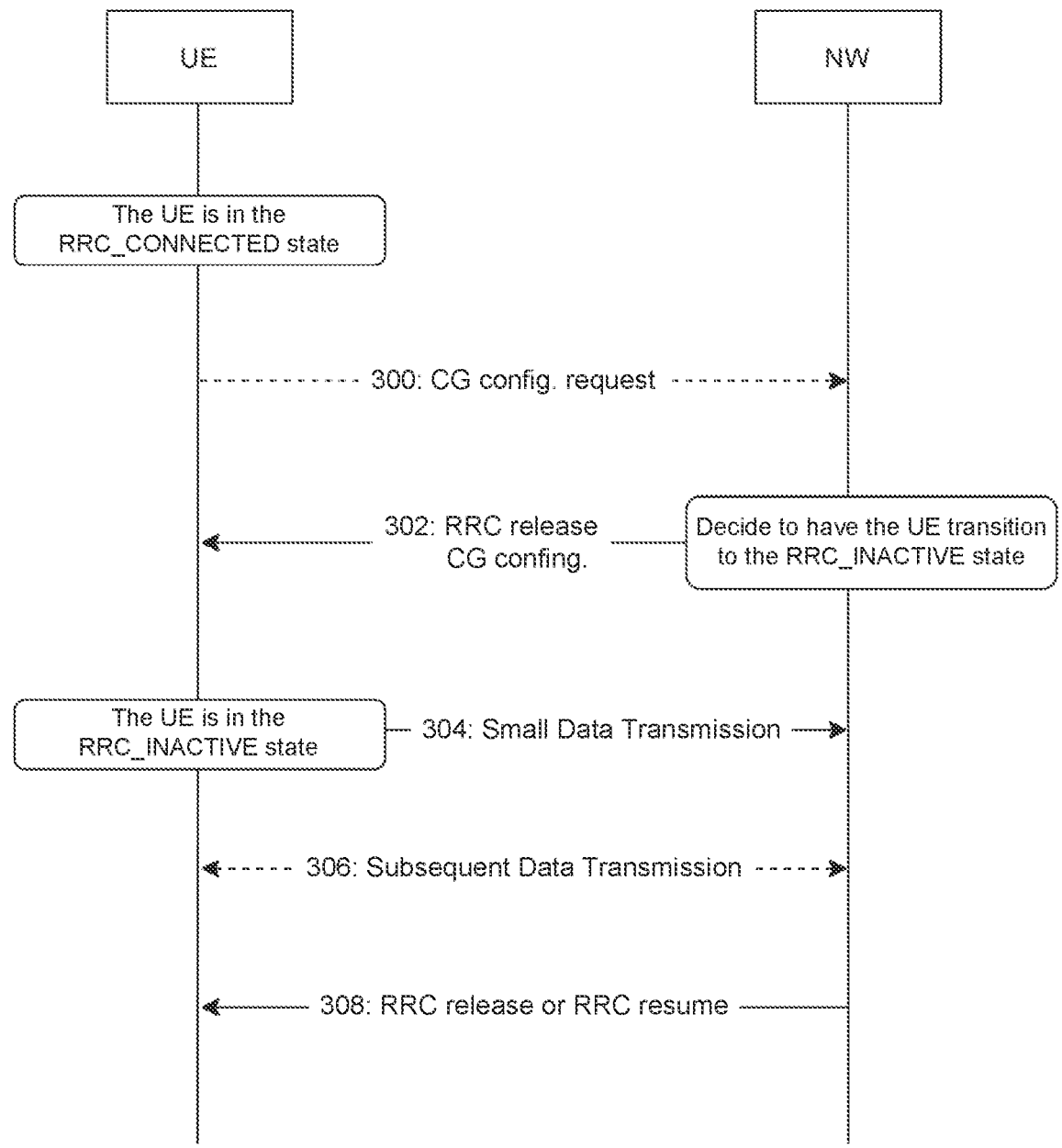
FIG. 3 illustrates a communication diagram of a CG-based SDT, according to an example implementation of the present disclosure.

FIG. 3 illustrates a communication diagram of a CG-based SDT 30, according to an example implementation of the present disclosure. As shown in FIG. 3, when the UE is in the RRC_CONNECTED state and/or in the RRC_INACTIVE state, in action 300, the UE may send a CG configuration request to the NW to indicate its preference on configuration with a CG for small data and/or for the RRC_INACTIVE state.

In action 302, the NW may decide to move the UE to the RRC_INACTIVE state by sending an RRCRelease message (including a suspendconfig IE) to the UE. The RRC release message may include at least a CG configuration to configure the CG resources to the UE. The CG configuration may include at least one of CG periodicity, a TBS, a number for the implicit release of the CG resources, a CG Timer, a retransmission timer, a number of a HARQ process reserved for the CG in the SDT, an RSRP threshold for an SSB selection and association between the SSB and CG resources, TA related parameters (e.g., a cg-SDT-Time-AlignmentTimer).

In action 304, the UE may perform the SDT procedure based on the CG resources (in the RRC_INACTIVE state) according to the CG configuration (e.g., those configured in action 302). For example, the UE may transmit UL data (e.g., small data) via the CG resource (during the SDT procedure).

In action 306, subsequent data transmission may be the transmission of multiple UL and/or DL packets as part of the SDT procedure without transitioning to the RRC_CONNECTED state (e.g., the UE is still in the RRC_INACTIVE state). The UE may monitor a PDCCH via a specific RNTI (e.g., a C-RNTI, a CS-r, and/or an SDT RNTI) on an SS (e.g., the one configured by a CG configuration) to receive a dynamic scheduling for UL and/or DL new transmission and/or the corresponding retransmission. The UE may monitor the PDCCH via the specific RNTI to receive the dynamic scheduling for the retransmission of the CG. The UE may also perform the subsequent data transmission via the CG resource according to the CG configuration (e.g., the one configured in action 302).

In action 308, the NW may send an RRC release (with a suspendconfig) message to keep the UE in the RRC_INACTIVE state or have the UE transition to the RRC_IDLE state. Alternatively, the NW may send an RRC resume message to have the UE transition to the RRC_CONNECTED state. Once the RRCRelease message (with the suspendConfig IE) is received, the UE may terminate the SDT procedure based on the RRCRelease message, and/or stop monitoring the specific RNTI, and/or stay in the RRC_INACTIVE state.

Subsequent Transmission Period

Figure 4:
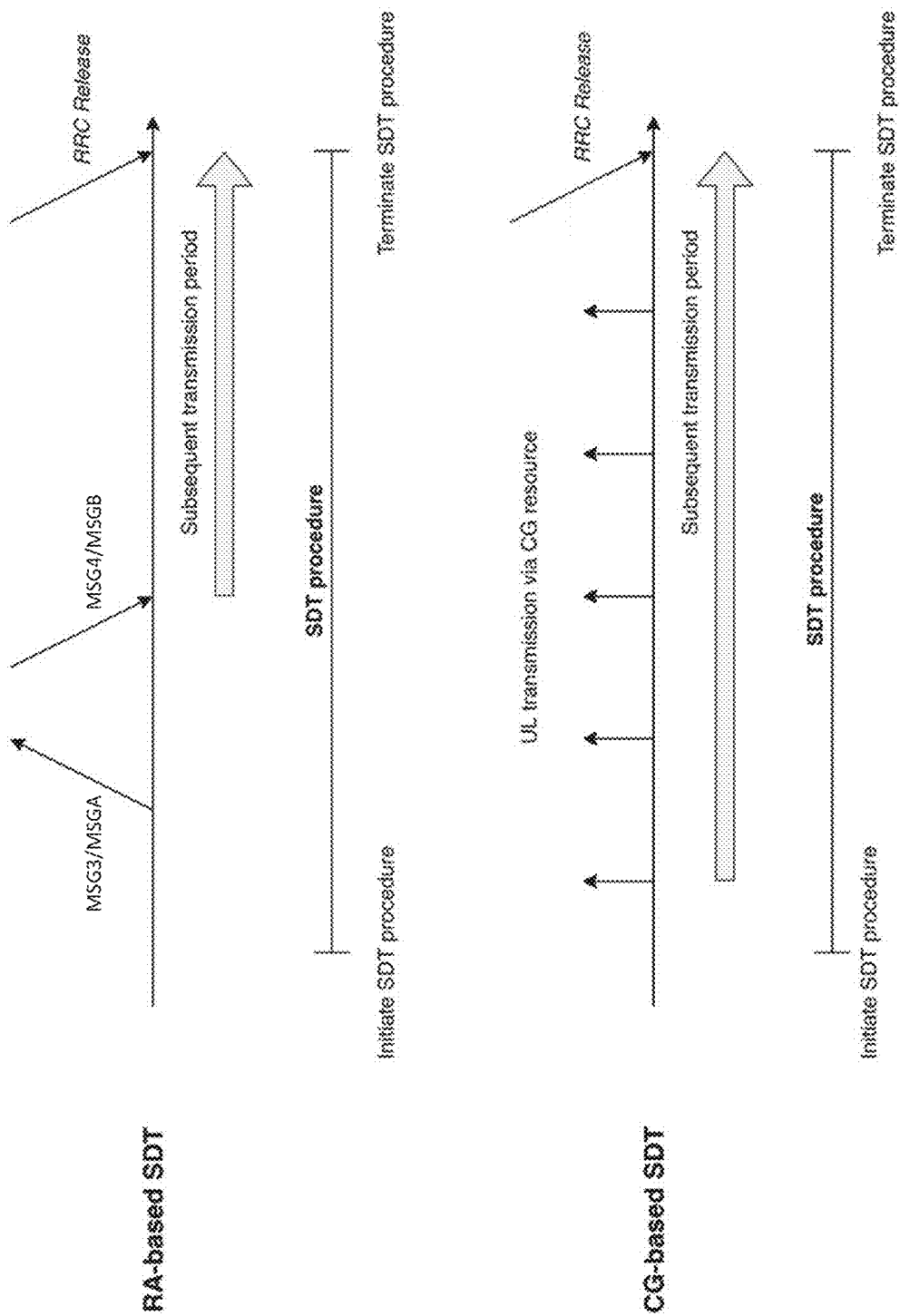
FIG. 4 illustrates a timing diagram of a subsequent transmission period (or a subsequent transmission phase) of an SDT procedure, according to an example implementation of the present disclosure.

FIG. 4 illustrates a timing diagram 40 of a subsequent transmission period (or a subsequent transmission phase) of an SDT procedure, according to an example implementation of the present disclosure. The duration of the subsequent transmission period may be implemented in the following.

In one implementation, the subsequent transmission period may be determined as a timing period during an (RA-based and/or CG-based) SDT procedure. For example, the subsequent transmission period may be a timing period while the SDT procedure is ongoing. For example, the subsequent transmission period may be a timing period while/after a CG configuration is configured/initiated (and the CG configuration is not released).

In one implementation, the subsequent transmission period may be determined as initialization when/after the UE initiates an SDT procedure.

In one implementation, the subsequent transmission period may be determined as initialization when/after the UE considers a contention resolution is successful for a RA procedure and/or after the UE considers the RA procedure is successfully completed. The RA procedure may be an RA-based SDT. The RA procedure may be initiated for the SDT.

In one implementation, the subsequent transmission period may be determined as initialization when/after the CG configuration is configured/(re-)initialized. In one example, the CG configuration may include a parameter that is used to indicate an SDT scheduling.

In one implementation, the subsequent transmission period may be determined as initialization when/after the CG configuration is considered as valid.

In one implementation, the subsequent transmission period may be determined as initialization when/after the UE transmits a UL message. More details are introduced in the following examples.

In one example, the UL message may be transmitted via the MSG1/MSG3/MSGA/CG resource/UL resource scheduled by the MSG2/MSGB/MSG4 (during the SDT procedure) or on the UL resource being (pre-)configured as part of the SDT configuration. In one example, the UL message may include an RRC resume request message (e.g., an RRCResumeRequest, an RRCResumeRequest1, and/or a CCCH message for the SDT). In one example, the UL message may include small data (e.g., UL data associated with a specific SRB/DRB/LCH for the SDT). In one example, the UL message may include a MAC CE (e.g., a BSR MAC CE). In one implementation, the subsequent transmission period may be determined as initialization when/after the UE receives a response from the NW. In one example, the response may be an MSG2/MSG4/MSGB and/or a response for a UL transmission via the CG resource. In one example, the response may be used for the contention resolution, e.g., for an RA procedure. In one example, the response may include an (HARQ/RRC) ACK/NACK message, and/or DFI, e.g., for (the first) UL transmission via the CG resource. In one example, the response may include a UL grant/DL assignment for a new transmission/retransmission. The response may be a PDCCH addressed to an RNTI (e.g., a C-RNTI, a CS-RNTI, a dedicated RNTI, an RNTI for the SDT, and/or an RNTI for the CG). In one example, the response may indicate a UL grant for a new transmission for the HARQ process used for the transmission of a UL transmission for small data (e.g., the UL message). In one example, the response may include a specific command, e.g., a TA command MAC CE. In one example, the response may include an RRCResume, an RRCSetup, an RRCRelease, an RRCRelease with SuspendConfig, an RRCReestablishment, an RRCReconfiguration, and/or an RRCReject, etc.

In one implementation, the subsequent transmission period (and/or the SDT procedure) may be terminated/stopped when/after the SDT procedure is terminated.

In one implementation, the subsequent transmission period (and/or the SDT procedure) may be terminated/stopped when/after the CG configuration is released/suspended/cleared.

In one implementation, the subsequent transmission period (and/or the SDT procedure) may be terminated/stopped when/after the CG configuration is considered as invalid.

In one implementation, the subsequent transmission period (and/or the SDT procedure) may be terminated/stopped when/after the UE receives an indication from the NW.

In one example, the indication may include an RRCResume, an RRCSetup, an RRCRelease, an RRCRelease with SuspendConfig, an RRCReestablishment, and/or an RRCReject, etc. The indication may be a PDCCH addressed to an RNTI (e.g., a C-RNTI, a CS-RNTI, a dedicated RNTI, an RNTI for the SDT, and/or an RNTI for the CG). The indication may indicate to the UE to terminate the SDT procedure and/or the subsequent transmission period, e.g., based on a field of the indication. The indication may indicate to the UE to initiate an RRC procedure (e.g., an RRC connection resume procedure, an RRC establishment procedure, and/or an RRC reestablishment procedure). The indication may indicate to the UE to switch/fallback the types for the SDT, e.g., the type may be the RA-based SDT, the CG-based SDT, the 2-step RA, the 4-step RA, etc. The indication (with a specific value, e.g., 'TRUE' or 'FALSE') may be included in SI (e.g., a SIB) to indicate that CG transmission in the RRC_INACTIVE state is no longer supported in the cell. For example, when the UE receives the indication (with a specific value, e.g., 'TRUE' or 'FALSE'), the UE may release/suspend the CG configuration(s).

In one implementation, the subsequent transmission period (and/or the SDT procedure) may be terminated/stopped when/after a timer expires. More details are introduced in the following examples.

In one example, the timer may be an SDT failure/problem detection timer. In one example, the timer may be specifically configured for the SDT. The value of the timer may be configured via an RRC release message. The value of the timer may be configured via an RRC release message with a suspend configuration. The value of the timer may be configured via a configuration for the SDT. The value of the timer may be configured via a RACH configuration for the SDT. The value of the timer may be configured via a CG configuration for the SDT. The value of the timer may be configured via an IE UE-TimersAndConstants. The value of the timer may be configured via SI (e.g., a SIB). In one example, the timer may be a TA timer, an ra-ResponseWindow, an msgB-ResponseWindow, an ra-ContentionResolutionTimer, a configuredGrantTimer; a cg-RetransmissionTimer, a drx-onDurationTimer, a drx-InactivityTimer, a drx-RetransmissionTimerDL, a drx-RetransmissionTimerUL, a T300, a T301, a T302, a T304, a T310, a T311, a T312, a T316, a T319, a T320, a T321, a T322, a T325, a T330, a T331, a T342, a T345, and/or a new Tx. In one example, the timer may be used for monitoring a response (e.g., for an ACK/NACK). The timer may be a response window. In one example, the timer may be used for receiving a PDCCH/scheduling (e.g., for new transmission or retransmission) from the NW.

In one implementation, the subsequent transmission period may be terminated/stopped when/after the UE enters into the RRC_IDLE state or the RRC_CONNECTED state, e.g., from the RRC_INACTIVE state.

In one implementation, the subsequent transmission period may be terminated/stopped/released when/after the UE performs cell selection/reselection.

In one implementation, the subsequent transmission period may be terminated/stopped upon abortion of a connection establishment by upper layers.

In one implementation, the subsequent transmission period may be terminated/stopped upon an RNA update.

In one implementation, the subsequent transmission period may be terminated/stopped when/after the UE establishes/resumes an RRC connection from the RRC_INACTIVE state on a cell that is different from the cell where the CG configuration was provided.

In one implementation, the subsequent transmission period may be terminated/stopped when/after the UE initiates an RRC re-establishment procedure. For example, the subsequent transmission period may be terminated/stopped after the UE sends an RRCReestablishmentRequest to the NW.

In one implementation, the subsequent transmission period may be terminated/stopped when/after the UE is indicated, by the NW, to perform a carrier switching (e.g., from a NUL to an SUL, or vice versa).

In one implementation, the subsequent transmission period may be terminated/stopped when/after the UE is indicated, by the NW, to perform a (UL/DL) BWP switching.

In the subsequent transmission period, the UE may need to monitor the PDCCH, e.g., to receive the possible (DL and/or UL) scheduling from the NW. The UE may monitor the PDCCH (during the SDT procedure and/or during the subsequent transmission period) based on an SS, a CORESET, and/or an RNTI. For example, the UE may monitor the PDCCH addressed to the C-RNTI after successful completion of the RA procedure for the SDT.

In some implementations, the SS may include at least one of the following options.

Option 1: CSS

In one example, the CSS may be the common search space(s) configured in a PDCCH-ConfigCommon, the type-1 PDCCH CSS set configured by an ra-SearchSpace, the type-3 PDCCH CSS set, search space zero, a new common Search Space set configured via SI (e.g., a SIB) or an RRC release message, search space with parameters of the search space(s) configured in the initial BWP, etc.

Option 2: USS Set

In one example, the USS set may be a UE-specific Search Space set configured via an RRC Release message, a UE-specific Search Space set configured via the MSG4/MSGB, a UE-specific search space set configured via a PDCCH-Config, a UE-specific search space set configured via configuration(s) for the SDT, a search space with ID other than 0-39, a search space set identified as a specific set for the SDT, etc.

In some implementations, the CORESET may include at least one following options.

Option 1: Common CORESET

In one example, the common CORESET may be CORESET 0, CORESET other than CORESET 0, etc.

Option 2: UE-Specific CORESET Configuration

In one example, the UE-specific CORESET configuration may be a UE-specific CORESET configured via an RRC Release message, a UE-specific CORESET configured via the MSG4/MSGB, a UE-specific CORESET configured via configuration(s) for the SDT, a CORESET with ID other than 0-14, etc.

In some implementations, the RNTI may be a C-RNTI, a CS-RNTI, an SDT-RNTI, an RNTI for the SDT, an RNTI for the CG, etc.

TA

In NR, the BS may be responsible for maintaining the TA to keep the L1 synchronized. Serving cells having UL to which the same TA applies and using the same timing reference cell are grouped in a TAG. Each TAG includes at least one serving cell with configured UL, and the mapping of each serving cell to a TAG may be configured by an RRC message.

In some implementations, TA updates may be signaled by the BS to the UE via MAC CE commands (e.g., a TA Command MAC CE). Such commands may restart a TAG-specific timer (e.g., a Timing Alignment Timer) which indicates whether the L1 may be synchronized or not. When the timer is running, the L1 may be considered as synchronized; alternatively, the L1 may be considered as non-synchronized (in which UL transmission can only take place through an MSG1/MSGA).

In some implementations, a UE may be provided with a value $N_{TA, offset}$ (e.g., a N_TA_Offset) of a TA offset for a serving cell by a n-TimingAdvanceOffset for the serving cell. If the UE is not provided with the n-TimingAdvanceOffset for a serving cell, the UE may determine a default value $N_{TA, offset}$ of the TA offset for the serving cell, as specified in 3GPP TS 38.133. If the UE is configured with two UL carriers for a serving cell, the same TA offset value $N_{TA, offset}$ may apply to both carriers.

In some implementations, upon reception of a TA command for a TAG, the UE may adjust UL timing for a PUSCH/SRS/PUCCH transmission on all the serving cells in the TAG based on a value $N_{TA, offset}$. Specifically, the UE may expect the value $N_{TA, offset}$ to be same for all the serving cells in the TAG and based on the received TA command, where the UL timing for PUSCH/SRS/PUCCH transmissions is the same for all the serving cells in the TAG.

In some implementations, a TA command in a RAR or in an absolute TA command MAC CE, $T_A$ (e.g., TA), for a TAG indicates $N_{TA}$ (e.g., N_TA) values by index values of $T_A=0, 1, 2, \ldots, 3846$, where an amount of the timing alignment for the TAG with SCS of $2^\mu \cdot 15$ kHz is $N_{TA}=T_A \cdot 16 \cdot 64/2^\mu$, where $N_{TA}$ is specified in 3GPP TS 38.211 and is relative to the SCS of the first UL transmission from the UE after the reception of the RAR or the absolute TA command MAC CE.

In some implementations, a TA command MAC CE, $T_A$, for a TAG indicates an adjustment of a current $N_{TA}$ value, $N_{TA\_old}$, to the new $N_{TA}$ value, $N_{TA\_new}$, by index values of $T_A=0, 1, 2, \ldots, 63$, where for an SCS of $2^\mu \cdot 15$ kHz, $N_{TA}$ new $N_{TA\_old}+(T_A-31) \cdot 16 \cdot 64/2^\mu$.

In some implementations, the adjustment of an $N_{TA}$ value by a positive or a negative amount indicates advancing or delaying the UL transmission timing for the TAG by a corresponding amount, respectively.

In some implementations, if a UE changes an active UL BWP between a time of a TA command reception and a time of applying a corresponding adjustment for the UL transmission timing, the UE may determine the TA command value based on the SCS of the new active UL BWP. If the UE changes an active UL BWP after applying an adjustment for the UL transmission timing, the UE may assume the same absolute TA command value before and after the active UL BWP change.

Examples of some selected terms are provided as follows.

UE: this may be referred to as PHY/MAC/RLC/PDCP/SDAP/RRC/AS/NAS layer/entity. The PHY/MAC/RLC/PDCP/SDAP/RRC/AS/NAS layer/entity may be referred to the UE as well.

NW: this may be a network node, a TRP, a cell (e.g., an SpCell, a PCell, a PSCell, and/or an SCell), a eNB, a gNB, and/or a base station (BS).

Serving Cell: this may be a PCell, a PSCell, or an SCell. The serving cell may be an activated or a deactivated serving cell.

SpCell: for Dual Connectivity operation, the SpCell may refer to the PCell of an MCG or the PSCell of an SCG depending on if the MAC entity is associated to the MCG or the SCG, respectively. Alternatively, the SpCell may refer to the PCell.

$TA=T_A$ $N\_TA=N_{TA}$ $N\_TA\_offset=N_{TA, offset}$

The terms "RA-based SDT" and "RA-SDT" may be interchangeably used in some following implementations.

The terms "CG-based SDT" and "CG-SDT" may be interchangeably used in some following implementations.

The terms "initiate", "trigger", "apply", "store", "perform", and "start" may be interchangeably used in some following implementations.

The terms "terminate", "stop", "release", "suspend", "discard", "end", "complete", "abort", and "cancel" may be interchangeably used in some following implementations.

The terms "period", "process", "phase", and "duration" may be interchangeably used in some following implementations.

The terms "resource" and "occasion" may be interchangeably used in some following implementations.

The terms "ongoing", "running", and "pending" may be interchangeably used in some following implementations.

The terms "beam", "SSB", and "CSI-RS" may be interchangeably used in some following implementations.

The terms "select", "consider", and "determine" may be interchangeably used in some following implementations.

The terms "adjust" and "update" may be interchangeably used in some following implementations.

Two Different TA Timers

In some implementations, a UE may be configured with two different TA timers (simultaneously), e.g., based on two different IEs, for the maintenance of UL timing alignment. One of the timers may be referred to a TA timer, and the other of the timers may be referred to an SDT TA timer.

More details of the TA timer are introduced in the following discussion. In one example, the TA timer may be configured per TAG, per serving cell, per MAC entity, and/or per UE. In one example, the TA timer may be used to control how long the UE/MAC entity considers the Serving Cells belonging to the associated TAG to be UL time-aligned.

In one example, the TA timer may be configured by an IE timeAlignmentTimer and/or a timeAlignmentTimerCommon. In one aspect, the TA timer may be configured by SI/SIB1, e.g., via an IE UplinkConfigCommonSIB; in another aspect, the TA timer may be configured by a TAG-config, a MAC-CellGroupConfig, a CellGroupConfig, and/or an RRCReconfiguration.

In one example, the unit of the TA timer may include at least one of second (s), millisecond (ms), subframe, slot, symbol, infinity.

More details of the SDT TA timer are introduced in the following discussion. In one example, the SDT TA timer may be configured per TAG, per serving cell, per MAC entity, and/or per UE. In one example, the SDT TA timer may be used to control how long the UE/MAC entity considers the UL transmission for the SDT (and/or in the RRC_INACTIVE state) to be UL time-aligned. The SDT may be referred to an RA-SDT and/or a CG-SDT.

In one example, the SDT TA timer may be configured by an IE SDT-TimeAlignmentTimer, an RA-SDT-TimeAlignmentTimer, and/or a CG-SDT-TimeAlignmentTimer. The SDT TA timer may also be called an RA-SDT TA timer and/or a CG-SDT TA timer. In one aspect, the SDT TA timer may be configured by a dedicated RRC configuration. Specifically, the SDT TA timer may be configured by an SDT configuration (e.g., an sdt-Config). The UE may receive an RRC message (e.g., an RRC release message with a suspend configuration) including the SDT configuration. Specifically, the SDT TA timer may be configured by an RRC release message (and/or a suspend configuration).

In one aspect, the SDT TA timer may be configured by SI (e.g., an SIB1 or 'other SI'). Specifically, the SDT TA timer may be configured by a common SDT configuration (e.g., an sdt-ConfigCommon). The UE may receive SI (e.g., an SIB1 or 'other SI') including the common SDT configuration. Specifically, the SDT TA timer may be a cell-specific parameter.

In one aspect, the SDT TA timer may be configured in an RA configuration for the SDT (e.g., a RACH-ConfigSDT) and/or a CG configuration for the SDT (e.g., a CG-SDT-Config). The UE may receive SI (e.g., a SIB1 or 'other SI') including the RA configuration for the SDT and/or the CG configuration for the SDT. The UE may receive an RRC message (e.g., an RRC release message with a suspend configuration) including the RA configuration for the SDT and/or the CG configuration for the SDT.

In one example, the unit of the SDT TA timer may include at least one of s, ms, subframe, slot, symbol, infinity, and/or multiplies of periodicity of a CG-SDT configuration. Specifically, the unit and/or the value/length of the SDT TA timer may be configured the same as the TA timer.

In some implementations, the UE/MAC entity may not perform any UL transmission on a Serving Cell except the RA Preamble and the MSGA transmission when the TA timer associated with the TAG to which this Serving Cell belongs is not running. In some implementations, the UE/MAC entity may not perform any UL transmission on a Serving Cell except the small data transmission (e.g., a CG-SDT, an RA-SDT, a UL transmission in the SDT procedure) when the SDT TA timer is running.

In some implementations, when the TA timer associated with the PTAG is not running and when the SDT TA timer is not running, the UE/MAC entity may not perform any UL transmission on any Serving Cell except the RA Preamble and the MSGA transmission on the SpCell.

In some implementation, if the UE is configured with the SDT and is not configured with an SDT TA timer (e.g., in an SDT configuration or in a CG-SDT configuration), the UE may use the TA timer for the SDT procedure.

UE Behaviors on TA Timers/N_TA when Receiving RRC Release

Figure 5:
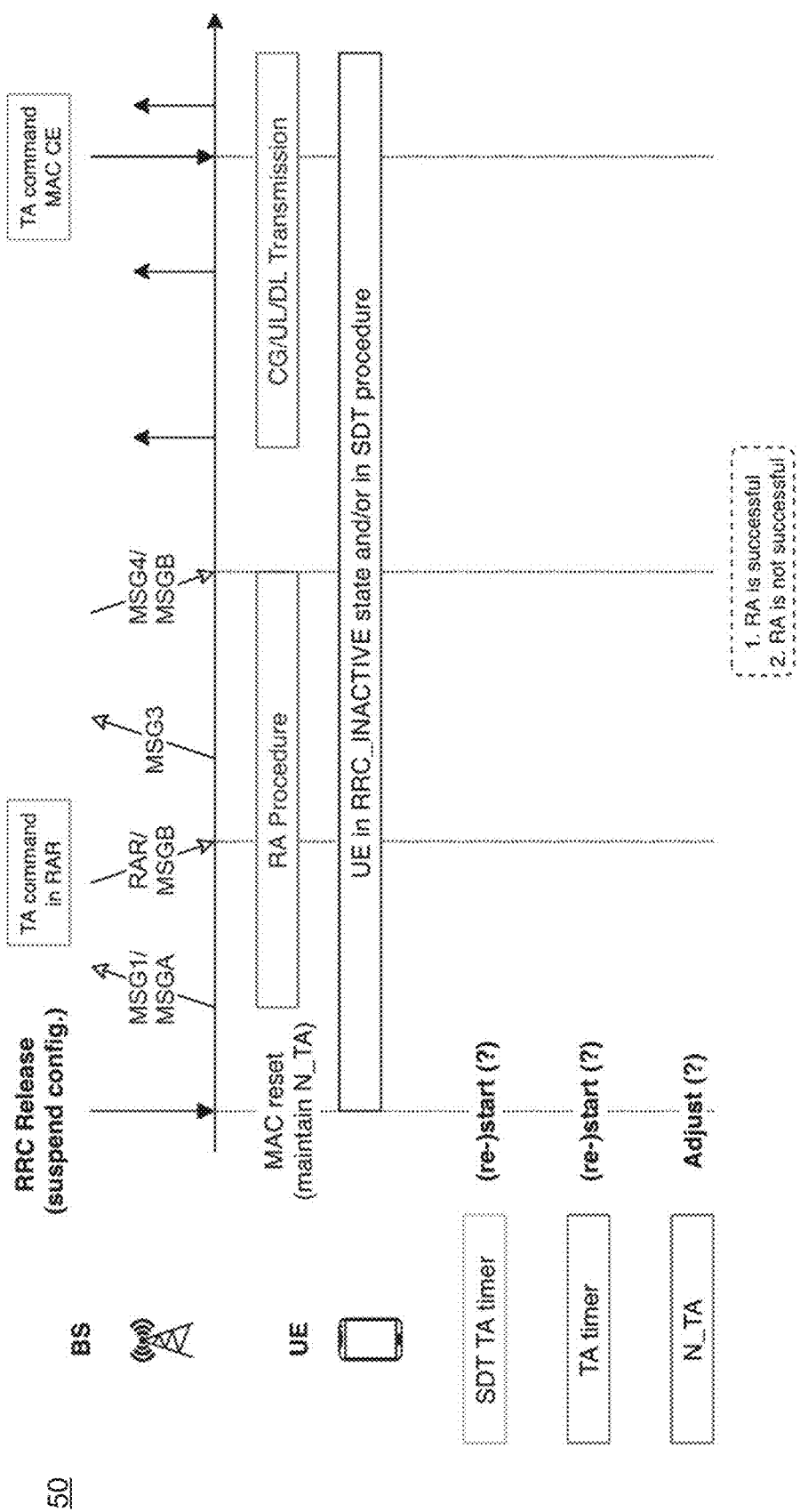
FIG. 5 illustrates a timing diagram of operations of a UE with a TA timer/N_TA upon receiving an RRC release message, according to an example implementation of the present disclosure.

FIG. 5 illustrates a timing diagram of operations 50 of a UE with a TA timer/N_TA upon receiving an RRC release message, according to an example implementation of the present disclosure. In some implementations, as shown FIG. 5, a UE may be configured with an SDT TA timer and a TA timer. The UE may reset the MAC and enter into the RRC_INACTIVE state when receiving an RRC release message (including a suspend configuration) from a serving cell. When the UE resets the MAC, the UE may consider all TA timers as expired and may maintain the N_TA (for the serving cell and/or for a TAG).

In one example, the TAG may be a PTAG. In one example, the TAG may be an indicated TAG by an RRC release message. In one example, the TAG may be indicated by the SDT configuration, the RA configuration for the SDT, the CG configuration for the SDT, and/or the configuration for the SDT TA. In one example, the TAG may be a TAG that includes the serving cell. For example, the configuration of the serving cell may include a TAG-ID of the TAG. In one example, the N_TA may be specifically maintained for the SDT/RRC_INACTIVE state. Specifically, the UE may maintain two N_TAs, where one N_TA is for the SDT/RRC_INACTIVE state and the other N_TA is not for the SDT/RRC_INACTIVE state.

SDT TA Timer/TA Timer

In some implementations, when the UE receives an RRC release message (including a suspend configuration) from a serving cell, the UE may determine whether to (re-)start an SDT TA timer and/or (re-)start a TA timer based on one or more of the following scenarios/conditions.

In one example, when an RRC layer of the UE receives the RRC release message (including a suspend configuration) from the serving cell, the RRC layer of the UE may indicate the MAC layer of the UE to (re-)start an SDT TA timer and/or (re-)start a TA timer when the RRC layer of the UE determines to (re-)start an SDT TA timer and/or (re-)start a TA timer. In one example, when a MAC layer of the UE receives the indication from the RRC layer of the UE to (re-)start an SDT TA timer and/or (re-)start a TA timer, the MAC layer of the UE may (re-)start an SDT TA timer and/or (re-)start a TA timer.

In some implementations, as shown in FIG. 5, when the UE receives an RRC release message (including a suspend configuration) from a serving cell, the UE may determine whether to (re-)start an SDT TA timer and/or (re-)start a TA timer based on whether the UE is configured with an SDT procedure (e.g., via an RRC reconfiguration message).

In one example, when the UE receives an RRC release message, the UE may (re-)start the SDT TA timer and (re-)start the TA timer if the UE is configured with an SDT configuration. In one example, when the UE receives an RRC release message, the UE may (re-)start the SDT TA timer and may not (re-)start the TA timer if the UE is configured with an SDT configuration.

In some implementations, as shown in FIG. 5, when the UE receives an RRC release message (including a suspend configuration) from a serving cell, the UE may determine whether to (re-)start an SDT TA timer and/or (re-)start a TA timer based on whether the RRC release message includes an SDT configuration.

In one example, when the UE receives an RRC release message, the UE may (re-)start the SDT TA timer and (re-)start the TA timer if the RRC release message includes an SDT configuration.

In one example, when the UE receives an RRC release message, the UE may (re-)start the SDT TA timer and may not (re-)start the TA timer if the RRC release message includes an SDT configuration.

In one example, when the UE receives an RRC release message, the ULE may not (re-)start the SDT TA timer and may (re-)start or may ignore the TA timer if the RRC release message does not include an SDT configuration. Specifically, the TA timer may be used for the SDT procedure if the SDT configuration is not configured. In one aspect, the TA timer may be considered as expired already, e.g., due to a MAC reset, or the TA timer may be stopped or considered as expired already, e.g., when the UE is performing the SDT procedure. In another aspect, the scenario/approach that the UE may not (re-)start the SDT TAtimer/TAtimer may include that the UE ignores or stops the SDT TAtimer/TA timer, or the SDT TA timer/TA timer is considered as expired.

In one example, when the UE receives an RRC release message, the UE may stop the SDT TA timer if the SDT TA timer is running but may or may not (re-)start or may ignore the TA timer if the RRC release message does not include an SDT configuration. In one aspect, the TA timer may be considered as expired already, e.g., due to a MAC reset, or the TA timer may be stopped or considered as expired already, e.g., when the UE is performing the SDT procedure. In another aspect, the scenario/approach that the UE may not (re-)start the SDT TA timer/TA timer may include that the UE ignores or stops the SDT TA timer/TA timer, or the SDT TA timer/TA timer is considered as expired.

In some implementations, as shown in FIG. 5, when the UE receives an RRC release message (including a suspend configuration) from a serving cell, the UE may determine whether to (re-)start an SDT TA timer and/or (re-)start a TA timer based on whether the RRC release message includes a configuration for the SDT TA (timer).

In one example, when the UE receives an RRC release message, the UE may (re-)start the SDT TA timer and (re-)start the TA timer if the RRC release message includes a configuration for the SDT TA (timer).

In one example, when the UE receives an RRC release message, the UE may (re-)start the SDT TA timer and may not (re-)start the TA timer if the RRC release message includes a configuration for the SDT TA (timer).

In one example, when the UE receives an RRC release message, the UE may not (re-)start the SDT TA timer and may (re-)start or ignore the TA timer if the RRC release message does not include a configuration for the SDT TA (timer). Specifically, the TA timer may be used for the SDT procedure if the SDT TA timer is not configured (e.g., in the SDT configuration or the CG-SDT configuration). In one aspect, the TA timer may be considered as expired already, e.g., due to a MAC reset, or the TA timer may be stopped or considered as expired already, e.g., when the UE is performing the SDT procedure. In another aspect, the scenario/approach that the UE may not (re-)start the SDT TA timer/TA timer may include that the UE ignores or stops the SDT TA timer/TA timer, or the SDT TA timer/TA timer is considered as expired, e.g., if the UE already stores an SDT TA timer/TA timer.

In some implementations, as shown in FIG. 5, when the UE receives an RRC release message (including a suspend configuration) from a serving cell, the UE may determine whether to (re-)start an SDT TA timer and/or (re-)start a TA timer based on whether the RRC release message includes a CG configuration/resource (for the SDT).

In one example, when the UE receives an RRC release message, the UE may (re-)start the SDT TA timer and (re-)start the TA timer if the RRC release message includes a CG configuration/resource (for the SDT).

In one example, when the UE receives an RRC release message, the UE may (re-)start the SDT TA timer and may not (re-)start the TA timer if the RRC release message includes a CG configuration/resource (for the SDT).

In one example, when the UE receives an RRC release message, the UE may not (re-)start the SDT TA timer and may (re-)start or ignore the TA timer if the RRC release message does not include a CG configuration/resource (for the SDT). Specifically, the TAtimer may be used for the SDT procedure if the CG configuration/resource (for the SDT) is not configured. In one aspect, the TA timer may be considered as expired already, e.g., due to a MAC reset, or the TA timer may be stopped or considered as expired already, e.g., when the UE is performing the SDT procedure. In another aspect, the scenario/approach that the UE may not (re-)start the SDT TA timer/TA timer may include that the UE ignores or stops the SDT TA timer/TAtimer, or the SDT TA timer/TA timer is considered as expired, e.g., if the UE already stores an SDT TA timer/TA timer.

In some implementations, as shown in FIG. 5, when the UE receives an RRC release message (including a suspend configuration) from a serving cell, the UE may determine whether to (re-)start an SDT TA timer and/or (re-)start a TA timer based on whether the RRC release message includes an RA configuration/resource (for the SDT).

In one example, when the UE receives an RRC release message, the UE may (re-)start the SDT TA timer and (re-)start the TA timer if the RRC release message includes an RA configuration/resource (for the SDT).

In one example, when the UE receives an RRC release message, the UE may (re-)start the SDT TA timer and may not (re-)start the TA timer if the RRC release message includes an RA configuration/resource (for the SDT).

In one example, when the UE receives an RRC release message, the UE may not (re-)start the SDT TA timer and may (re-)start/ignore the TA timer if the RRC release message does not include an RA configuration/resource (for the SDT). Specifically, the TA timer may be used for the SDT procedure if the RA configuration/resource (for the SDT) is not configured. In one aspect, the TA timer may be considered as expired already, e.g., due to a MAC reset, or the TA timer may be stopped or considered as expired already, e.g., when the UE is performing the SDT procedure. In another aspect, the scenario/approach that the UE may not (re-)start the SDT TA timer/TA timer may include that the UE ignores or stops the SDT TA timer/TA timer, or the SDT TA timer/TA timer is considered as expired, e.g., if the UE already stores an SDT TA timer.

In some implementations, the SDT TA timer and/or the TA timer may be associated with a TAG. In one example, the TAG may be a PTAG. In one example, the TAG may be an indicated TAG by an RRC release message (or be pre-configured via one RRCReconfiguration message prior to the RRC release message for the SDT preparation). The TAG may be indicated by the SDT configuration, the RA configuration for the SDT, the CG configuration for the SDT, and/or the configuration for the SDT TA. In one example, the TAG may be a TAG that includes the serving cell. Specifically, the configuration of the serving cell may include a TAG-ID of the TAG.

Apply TA Command/Adjust N_TA

In some implementations, the RRC release message, the SDT configuration, the RA configuration for the SDT, the CG configuration for the SDT, and/or the configuration for the SDT TA may indicate a specific TA command to the UE by the BS.

In one example, the specific TA command may indicate an index value TA used to control an amount of timing adjustment that is applied to the UE/MAC entity.

In one example, a field length of the TA command may be 12 bits or 6 bits. In one example, the UE may (re)start SDT TA timer/TA timer only while the specific TA command is received by the UE. In another example, the UE may not (re)start SDT TA timer/TA timer if UE does not receive the specific TA command.

In some implementations, as shown in FIG. 5, when the UE receives the RRC release message, the SDT configuration, the RA configuration for the SDT, the CG configuration for the SDT, and/or the configuration for the SDT TA, from a serving cell, to indicate to the UE a specific TA command, the UE may apply the specific TA command and/or adjust the N_TA based on the specific TA command (for the serving cell and/or a TAG).

In one example, the TAG may be a PTAG. In one example, the TAG may be an indicated TAG by an RRC release message (or be pre-configured via one RRCReconfiguration message prior to the RRC release message for the SDT preparation) and/or the specific TA command. In one example, the TAG may be indicated by the SDT configuration, the RA configuration for the SDT, the CG configuration for the SDT, and/or the configuration for the SDT TA. In one example, the TAG may be a TAG that includes the serving cell. Specifically, the configuration of the serving cell may include a TAG-ID of the TAG.

UE Behaviors on TA Timer/N_TA when Receiving TA Command in RAR/MSGB

Figure 6:
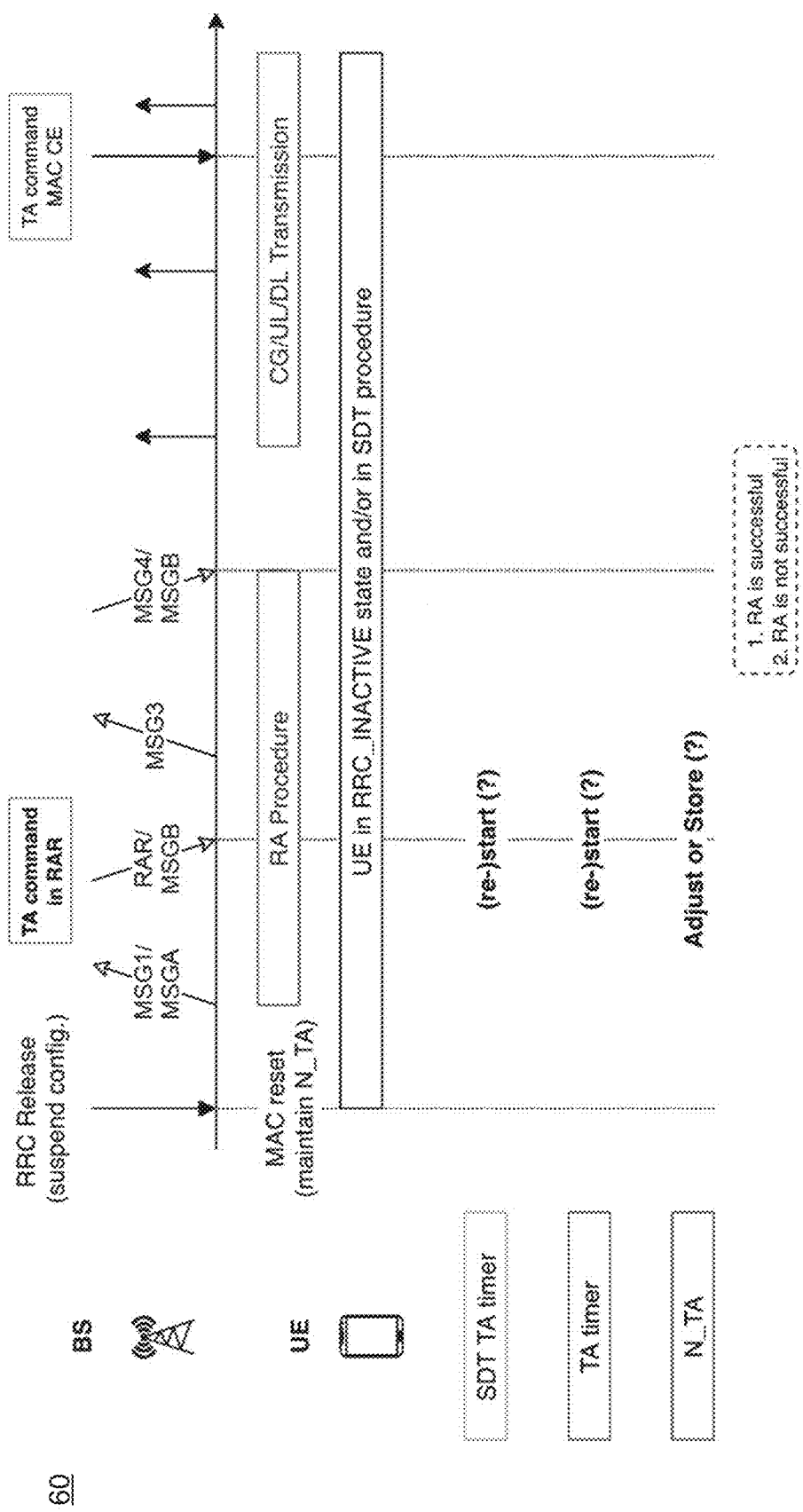
FIG. 6 illustrates a timing diagram of operations of a UE with a TA timer/N_TA upon receiving a TA command in a RAR or a MSGB, according to an example implementation of the present disclosure.

FIG. 6 illustrates a timing diagram of operations 60 of a UE with a TA timer/N_TA upon receiving a TA command in a RAR or a MSGB, according to an example implementation of the present disclosure. In some implementations, as shown in FIG. 6, a UE may be configured with an SDT TA timer and a TA timer. The UE may reset the MAC and enter into the RRC_INACTIVE state when receiving an RRC release message (including a suspend configuration) from a serving cell. When the UE resets the MAC, the UE may consider all TA timers as expired and may maintain an N_TA (for the serving cell and/or for a TAG).

In one example, the TAG may be a PTAG. In one example, the TAG may be an indicated TAG by an RRC release message (or be pre-configured via one RRCReconfiguration message prior to the RRC release message for the SDT preparation). In one example, the TAG may be indicated by the SDT configuration, the RA configuration for the SDT, the CG configuration for the SDT, and/or the configuration for the SDT TA. In one example, the TAG may be a TAG that includes the serving cell. Specifically, the configuration of the serving cell may include a TAG-ID of the TAG. In one example, the N_TA may be specifically maintained for the SDT/RRC_INACTIVE state. Specifically, the UE may maintain two N_TAs, where one N_TA is for the SDT/RRC_INACTIVE state and the other N_TA is not for the SDT/RRC_INACTIVE state.

In some implementations, as shown in FIG. 6, the UE (e.g., an RRC layer) in the RRC_INACTIVE state may initiate an SDT procedure (e.g., the resume procedure for the SDT, the RA-SDT, and/or the CG-SDT) when one or more or all of the following scenarios/conditions/examples are fulfilled.

In one example, the upper layers (e.g., an NAS layer) request resumption of an RRC connection (e.g., MO-data arrival from the upper layers). In one example, the UE supports the SDT. In one example, SI (e.g., an SIB1 or other SI) includes an sdt-ConfigCommon. In one example, all the pending data in UL is mapped to the RBs configured for the SDT.

In one example, lower layers (e.g., a MAC layer) indicate that conditions for initiating the SDT, as specified in TS 38.321, are fulfilled. In one aspect, the lower layers/MAC layer may indicate conditions for initiating the SDT when the UE initiates the SDT with a CG type 1 on a selected UL carrier. In one aspect, the lower layers/MAC layer may indicate conditions for initiating the SDT when the UE initiates an RA procedure on a selected UL carrier for the SDT.

In some implementations, the SDT procedure may be initiated (by the MAC layer of the UE) when one or more or all of the following scenarios/conditions/examples are fulfilled. In one example, if the data volume of the pending UL data across all logical channels configured for the SDT is less than or equal to a data volume threshold (e.g., an sdt-DataVolumeThreshold). In one example, if the RSRP of the DL pathloss reference is higher than an RSRP threshold (e.g., an sdt-RSRP-Threshold), if configured.

In some implementations, as shown in FIG. 6, the UE may initiate an RA procedure while in the UE is in the RRC_INACTIVE state and/or in the SDT procedure.

In one example, the RA procedure may be an RA procedure with a 2-step RA type or a 4-step RA type. The RA procedure may be a contention-based RA procedure.

In one example, the RA procedure may be initiated for the SDT. In one aspect, the UE may perform the RA preamble transmission via the RA preamble/RA resource/PRACH resource that is configured for the SDT. In one aspect, the UE may apply the RA configurations/IEs that are configured for the SDT (e.g., via a RACH-ConfigSDT, a RACH-ConfigCommonSDT).

In one example, the RA procedure may be initiated not for the SDT. The RA procedure may be initiated for a CCCH logical channel. The RA procedure may be initiated for an RRC connection resume. In one aspect, the UE may perform the RA preamble transmission via the RA preamble/RA resource/PRACH resource that is not configured for the SDT. In one aspect, the UE may apply the RA configurations/IEs that are not configured for the SDT (e.g., via a RACH-ConfigCommon, a RACH-ConfigGeneric, a RACH-ConfigDedicated, a RACH-ConfigCommonTwoStepRA, and/or a RACH-ConfigGenericTwoStepRA).

In some implementations, as shown in FIG. 6, the UE may receive a TA command in a RAR or an MSGB during the RA procedure. In one example, the TA command field in the RAR or the MSGB may indicate the index value TA used to control an amount of timing adjustment that is applied to the UE/MAC entity, as specified in 3GPP TS 38.213. Specifically, a size of the TA Command field may be 12 bits. In one example, the TA command may be included in a MAC payload for the RAR. The MAC payload for the RAR may be referred to the MAC RAR, as specified in 3GPP TS 38.321. In one example, the TA command may be included in a MAC payload for the MSGB. The MAC payload for the MSGB may be referred to a fallbackRAR and/or a successRAR, as specified in 3GPP TS 38.321.

SDT TA Timer/TA Timer

In some implementations, as shown in FIG. 6, when the UE receives a TA command in a RAR or MSGB during the RA procedure from a serving cell, the UE may determine whether to (re-)start an SDT TA timer and/or (re-)start a TA timer.

In one example, when the UE receives a TA command in a RAR or MSGB, the UE may (re-)start the SDT TA timer and may (re-)start the TA timer. In one example, when the UE receives a TA command in a RAR or MSGB, the UE may (re-)start the SDT TA timer and may not (re-)start the TA timer. In one example, when the UE receives a TA command in a RAR or MSGB, the UE may not (re-)start the SDT TA timer and may (re-)start the TA timer. In one example, when the UE receives a TA command in a RAR or MSGB, the UE may not (re-)start the SDT TA timer and may not (re-)start the TA timer.

In some implementations, when the UE receives a TA command in a RAR or MSGB during the RA procedure from a serving cell, the UE may determine whether to (re-)start an SDT TA timer and/or (re-)start a TA timer based on one or more of the following scenarios/criteria.

In some implementations, as shown in FIG. 6, when the UE receives a TA command in a RAR or MSGB during the RA procedure from a serving cell, the UE may determine whether to (re-)start an SDT TA timer and/or (re-)start a TA timer based on the purpose of the RA procedure.

In one example, when the UE receives a TA command in a RAR or MSGB, the UE may (re-)start the SDT TA timer and may (re-)start the TA timer if the RA procedure is initiated for the SDT (e.g., an RA-based SDT). In one example, when the UE receives a TA command in a RAR or MSGB, the UE may (re-)start the SDT TA timer and may not (re-)start the TA timer if the RA procedure is initiated for the SDT (e.g., an RA-based SDT). In one example, when the UE receives a TA command in a RAR or MSGB, the UE may not (re-)start the SDT TA timer and may (re-)start the TA timer if the RA procedure is initiated for the SDT (e.g., an RA-based SDT). In one example, when the UE receives a TA command in a RAR or MSGB, the UE may not (re-)start the SDT TA timer and may not (re-)start the TA timer if the RA procedure is initiated for the SDT (e.g., an RA-based SDT). In one example, when the UE receives a TA command in a RAR or MSGB, the UE may not (re-)start the SDT TA timer if the RA procedure is not initiated for the SDT (e.g., the RA procedure is not an RA-based SDT).

In some implementations, as shown in FIG. 6, when the UE receives a TA command in a RAR or MSGB during the RA procedure from a serving cell, the UE may determine whether to (re-)start an SDT TA timer and/or (re-)start a TA timer based on whether the UE is configured with an SDT configuration, an RA configuration for the SDT, and/or a CG configuration for the SDT.

In one example, when the UE receives a TA command in a RAR or MSGB, the UE may (re-)start the SDT TA timer and may (re-)start the TA timer if the UE is configured with an SDT configuration, an RA configuration for the SDT, and/or a CG configuration for the SDT. In one example, when the UE receives a TA command in a RAR or MSGB, the UE may (re-)start the SDT TA timer and may not (re-)start the TA timer if the UE is configured with an SDT configuration, an RA configuration for the SDT, and/or a CG configuration for the SDT. In one example, when the UE receives a TA command in a RAR or MSGB, the UE may not (re-)start the SDT TA timer and may (re-)start the TA timer if the UE is configured with an SDT configuration, an RA configuration for the SDT, and/or a CG configuration for the SDT. In one example, when the UE receives a TA command in a RAR or MSGB, the UE may not (re-)start the SDT TA timer and may not (re-)start the TA timer if the UE is configured with an SDT configuration, an RA configuration for the SDT, and/or a CG configuration for the SDT. In one example, when the UE receives a TA command in a RAR or MSGB, the UE may not (re-)start the SDT TA timer and may (re-)start or may ignore the TA timer if the UE is not configured with an SDT configuration, an RA configuration for the SDT, and/or a CG configuration for the SDT. Specifically, the TA timer may be used for the SDT procedure if the UE is not configured with the SDT configuration, the RA configuration for the SDT, and/or the CG configuration for the SDT.

In some implementations, as shown in FIG. 6, when the UE receives a TA command in a RAR or MSGB during the RA procedure from a serving cell, the UE may determine whether to (re-)start an SDT TA timer and/or (re-)start a TA timer based on whether the UE is in the RRC_INACTIVE state.

In one example, when the UE receives a TA command in a RAR or MSGB, the UE may (re-)start the SDT TA timer and may (re-)start the TA timer if the UE is in the RRC_INACTIVE state. In one example, when the UE receives a TA command in a RAR or MSGB, the UE may (re-)start the SDT TA timer and may not (re-)start the TA timer if the UE is in the RRC_INACTIVE state. In one example, when the UE receives a TA command in a RAR or MSGB, the UE may not (re-)start the SDT TA timer and may (re-)start the TA timer if the UE is in the RRC_INACTIVE state. In one example, when the UE receives a TA command in a RAR or MSGB, the UE may not (re-)start the SDT TA timer and may not (re-)start the TA timer if the UE is in the RRC_INACTIVE state.

In some implementations, as shown in FIG. 6, when the UE receives a TA command in a RAR or MSGB during the RA procedure from a serving cell, the UE may determine whether to (re-)start an SDT TA timer and/or (re-)start a TA timer based on a specific indication in the TA command. Specifically, the specific indication may indicate that the TA command is for the SDT or not. The specific indication may indicate that the TA command is for the RRC_INACTIVE state or not.

In one example, a first value of the specific indication may be used to indicate that the TA command is for the SDT. A second value of the specific indication may be used to indicate that the TA command is not for the SDT. In one example, the UE may (re)start the SDT TA timer if the first value is indicated. The UE may not (re)start the SDT TA timer if the second value is indicated. In one example, the specific indication may also be indicated in the PDCCH that schedules the RAR/MSGB, the MAC subheader for the RAR/MSGB, and/or the MAC payload for the RAR/MSGB. In one example, when the UE receives a TA command in a RAR or MSGB, the UE may (re-)start the SDT TA timer and may (re-)start the TA timer if the UE receives the specific indication in the TA command. In one example, when the UE receives a TA command in a RAR or MSGB, the UE may (re-)start the SDT TA timer and may not (re-)start the TA timer if the UE receives the specific indication in the TA command. In one example, when the UE receives a TA command in a RAR or MSGB, the UE may not (re-)start the SDT TA timer and may (re-)start the TA timer if the TA command does not include the specific indication. In one example, when the UE receives a TA command in a RAR or MSGB, the UE may not (re-)start the SDT TA timer and may not (re-)start the TA timer if the TA command does not include the specific indication.

In some implementations, as shown in FIG. 6, when the UE receives a TA command in a RAR or MSGB during the RA procedure from a serving cell, the UE may determine whether to (re-)start an SDT TA timer and/or (re-)start a TA timer based on whether the SDT TA timer and/or the TA timer is running.

In one example, when the UE receives a TA command in a RAR or MSGB, the UE may (re-)start the SDT TA timer if the SDT TA timer is running. In one example, when the UE receives a TA command in a RAR or MSGB, the UE may (re-)start the SDT TA timer if the SDT TA timer is not running. In one example, when the UE receives a TA command in a RAR or MSGB, the UE may not (re-)start the SDT TA timer if the SDT TA timer is running. In one example, when the UE receives a TA command in a RAR or MSGB, the UE may (re-)start the TA timer if the TA timer is not running. In one example, when the UE receives a TA command in a RAR or MSGB, the UE may not (re-)start the TA timer if the TA timer is running.

In some implementations, the SDT TA timer and/or the TA timer may be associated with a TAG. In one example, the TAG may be a PTAG. In one example, the TAG may be an indicated TAG by an RRC release message. The TAG may be indicated by the SDT configuration, the RA configuration for SDT, the CG configuration for the SDT, and/or the configuration for the SDT TA. In one example, the TAG may be a TAG that includes the serving cell. Specifically, the configuration of the serving cell may include a TAG-ID of the TAG.

N_TA/Temporary N_TA

In some implementations, as shown in FIG. 6, when the UE receives a TA command in a RAR or MSGB during the RA procedure from a serving cell, the UE may determine whether to store the N_TA (as a temporary N_TA). Specifically, when the UE receives a TA command in a RAR or MSGB, the UE may store the N_TA (as a temporary N_TA).

In one example, the N_TA may be the previously maintained N_TA that may be stored (as a temporary N_TA) by the UE. For example, the previously maintained N_TA value may be an N_TA value before applying the received Timing Advance Command. In one example, the stored (temporary) N_TA may be set as the (maintained) N_TA if the RA procedure (or its contention resolution) is considered as unsuccessfully completed.

In one example, the UE may set the N_TA value to the value before applying the received Timing Advance Command if the RA procedure (or its contention resolution) is considered as unsuccessfully completed. In one aspect, the UE may remove/delete/release/discard the stored (temporary) N_TA after setting it as the (maintained) N_TA.

In one example, the stored (temporary) N_TA may be removed/deleted/released/discarded if the RA procedure (or its contention resolution) is considered as successfully completed.

In some implementations, as shown in FIG. 6, when the UE receives a TA command in a RAR or MSGB during the RA procedure from a serving cell, the UE may determine whether to store an N_TA received in the TA command in the RAR or MSGB (as a temporary N_TA). Specifically, when the UE receives a TA command in a RAR or MSGB, the UE may store the N_TA received in the TA command in the RAR or MSGB (as a temporary N_TA).

In one example, the stored (temporary) N_TA may be removed/deleted/released/discarded if the RA procedure (or its contention resolution) is considered as unsuccessfully completed.

In one example, the stored (temporary) N_TA may be set as the (maintained) N_TA if the RA procedure (or its contention resolution) is considered as successfully completed. In one aspect, the UE may remove/delete/release/discard the stored (temporary) N_TA after setting it as the (maintained) N_TA.

In some implementations, when the UE receives a TA command in a RAR or MSGB during the RA procedure from a serving cell, the UE may determine whether to store the N_TA (as a temporary N_TA) based on one or more of the following scenarios/criteria.

In some implementations, as shown in FIG. 6, when the UE receives a TA command in a RAR or MSGB during the RA procedure from a serving cell, the UE may determine whether to store the N_TA (as a temporary N_TA) based on the purpose of the RA procedure. In one example, when the UE receives a TA command in a RAR or MSGB, the UE may store the N_TA (as a temporary N_TA) if the RA procedure is initiated for the SDT. In one example, when the UE receives a TA command in a RAR or MSGB, the UE may not store the N_TA (as a temporary N_TA) if the RA procedure is not initiated for the SDT.

In some implementations, as shown in FIG. 6, when the UE receives a TA command in a RAR or MSGB during the RA procedure from a serving cell, the UE may determine whether to store the N_TA (as a temporary N_TA) based on whether the UE is configured with an SDT configuration, an RA configuration for the SDT, and/or a CG configuration for the SDT. In one example, when the UE receives a TA command in a RAR or MSGB, the UE may store the N_TA (as a temporary N_TA) if the UE is configured with an SDT configuration, an RA configuration for the SDT, and/or a CG configuration for the SDT. In one example, when the UE receives a TA command in a RAR or MSGB, the UE may not store the N_TA (as a temporary N_TA) if the UE is not configured with an SDT configuration, an RA configuration for the SDT, and/or a CG configuration for the SDT.

In some implementations, as shown in FIG. 6, when the UE receives a TA command in a RAR or MSGB during the RA procedure from a serving cell, the UE may determine whether to store the N_TA (as a temporary N_TA) based on whether the UE is in the RRC_INACTIVE state. In one example, when the UE receives a TA command in a RAR or MSGB, the UE may store the N_TA (as a temporary N_TA) if the UE is in the RRC_INACTIVE state. In one example, when the UE receives a TA command in a RAR or MSGB, the UE may not store the N_TA (as a temporary N_TA) if the UE is in not the RRC_INACTIVE state.

In some implementations, as shown in FIG. 6, when the UE receives a TA command in a RAR or MSGB during the RA procedure from a serving cell, the UE may determine whether to store the N_TA (as a temporary N_TA) based on a specific indication in the TA command. Specifically, the specific indication may indicate that the TA command is for the SDT or not. the specific indication may indicate that the TA command is for the RRC_INACTIVE state or not. In one example, when the UE receives a TA command in a RAR or MSGB, the UE may store the N_TA (as a temporary N_TA) if the UE receives the specific indication in the TA command.

In some implementations, as shown in FIG. 6, when the UE receives a TA command in a RAR or MSGB during the RA procedure from a serving cell, the UE may determine whether to store the N_TA (as a temporary N_TA) based on whether the N_TA has been maintained. Specifically, the N_TA may be maintained before receiving the TA command. In one example, when the UE receives a TA command in a RAR or MSGB, the UE may store the N_TA (as a temporary N_TA) if the N_TA has been maintained. In one example, when the UE receives a TA command in a RAR or MSGB, the UE may not store the N_TA (as a temporary N_TA) if the N_TA has not been maintained.

In some implementations, as shown in FIG. 6, when the UE receives a TA command in a RAR or MSGB during the RA procedure from a serving cell, the UE may determine whether to store the N_TA (as a temporary N_TA) based on whether a temporary N_TA has been stored. Specifically, the temporary N_TA may be stored before receiving the TA command. In one example, when the UE receives a TA command in a RAR or MSGB, the UE may store the N_TA (as a temporary N_TA) if a temporary N_TA has not been stored. In one example, when the UE receives a TA command in a RAR or MSGB, the UE may not store the N_TA (as a temporary N_TA) if a temporary N_TA has been stored.

Apply TA Command/Adjust N_TA

In some implementations, as shown in FIG. 6, when the UE receives a TA command in a RAR or MSGB during the RA procedure from a serving cell, the UE may determine whether to apply the TA command and/or adjust the N_TA. In one example, when the UE receives a TA command in a RAR or MSGB, the UE may apply the TA command and/or may adjust the N_TA. In one example, when the UE receives a TA command in a RAR or MSGB, the UE may not apply the TA command and/or may not adjust the N_TA.

In some implementations, when the UE receives a TA command in a RAR or MSGB during the RA procedure from a serving cell, the UE may determine whether to apply the TA command and/or adjust the N_TA based on one or more of the following scenarios/criteria.

In some implementations, as shown in FIG. 6, when the UE receives a TA command in a RAR or MSGB during the RA procedure from a serving cell, the UE may determine whether to apply the TA command and/or adjust the N_TA based on the purpose of the RA procedure. In one example, when the UE receives a TA command in a RAR or MSGB, the UE may apply the TA command and/or may adjust the N_TA if the RA procedure is initiated for the SDT. In one example, when the UE receives a TA command in a RAR or MSGB, the UE may not apply the TA command and/or may not adjust the N_TA if the RA procedure is initiated for the SDT.

In some implementations, as shown in FIG. 6, when the UE receives a TA command in a RAR or MSGB during the RA procedure from a serving cell, the UE may determine whether to apply the TA command and/or adjust the N_TA based on whether the UE is configured with an SDT configuration, an RA configuration for the SDT, and/or a CG configuration for the SDT. In one example, when the UE receives a TA command in a RAR or MSGB, the UE may apply the TA command and/or may adjust the N_TA if the UE is configured with an SDT configuration, an RA configuration for the SDT, and/or a CG configuration for the SDT. In one example, when the UE receives a TA command in a RAR or MSGB, the UE may not apply the TA command and/or may not adjust the N_TA if the UE is configured with an SDT configuration, an RA configuration for the SDT, and/or a CG configuration for the SDT.

In some implementations, as shown in FIG. 6, when the UE receives a TA command in a RAR or MSGB during the RA procedure from a serving cell, the UE may determine whether to store the N_TA (as a temporary N_TA) based on whether the UE is in the RRC_INACTIVE state. In one example, when the UE receives a TA command in a RAR or MSGB, the UE may apply the TA command and/or may adjust the N_TA if the UE is in the RRC_INACTIVE state. In one example, when the UE receives a TA command in a RAR or MSGB, the UE may not apply the TA command and/or may not adjust the N_TA if the UE is in the RRC_INACTIVE state.

In some implementations, as shown in FIG. 6, when the UE receives a TA command in a RAR or MSGB during the RA procedure from a serving cell, the UE may determine whether to apply the TA command and/or adjust the N_TA based on a specific indication in the TA command. Specifically, the specific indication may indicate that the TA command is for the SDT or not. The specific indication may indicate that the TA command is for the RRC_INACTIVE state or not. In one example, when the UE receives a TA command in a RAR or MSGB, the UE may apply the TA command and/or may adjust the N_TA if the UE receives the specific indication in the TA command. In one example, when the UE receives a TA command in a RAR or MSGB, the UE may not apply the TA command and/or may not adjust the N_TA if the UE does not receive the specific indication in the TA command.

In some implementations, as shown in FIG. 6, when the UE receives a TA command in a RAR or MSGB during the RA procedure from a serving cell, the UE may determine whether to apply the TA command and/or adjust the N_TA based on whether the SDT TA timer and/or the TA timer is running. In one example, when the UE receives a TA command in a RAR or MSGB, the UE may apply the TA command and/or adjust the N_TA if the SDT TA timer and/or the TA timer is not running. In one example, when the UE receives a TA command in a RAR or MSGB, the UE may apply the TA command and/or adjust the N_TA if the SDT TA timer and/or the TA timer is running. In one example, when the UE receives a TA command in a RAR or MSGB, the UE may ignore the TA command if the SDT TA timer and/or the TA timer is not running. In one example, when the UE receives a TA command in a RAR or MSGB, the UE may ignore the TA command if the SDT TA timer and/or the TA timer is running.

UE Behaviors on TA Timer/N_TA Based on Whether RA IS Successful

Figure 7:
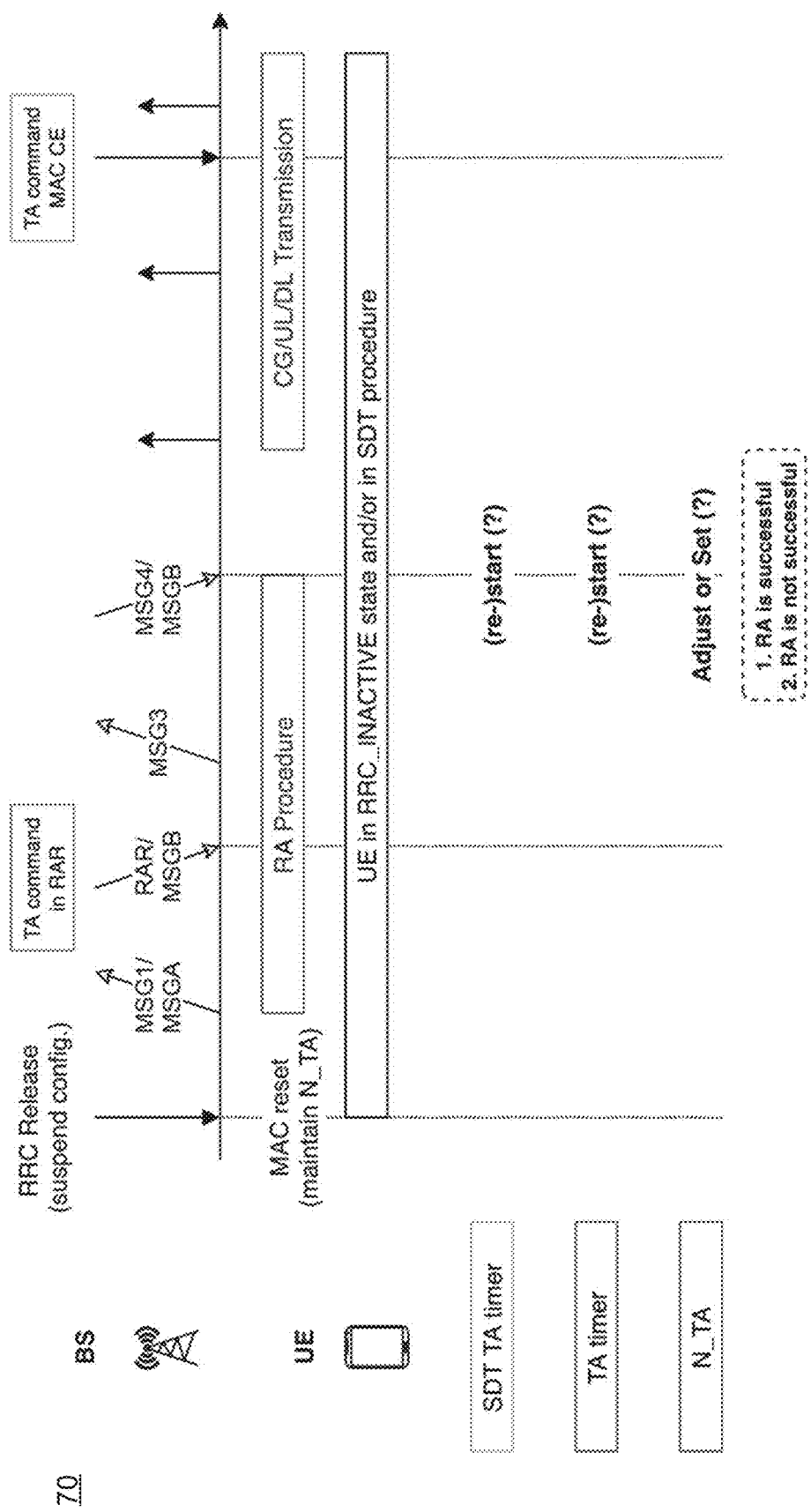
FIG. 7 illustrates a timing diagram of operations of a UE with a TA timer/N_TA based on whether an RA procedure is successful, according to an example implementation of the present disclosure.

FIG. 7 illustrates a timing diagram of operations 70 of a UE with a TA timer/N_TA based on whether an RA procedure is successful, according to an example implementation of the present disclosure. In some implementations, as shown in FIG. 7, a UE may be configured with an SDT TA timer and a TA timer. The UE may reset a MAC and enter into the RRC_INACTIVE state when receiving an RRC release message (including a suspend configuration) from a serving cell. When the UE resets the MAC, the UE may consider all TA timers as expired and may maintain an N_TA (for the serving cell and/or for a TAG).

In one example, the TAG may be a PTAG. In one example, the TAG may be an indicated TAG by an RRC release message (or be pre-configured via one RRCReconfiguration message prior to the RRC release message for the SDT preparation). In one example, the TAG may be indicated by the SDT configuration, the RA configuration for the SDT, the CG configuration for the SDT, and/or the configuration for the SDT TA. In one example, the TAG may be a TAG that includes the serving cell. Specifically, the configuration of the serving cell may include a TAG-ID of the TAG. In one example, the N_TA may be specifically maintained for the SDT/RRC_INACTIVE state. Specifically, the UE may maintain two N_TAs, where one N_TA is for the SDT/RRC_INACTIVE state and the other N_TA is not for the SDT/RRC_INACTIVE state.

In some implementations, as shown in FIG. 7, the UE (e.g., an RRC layer) in the RRC_INACTIVE state may initiate an SDT procedure (e.g., the resume procedure for the SDT, the RA-SDT, and/or the CG-SDT) when one or more or all of the following scenarios/conditions/examples are fulfilled.

In one example, the upper layers/NAS layer request resumption of an RRC connection (e.g., MO-data arrival from the upper layers). In one example, the UE supports the SDT. In one example, the SI (e.g., SIB1 and/or other SI) includes an sdt-ConfigCommon. In one example, all the pending data in the UL is mapped to the RBs configured for the SDT.

In one example, lower layers/MAC layer indicate that conditions for initiating the SDT, as specified in 3GPP TS 38.321, are fulfilled. In one aspect, the lower layers/MAC layer may indicate conditions for initiating the SDT when the UE initiates the SDT with a CG type 1 on a selected UL carrier. In one aspect, the lower layers/MAC layer may indicate conditions for initiating the SDT when the UE initiates an RA procedure on a selected UL carrier for the SDT.

In one example, the SDT procedure may be initiated (by a MAC layer of the UE) when one or more or all of the following scenarios/conditions/aspects are fulfilled. In one aspect, the SDT procedure may be initiated if the data volume of the pending UL data across all logical channels configured for the SDT is less than or equal to a data volume threshold (e.g., an sdt-DataVolumeThreshold). In one aspect, the SDT procedure may be initiated if the RSRP of the DL pathloss reference is higher than an RSRP threshold (e.g., an sdt-RSRP-Threshold), if configured.

In some implementations, as shown in FIG. 7, the UE may initiate an RA procedure while in the RRC_INACTIVE state and/or in the SDT procedure (e.g., when the CG-SDT procedure and/or the RA-SDT procedure is ongoing). In one example, the RA procedure may be an RA procedure with a 2-step RA type or a 4-step RA type. The RA procedure may be a contention-based RA procedure.

In one example, the RA procedure may be initiated for the SDT. In one aspect, the UE may perform the RA preamble transmission via the RA preamble/RA resource/PRACH resource that is configured for the SDT. In one aspect, the UE may apply the RA configurations/IEs that are configured for the SDT (e.g., via a RACH-ConfigSDT, a RACH-ConfigCommonSDT).

In one example, the RA procedure may not be initiated for the SDT. The RA procedure may be initiated for a CCCH logical channel. The RA procedure may be initiated for an RRC connection resume. In one aspect, the UE may perform the RA preamble transmission via the RA preamble/RA resource/PRACH resource that is not configured for the SDT. In one aspect, the UE may apply the RA configurations/IEs that are not configured for the SDT (e.g., via a RACH-ConfigCommon, a RACH-ConfigGeneric, a RACH-ConfigDedicated, a RACH-ConfigCommonTwoStepRA, and/or a RACH-ConfigGenericTwoStepRA).

In some implementations, as shown in FIG. 7, when the UE is performing the RA procedure, the UE may determine/consider whether the RA procedure is successfully completed based on some following scenarios/criteria/examples. In one example, the UE may determine/consider the RA procedure is successfully completed if the UE determines/considers that the contention resolution of the RA procedure is successful. In one example, the UE may determine/consider the RA procedure is unsuccessfully completed if the UE determines/considers that the contention resolution of the RA procedure is unsuccessful. In one example, the UE may determine/consider the RA procedure is unsuccessfully completed if PREAMBLE TRANSMISSION COUNTER=preamble TransMax+1.

In some implementations, as shown in FIG. 7, the UE may determine whether to (re-)start an SDT TA timer and/or (re-)start a TA timer based on whether the RA procedure is successfully completed. In one example, when the UE determines/considers that the RA procedure is successfully completed, the UE may (re-)start the SDT TA timer and may (re-)start the TA timer. In one example, when the UE determines/considers that the RA procedure is successfully completed, the UE may (re-)start the SDT TA timer and may not (re-)start the TA timer. In one example, when the UE determines/considers that the RA procedure is unsuccessfully completed, the UE may stop the SDT TA timer and/or may stop the TA timer. In one example, when the UE determines/considers that the RA procedure is unsuccessfully completed, the UE may consider the SDT TAtimer and/or the TAtimer as expired.

In some implementations, as shown in FIG. 7, when the UE determines/considers that the RA procedure is successfully completed, the UE may determine whether to (re-)start an SDT TA timer and/or (re-)start a TA timer based on the purpose of the RA procedure. In one example, when the UE determines/considers that the RA procedure is successfully completed, the UE may (re-)start the SDT TA timer and may (re-)start the TA timer if the RA procedure is initiated for the SDT. In one example, when the UE determines/considers that the RA procedure is successfully completed, the UE may (re-)start the SDT TA timer and may not (re-)start the TA timer if the RA procedure is initiated for the SDT.

In some implementations, as shown in FIG. 7, when the UE determines/considers that the RA procedure is successfully completed, the UE may determine whether to (re-)start an SDT TA timer and/or (re-)start a TA timer based on whether the UE is configured with an SDT configuration, an RA configuration for the SDT, and/or a CG configuration for the SDT. In one example, when the UE determines/considers that the RA procedure is successfully completed, the UE may (re-)start the SDT TA timer and may (re-)start the TA timer if the UE is configured with the SDT configuration, the RA configuration for the SDT, and/or the CG configuration for the SDT. In one example, when the UE determines/considers that the RA procedure is successfully completed, the UE may (re-)start the SDT TA timer and may not (re-)start the TA timer if the UE is configured with the SDT configuration, the RA configuration for the SDT, and/or the CG configuration for the SDT. In one example, when the UE determines/considers that the RA procedure is successfully completed, the UE may not (re-)start the SDT TA timer and may (re-)start or may ignore the TA timer if the UE is not configured with the SDT configuration, the RA configuration for the SDT, and/or the CG configuration for the SDT. Specifically, the TA timer may be used for the SDT procedure if the UE is not configured with the SDT configuration, the RA configuration for the SDT, and/or the CG configuration for the SDT.

In some implementations, as shown in FIG. 7, when the UE determines/considers that the RA procedure is successfully completed, the UE may determine whether to (re-)start an SDT TA timer and/or (re-)start a TA timer based on whether the UE is in the RRC_INACTIVE state. In one example, when the UE determines/considers that the RA procedure is successfully completed, the UE may (re-)start the SDT TA timer and may (re-)start the TA timer if the UE is in the RRC_INACTIVE state. In one example, when the UE determines/considers that the RA procedure is successfully completed, the UE may (re-)start the SDT TA timer and may not (re-)start the TA timer if the UE is in the RRC_INACTIVE state.

In some implementations, as shown in FIG. 7, when the UE determines/considers that the RA procedure is successfully completed, the UE may determine whether to (re-)start an SDT TA timer and/or (re-)start a TA timer based on whether the SDT TA timer and/or the TA timer is running. In one example, when the UE determines/considers that the RA procedure is successfully completed, the UE may (re-)start the SDT TA timer if the SDT TA timer is not running. In one example, when the UE determines/considers that the RA procedure is successfully completed, the UE may (re-)start the SDT TA timer if the SDT TA timer is running.

In some implementations, as shown in FIG. 7, when the UE determines/considers that the RA procedure is successfully completed, the UE may determine whether to (re-)start the SDT TA timer and/or (re-)start the TA timer based on whether the UE has stored a (temporary) N_TA (e.g., when receiving a TA command in a RAR or MsgB during the RA procedure). In one example, when the UE determines/considers that the RA procedure is successfully completed, the UE may (re-)start the SDT TA timer if the UE has stored a (temporary) N_TA. In one example, when the UE determines/considers that the RA procedure is successfully completed, the UE may not (re-)start the SDT TA timer if the UE has stored a (temporary) N_TA. In one example, when the UE determines/considers that the RA procedure is successfully completed, the UE may (re-)start the TA timer if the UE has stored a (temporary) N_TA. In one example, when the UE determines/considers that the RA procedure is successfully completed, the UE may not (re-)start the TA timer if the UE has stored a (temporary) N_TA.

In some implementations, as shown in FIG. 7, when the UE determines/considers that the RA procedure is unsuccessfully completed, the UE may not (re-)start an SDT TA timer and/or may not (re-)start a TA timer.

In some implementations, as shown in FIG. 7, when the UE determines/considers that the RA procedure is unsuccessfully completed, the UE may determine whether to (re-)start the SDT TA timer and/or (re-)start the TA timer based on whether the UE has stored a (temporary) N_TA (e.g., when receiving a TA command in a RAR or MsgB during the RA procedure). In one example, when the UE determines/considers that the RA procedure is unsuccessfully completed, the UE may not (re-)start the SDT TA timer if the UE has stored a (temporary) N_TA. In one example, when the UE determines/considers that the RA procedure is unsuccessfully completed, the UE may not (re-)start the SDT TA timer if the UE has not stored a (temporary) N_TA.

In some implementations, the SDT TA timer and/or the TA timer may be associated with a TAG. In one example, the TAG may be a PTAG. In one example, the TAG may be an indicated TAG by an RRC release message. The TAG may be indicated by the SDT configuration, the RA configuration for the SDT, the CG configuration for the SDT, and/or the configuration for the SDT TA. In one example, the TAG may be a TAG that includes the serving cell. Specifically, the configuration of the serving cell may include a TAG-ID of the TAG.

N_TA/Temporary N_TA

In some implementations, when the UE receives a TA command in a RAR or MSGB, the UE may store the N_TA (as a temporary N_TA). Specifically, the N_TA may be the previously maintained N_TA that may be stored (as a temporary N_TA) by the UE. In one example, the UE may set the N_TA to the stored (temporary) N_TA if the RA procedure (or its contention resolution) is determined/considered as unsuccessfully completed. Specifically, the stored (temporary) N_TA value may be an N_TA value before applying the received Timing Advance Command.

In one example, the UE may set the N_TA value to the value before applying the received TA Command if the RA procedure (or its contention resolution) is considered as unsuccessfully completed. In one example, the UE may remove/delete/release/discard the stored (temporary) N_TA after setting it as the (maintained) N_TA. In one example, the stored (temporary) N_TA may be removed/deleted/released/discarded if the RA procedure (or its contention resolution) is determined/considered as successfully completed. In one example, the UE may update the N_TA if the RA procedure (or its contention resolution) is determined/considered as successfully completed. In one example, the UE may not update the N_TA if the RA procedure (or its contention resolution) is determined/considered as unsuccessfully completed. In one example, the UE may set the N_TA to the stored (temporary) N_TA if the SDT TA timer and/or the TA timer is running. In one example, the UE may set the N_TA value to the value before applying the received TA Command if the RA procedure (or its contention resolution) is considered as unsuccessfully completed when a CG-SDT procedure triggered is ongoing. In one example, the UE may set the N_TA to the stored (temporary) N_TA if the SDT TA timer and/or the TA timer is not running.

UE Behaviors on TA Timer/N_TA When Receiving TA Command MAC CE

Figure 8:
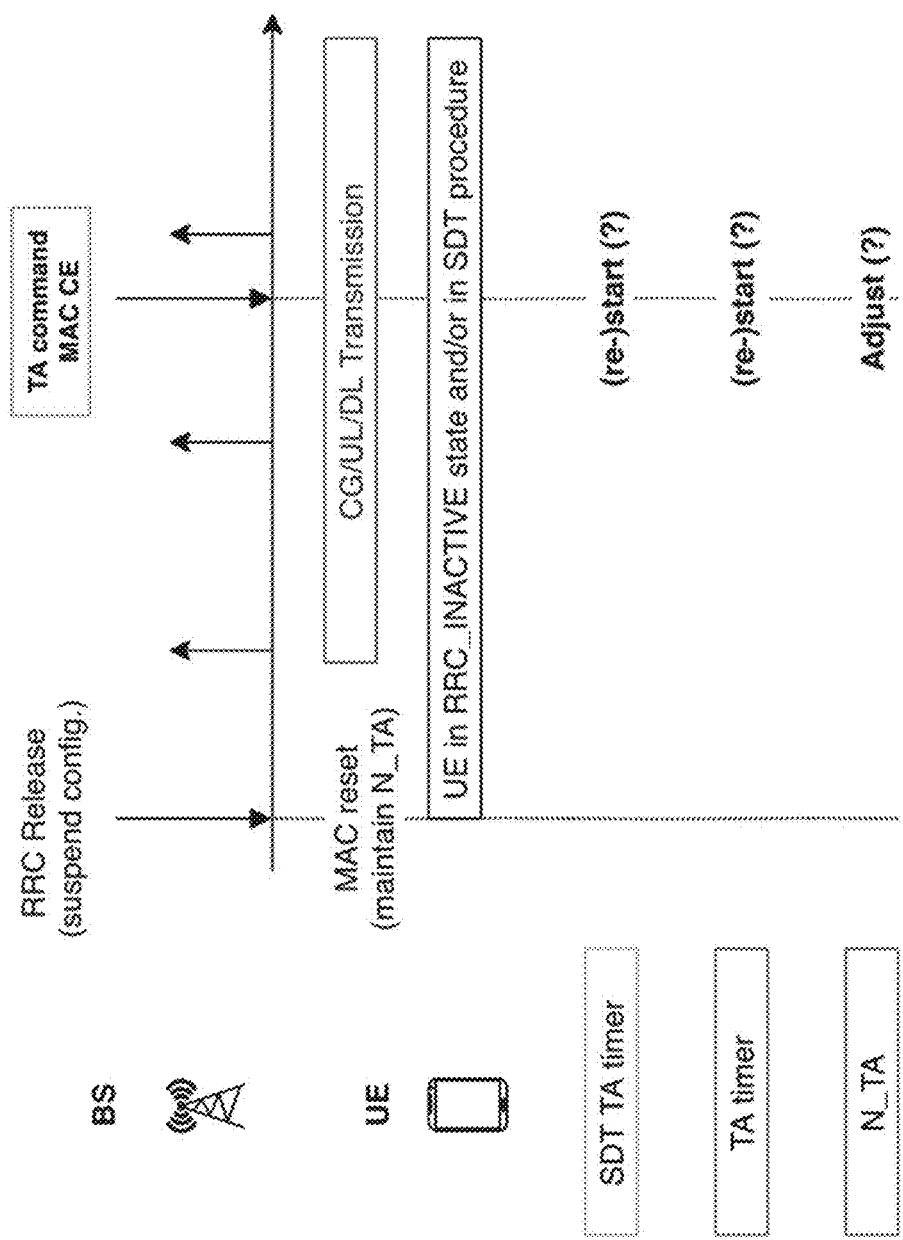
FIG. 8 illustrates a timing diagram of operations of a UE with a TA timer/N_TA upon receiving a TA command MAC CE, according to an example implementation of the present disclosure.

FIG. 8 illustrates a timing diagram of operations 80 of a UE with a TA timer/N_TA upon receiving a TA command MAC CE, according to an example implementation of the present disclosure. In some implementations, as shown in FIG. 8, the UE may be configured with an SDT TA timer and a TA timer. The UE may reset a MAC and enter into the RRC_INACTIVE state when receiving an RRC release message (including a suspend configuration) from a serving cell. When the UE resets the MAC entity, the UE may consider all TA timers as expired and may maintain an N_TA (for the serving cell and/or for a TAG).

In one example, the TAG may be a PTAG. In one example, the TAG may be an indicated TAG by an RRC release message. In one example, the TAG may be indicated by the SDT configuration, the RA configuration for the SDT, the CG configuration for the SDT, and/or the configuration for the SDT TA. In one example, the TAG may be a TAG that includes the serving cell. Specifically, the configuration of the serving cell may include a TAG-ID of the TAG. In one example, the N_TA may be specifically maintained for the SDT/RRC_INACTIVE state. Specifically, the UE may maintain two N_TAs, where one N_TA is for the SDT/RRC_INACTIVE state and the other N_TA is not for the SDT/RRC_INACTIVE state.

In some implementations, as shown in FIG. 8, the UE (e.g., an RRC layer) in the RRC_INACTIVE state may initiate an SDT procedure (e.g., the resume procedure for the SDT, the RA-SDT, and/or the CG-SDT) when one or more or all of the following scenarios/conditions/examples are fulfilled. In one example, the upper layers (e.g., an NAS layer) request resumption of an RRC connection. In one example, the UE supports the SDT. In one example, the SI (e.g., a SIB1 or other SI) includes an sdt-ConfigCommon. In one example, all the pending data in the UL is mapped to the RBs configured for the SDT.

In one example, lower layers (e.g., a MAC layer) indicate that conditions for initiating the SDT, as specified in 3GPP TS 38.321, are fulfilled. In one aspect, the lower layers/MAC layer may indicate conditions for initiating the SDT when the UE initiates the SDT with a CG type 1 on a selected UL carrier. In one aspect, the lower layers/MAC layer may indicate conditions for initiating the SDT when the UE initiates an RA procedure on a selected UL carrier for the SDT.

In some implementations, the SDT procedure may be initiated (by a MAC layer of the UE) when one or more or all of the following scenarios/conditions/examples are fulfilled. In one example, the SDT procedure may be initiated if the data volume of the pending UL data across all logical channels that are configured for the SDT is less than or equal to a data volume threshold (e.g., an sdt-DataVolume Threshold). In one example, the SDT procedure may be initiated if the RSRP of the DL pathloss reference is higher than an RSRP threshold (e.g., an sdt-RSRP-Threshold), if configured.

In some implementations, as shown in FIG. 8, the UE may receive a TA command MAC CE/Absolute TA command MAC CE, e.g., in an SDT procedure (e.g., the resume procedure for the SDT, the RA-SDT, and/or the CG-SDT), and/or, e.g., when the CG-SDT procedure and/or the RA-SDT procedure is ongoing.

In one example, the TA command MAC CE may include a TA command field that indicates the index value TA used to control an amount of TA, where the amount of TA is applied by the MAC entity based on the rules specified in 3GPP TS 38.213. The size of the TA command field may be 6 bits. In one example, the Absolute TA command MAC CE may include a TA command field that indicates the index value TA used to control an amount of TA, where the amount of TA is applied by the MAC entity based on the rules specified in TS 38.213. The size of the TA command field may be 12 bits.

SDT TA Timer/TA Timer

In some implementations, as shown in FIG. 8, when the UE receives a TA command MAC CE/Absolute TA command MAC CE from a serving cell, the UE may determine whether to (re-)start an SDT TA timer and/or (re-)start a TA timer based on whether the UE is performing an SDT procedure (e.g., the resume procedure for the SDT, the RA-SDT, and/or the CG-SDT).

In one example, when the UE receives a TA command MAC CE/Absolute TA command MAC CE, the UE may (re-)start the SDT TA timer and may (re-)start the TA timer if the UE is performing the SDT procedure.

In one example, when the UE receives a TA command MAC CE/Absolute TA command MAC CE, the UE may (re-)start the SDT TA timer and may not (re-)start the TA timer if the UE is performing the SDT procedure. In one example, when the UE receives a TA command MAC CE/Absolute TA command MAC CE in an SDT procedure, the UE may not (re-)start the SDT TA timer and may (re-)start the TA timer if the UE is performing the SDT procedure. In one example, when the UE receives a TA command MAC CE/Absolute TA command MAC CE in an SDT procedure, the UE may not (re-)start the SDT TA timer and may not (re-)start the TA timer if the UE is performing the SDT procedure. In one example, when the UE receives a TA command MAC CE/Absolute TA command MAC CE, the UE may not (re-)start the SDT TA timer and may (re-)start or may ignore the TA timer if the UE is performing the SDT procedure and if the UE is not configured with the SDT configuration, the RA configuration for the SDT, and/or the CG configuration for the SDT. Specifically, the TA timer may be used for the SDT procedure if the UE is not configured with the SDT configuration, the RA configuration for the SDT, and/or the CG configuration for the SDT.

In some implementations, as shown in FIG. 8, when the UE receives a TA command MAC CE/Absolute TA command MAC CE from a serving cell, the UE may determine whether to (re-)start an SDT TA timer and/or (re-)start a TA timer based on whether the UE is configured with an SDT configuration, an RA configuration for the SDT, and/or a CG configuration for the SDT.

In one example, when the UE receives a TA command MAC CE/Absolute TA command MAC CE, the UE may (re-)start the SDT TA timer and may (re-)start the TA timer if the UE is configured with the SDT configuration, the RA configuration for the SDT, and/or the CG configuration for the SDT. In one example, when the UE receives a TA command MAC CE/Absolute TA command MAC CE, the UE may (re-)start the SDT TA timer and may not (re-)start the TA timer if the UE is configured with the SDT configuration, the RA configuration for the SDT, and/or the CG configuration for the SDT. In one example, when the UE receives a TA command MAC CE/Absolute TA command MAC CE in an SDT procedure, the UE may not (re-)start the SDT TA timer and may (re-)start the TA timer if the UE is configured with the SDT configuration, the RA configuration for the SDT, and/or the CG configuration for the SDT. In one example, when the UE receives a TA command MAC CE/Absolute TA command MAC CE in an SDT procedure, the UE may not (re-)start the SDT TA timer and may not (re-)start the TA timer if the UE is configured with the SDT configuration, the RA configuration for the SDT, and/or the CG configuration for the SDT. In one example, when the UE receives a TA command MAC CE/Absolute TA command MAC CE, the UE may not (re-)start the SDT TA timer and may (re-)start or may ignore the TA timer if the UE is not configured with the SDT configuration, the RA configuration for the SDT, and/or the CG configuration for the SDT. Specifically, the TA timer may be used for the SDT procedure if the UE is not configured with the SDT configuration, the RA configuration for the SDT, and/or the CG configuration for the SDT.

In some implementations, as shown in FIG. 8, when the UE receives a TA command MAC CE/Absolute TA command MAC CE from a serving cell, the UE may determine whether to (re-)start an SDT TA timer and/or (re-)start a TA timer based on whether the UE is in the RRC_INACTIVE state. In one example, when the UE receives a TA command MAC CE/Absolute TA command MAC CE, the UE may (re-)start the SDT TA timer and may (re-)start the TA timer if the UE is in the RRC_INACTIVE state. In one example, when the UE receives a TA command MAC CE/Absolute TA command MAC CE, the UE may (re-)start the SDT TA timer and may not (re-)start the TA timer if the UE is in the RRC_INACTIVE state. In one example, when the UE receives a TA command MAC CE/Absolute TA command MAC CE in an SDT procedure, the UE may not (re-)start the SDT TA timer and may (re-)start the TA timer if the UE is in the RRC_INACTIVE state. In one example, when the UE receives a TA command MAC CE/Absolute TA command MAC CE in an SDT procedure, the UE may not (re-)start the SDT TA timer and may not (re-)start the TA timer if the UE is in the RRC_INACTIVE state.

In some implementations, when the UE receives a TA command MAC CE/Absolute TA command MAC CE in an SDT procedure from a serving cell, the UE may determine whether to (re-)start an SDT TA timer and/or (re-)start a TA timer based on one or more of the following scenarios/criteria.

In some implementations, as shown in FIG. 8, when the UE receives a PDCCH indicating a TA command MAC CE/Absolute TA command MAC CE in an SDT procedure from a serving cell, the UE may determine whether to (re-)start an SDT TA timer and/or (re-)start a TA timer based on the PDCCH addressed to which RNTI. In one example, when the UE receives a PDCCH indicating a TA command MAC CE/Absolute TA command MAC CE in an SDT procedure from a serving cell, the UE may (re-)start an SDT TA timer and may or may not (re-)start a TA timer if the PDCCH is addressed to an RNTI for the SDT.

In some implementations, as shown in FIG. 8, when the UE receives a PDCCH indicating a TA command MAC CE/Absolute TA command MAC CE in an SDT procedure from a serving cell, the UE may determine whether to (re-)start an SDT TA timer and/or (re-)start a TA timer based on the PDCCH monitored on an SS. In one example, when the UE receives a PDCCH indicating a TA command MAC CE/Absolute TA command MAC CE in an SDT procedure from a serving cell, the UE may (re-)start an SDT TAtimer and may or may not (re-)start a TAtimer if the PDCCH is monitored on an SS configured for the SDT.

In some implementations, as shown in FIG. 8, when the UE receives a TA command MAC CE/Absolute TA command MAC CE in an SDT procedure from a serving cell, the UE may determine whether to (re-)start an SDT TA timer and/or (re-)start a TA timer based on a specific indication in the TA command MAC CE/Absolute TA command MAC CE. Specifically, the specific indication may indicate whether the TA command is for the SDT or not. The specific indication may indicate whether the TA command is for the RRC_INACTIVE state or not.

In one example, when the UE receives a TA command MAC CE/Absolute TA command MAC CE in an SDT procedure from a serving cell, the UE may (re-)start the SDT TA timer and may (re-)start the TA timer if the UE receives the specific indication in the TA command MAC CE/Absolute TA command MAC CE. In one example, when the UE receives a TA command in a RAR or MSGB, the UE may (re-)start the SDT TA timer and may not (re-)start the TA timer if the UE receives the specific indication in the TA command MAC CE/Absolute TA command MAC CE. In one example, when the UE receives a TA command in a RAR or MSGB, the UE may not (re-)start the SDT TA timer and may (re-)start the TA timer if the TA command MAC CE/Absolute TA command MAC CE does not include the specific indication. In one example, when the UE receives a TA command in a RAR or MSGB, the UE may not (re-)start the SDT TA timer and may not (re-)start the TA timer if the TA command MAC CE/Absolute TA command MAC CE does not include the specific indication.

In some implementations, as shown in FIG. 8, when the UE receives a TA command MAC CE/Absolute TA command MAC CE in an SDT procedure from a serving cell, the UE may determine whether to (re-)start an SDT TA timer and/or (re-)start a TA timer based on whether the SDT TA timer and/or the TA timer is running. In one example, when the UE receives a TA command MAC CE/Absolute TA command MAC CE in an SDT procedure, the UE may (re-)start the SDT TA timer if the SDT TA timer is not running. In one example, when the UE receives a TA command MAC CE/Absolute TA command MAC CE in an SDT procedure, the UE may not (re-)start the SDT TA timer if the SDT TA timer is running. In one example, when the UE receives a TA command MAC CE/Absolute TA command MAC CE in an SDT procedure, the UE may (re-)start the TA timer if the TA timer is not running. In one example, when the UE receives a TA command in a RAR or MSGB, the UE may not (re-)start the TA timer if the TA timer is running.

In some implementations, the SDT TA timer and/or the TA timer may be associated with a TAG. In one example, the TAG may be a PTAG. In one example, the TAG may be an indicated TAG by an RRC release message. The TAG may be indicated by the SDT configuration, the RA configuration for the SDT, the CG configuration for the SDT, and/or the configuration for the SDT TA. In one example, the TAG may be a TAG that includes the serving cell. Specifically, the configuration of the serving cell may include a TAG-ID of the TAG.

Apply TA Command/Adjust N_TA

In some implementations, as shown in FIG. 8, when the UE receives a TA command MAC CE/Absolute TA command MAC CE from a serving cell, the UE may determine whether to apply the TA command and/or adjust the N_TA based on whether the UE is performing an SDT procedure (e.g., the resume procedure for the SDT, the RA-SDT, and/or the CG-SDT). In one example, when the UE receives a TA command MAC CE/Absolute TA command MAC CE in an SDT procedure, the UE may apply the TA command and/or may adjust the N_TA if the UE is performing the SDT procedure. In one example, when the UE receives a TA command in a RAR or MSGB, the UE may not apply the TA command and/or may not adjust the N_TA if the UE is performing the SDT procedure.

In some implementations, as shown in FIG. 8, when the UE receives a TA command MAC CE/Absolute TA command MAC CE from a serving cell, the UE may determine whether to apply the TA command and/or adjust the N_TA based on whether the UE is configured with an SDT configuration, an RA configuration for the SDT, and/or a CG configuration for the SDT (e.g., associated with the serving cell). In one example, when the UE receives a TA command MAC CE/Absolute TA command MAC CE, the UE may apply the TA command and/or may adjust the N_TA if the UE is configured with the SDT configuration, the RA configuration for the SDT, and/or the CG configuration for the SDT. In one example, when the UE receives a TA command MAC CE/Absolute TA command MAC CE, the UE may not apply the TA command and/or may not adjust the N_TA if the UE is configured with the SDT configuration, the RA configuration for the SDT, and/or the CG configuration for the SDT.

In some implementations, as shown in FIG. 8, when the UE receives a TA command MAC CE/Absolute TA command MAC CE from a serving cell, the UE may determine whether to apply the TA command and/or adjust the N_TA based on whether the UE is in the RRC_INACTIVE state. In one example, when the UE receives a TA command MAC CE/Absolute TA command MAC CE, the UE may apply the TA command and/or may adjust the N_TA if the UE is in the RRC_INACTIVE state. In one example, when the UE receives a TA command MAC CE/Absolute TA command MAC CE, the UE may not apply the TA command and/or may not adjust the N_TA if the UE is in the RRC_INACTIVE state.

In some implementations, when the UE receives a TA command in a RAR or MSGB during the RA procedure from a serving cell, the UE may determine whether to apply the TA command and/or adjust the N_TA based on one or more of the following scenarios/criteria/examples.

In some implementations, as shown in FIG. 8, when the UE receives a PDCCH indicating a TA command MAC CE/Absolute TA command MAC CE in an SDT procedure from a serving cell, the UE may determine whether to apply the TA command and/or adjust the N_TA based on the PDCCH addressed to which RNTI. In one example, when the UE receives a PDCCH indicating a TA command MAC CE/Absolute TA command MAC CE in an SDT procedure from a serving cell, the UE may apply the TA command and/or adjust the N_TA if the PDCCH is addressed to an RNTI for the SDT. In one example, when the UE receives a PDCCH indicating a TA command MAC CE/Absolute TA command MAC CE in an SDT procedure from a serving cell, the UE may not apply the TA command and/or may not adjust the N_TA if the PDCCH is addressed to an RNTI for the SDT.

In some implementations, as shown in FIG. 8, when the UE receives a PDCCH indicating a TA command MAC CE/Absolute TA command MAC CE in an SDT procedure from a serving cell, the UE may determine whether to apply the TA command and/or adjust the N_TA based on the PDCCH monitored on an SS. In one example, when the UE receives a PDCCH indicating a TA command MAC CE/Absolute TA command MAC CE in an SDT procedure from a serving cell, the UE may apply the TA command and/or adjust the N_TA if the PDCCH is monitored on an SS configured for the SDT. In one example, when the UE receives a PDCCH indicating a TA command MAC CE/Absolute TA command MAC CE in an SDT procedure from a serving cell, the UE may not apply the TA command and/or may not adjust the N_TA if the PDCCH is monitored on an SS configured for the SDT.

In some implementations, as shown in FIG. 8, when the UE receives a TA command MAC CE/Absolute TA command MAC CE in an SDT procedure from a serving cell, the UE may determine whether to apply the TA command and/or adjust the N_TA based on a specific indication in the TA command MAC CE/Absolute TA command MAC CE. Specifically, the specific indication may indicate whether the TA command is for the SDT or not. The specific indication may indicate whether the TA command is for the RRC_INACTIVE state or not. In one example, when the UE receives a TA command MAC CE/Absolute TA command MAC CE in an SDT procedure from a serving cell, the UE may apply the TA command and/or adjust the N_TA if the UE receives the specific indication in the TA command MAC CE/Absolute TA command MAC CE.

In some implementations, as shown in FIG. 8, when the UE receives a TA command MAC CE/Absolute TA command MAC CE in an SDT procedure from a serving cell, the UE may determine whether to apply the TA command and/or adjust the N_TA based on whether the SDT TA timer and/or the TA timer is running.

In one example, when the UE receives a TA command MAC CE/Absolute TA command MAC CE in an SDT procedure, the UE may apply the TA command and/or adjust the N_TA if the SDT TA timer is not running. In one example, when the UE receives a TA command MAC CE/Absolute TA command MAC CE in an SDT procedure, the UE may not apply the TA command and/or may not adjust the N_TA if the SDT TA timer is running. In one example, when the UE receives a TA command MAC CE/Absolute TA command MAC CE in an SDT procedure, the UE may apply the TA command and/or adjust the N_TA if the TA timer is not running. In one example, when the UE receives a TA command in a RAR or MSGB, the UE may not apply the TA command and/or may not adjust the N_TA if the TA timer is running.

In some implementations, the SDT TA timer and/or the TA timer may be associated with a TAG. In one example, the TAG may be a PTAG. In one example, the TAG may be an indicated TAG by an RRC release message. The TAG may be indicated by the SDT configuration, the RA configuration for the SDT, the CG configuration for the SDT, and/or the configuration for the SDT TA. In one example, the TAG may be a TAG that includes the serving cell. Specifically, the configuration of the serving cell may include a TAG-ID of the TAG.

Additional UE Behaviors on TA Timer/N_TA

Some implementations when the SDT TA timer expires are introduced in the following. In one example, the UE may discard/release an N_TA when the SDT TA timer expires. In one example, the UE may set an N_TA as 0 when the SDT TA timer expires.

In one example, the UE may maintain/store an N_TA when the SDT TA timer expires. In one aspect, the N_TA may be maintained for the SDT/RRC_INACTIVE state. Specifically, the UE may maintain two N_TAs, where one N_TA is for the SDT/RRC_INACTIVE state and the other N_TA is not for the SDT/RRC_INACTIVE state (e.g., the other N_TA may be used for the non-SDT procedure/RRC_INACTIVE state).

In one example, the UE may consider the TA timer (if running) expired when the SDT TA timer expires. In one example, the UE may consider the SDT TA timer (if running) expired when the TA timer expires.

Fallback

In some implementations, the UE may discard/release an N_TA when the UE performs a fallback mechanism (e.g., from an RA-SDT procedure to a non-SDT procedure and/or from a CG-SDT procedure to an RA-SDT procedure, and/or from a CG-SDT procedure to a non-SDT procedure).

In one example, the UE may discard/release an N_TA when the SDT procedure is terminated/considered as unsuccessful. In another example, the UE may discard/release an N_TA when the SDT procedure is considered as successful. In one example, the UE may discard/release an N_TA when the RA procedure (for the SDT) is stopped/terminated/considered as unsuccessful. In another example, the UE may discard/release an N_TA when the RA procedure (for the SDT) is considered as successful. In one example, the UE may discard/release an N_TA when the CG-SDT procedure is stopped/terminated/considered as unsuccessful. In another example, the UE may discard/release an N_TA when the CG-SDT procedure is considered as successful. In one example, the UE may discard/release an N_TA when the CG configuration is released/suspended/cleared. In one example, the UE may discard/release an N_TA when the CG configuration is considered as invalid, e.g., a TAT for the CG configuration expires and/or based on an RSRP change threshold.

In one example, the UE may discard/release an N_TA when the UE receives an indication from the NW. In one aspect, the indication may include an RRCResume, an RRCSetup, an RRCRelease, an RRCRelease with a SuspendConfig, an RRCReestablishment, and/or an RRCReject message, etc. The indication may be a PDCCH addressed to an RNTI (e.g., a C-RNTI, a CS-RNTI, a dedicated RNTI, an RNTI for the SDT, and/or an RNTI for the CG). The indication may indicate to the UE to terminate the SDT procedure and/or the subsequent transmission period, e.g., based on a field of the indication. The indication may indicate to the UE to initiate an RRC procedure (e.g., an RRC connection resume procedure, an RRC establishment procedure, and/or an RRC reestablishment procedure). The indication may indicate to the UE to switch/fallback the types for the SDT, e.g., the types may be the RA-based SDT, the CG-based SDT, the 2-step RA, the 4-step RA, etc.

In one example, the UE may discard/release an N_TA when the UE receives a response from the NW. In one aspect, the response may be a MSG2/MSG4/MSGB and/or a response for a UL transmission via the CG resource. In one aspect, the response may be used for a contention resolution, e.g., for an RA procedure. In one aspect, the response may include an ACK/NACK, e.g., for a UL transmission via the CG resource. In one aspect, the response may contain a UL grant/DL assignment for a new transmission/retransmission. The response may be a PDCCH addressed to an RNTI (e.g., a C-RNTI, a CS-RNTI, a dedicated RNTI, an RNTI for the SDT, and/or an RNTI for the CG). In one aspect, the response may indicate a UL grant for a new transmission for the HARQ process used for a UL transmission for small data (e.g., the UL message). In one aspect, the response may include a specific command, e.g., a TA command MAC CE. In one aspect, the response may be an RRCResume, an RRCSetup, an RRCRelease, an RRCRelease with a SuspendConfig, an RRCReestablishment, and/or an RRCReject message, etc.

In one example, the UE may discard/release an N_TA upon a cell selection or a re-selection. In one example, the UE may discard/release an N_TA upon abortion of a connection establishment by upper layers. In one example, the UE may discard/release an N_TA upon an RNA update. In one example, the UE may discard/release an N_TA when the UE changes the serving cell to another cell or when the UE camps on a new (suitable/acceptable) cell. Specifically, the timer/window may be stopped when/after the UE establishes/resumes an RRC connection from the RRC_INACTIVE state on a cell different from the cell where the CG configuration was provided. In one example, the UE may discard/release an N_TA when the UE initiates an RRC re-establishment procedure. Specifically, the timer/window may be stopped when the UE sends an RRCReestablishmentRequest to the NW. In one example, the UE may discard/release an N_TA when the UE is indicated, by the NW, to perform a carrier switching (e.g., from the NUL to the SUL or vice versa). In one example, the UE may discard/release an N_TA when the UE is indicated, by the NW, to perform a (UL/DL) BWP switching. In one example, the UE may discard/release an N_TA when the (CG and/or RA) configuration for SDT is reconfigured. The (CG and/or RA) configuration for the SDT may be reconfigured by the (suspendConfig of the) RRC Release message and/or broadcast SI (e.g., an SIB). The (CG and/or RA) configuration for the SDT may be reconfigured by the RRC reconfiguration message. The (CG and/or RA) configuration for the SDT may be reconfigured by an RRCResume, an RRCSetup, an RRCRelease, an RRCRelease with a suspendConfig and/or an RRCReject message.

In some implementations, the UE may stop an SDT TA timer/TA timer and/or consider the SDT TA timer/TA timer as expired when the UE performs a fallback mechanism (e.g., from an RA-SDT procedure to a non-SDT procedure and/or from a CG-SDT procedure to an RA-SDT procedure, and/or from a CG-SDT procedure to a non-SDT procedure).

In one example, the UE may stop an SDT TA timer/TA timer and/or consider the SDT TA timer/TA timer as expired when the SDT procedure is terminated or considered as unsuccessful. In one example, the UE may stop an SDT TA timer/TA timer and/or consider the SDT TA timer/TA timer as expired when the SDT procedure is considered as successful. In one example, the UE may stop an SDT TA timer/TA timer and/or consider the SDT TA timer/TA timer as expired when the RA procedure (for the SDT) is stopped/terminated or considered as unsuccessful. In one example, the UE may stop an SDT TA timer/TA timer and/or consider the SDT TA timer/TA timer as expired when the RA procedure (for the SDT) is considered as successful. In one example, the UE may stop an SDT TA timer/TA timer and/or consider the SDT TA timer/TA timer as expired when the CG-SDT procedure is stopped/terminated or considered as unsuccessful. In one example, the UE may stop an SDT TA timer/TA timer and/or consider the SDT TA timer/TA timer as expired when the CG-SDT procedure is considered as successful. In one example, the UE may stop an SDT TA timer/TA timer and/or consider the SDT TA timer/TA timer as expired when the CG configuration is released/suspended/cleared. In one example, the UE may stop an SDT TA timer/TA timer and/or consider the SDT TA timer/TA timer as expired when the CG configuration is considered as invalid, e.g., a TAT for the CG configuration expires and/or based on an RSRP change threshold.

In one example, the UE may stop an SDT TA timer/TA timer and/or consider the SDT TA timer/TA timer as expired when the UE receives an indication from the NW. In one aspect, the indication may include an RRCResume, an RRCSetup, an RRCRelease, an RRCRelease with a SuspendConfig, an RRCReestablishment, and/or an RRCReject message, etc. The indication may be a PDCCH addressed to an RNTI (e.g., a C-RNTI, a CS-RNTI, a dedicated RNTI, an RNTI for the SDT, and/or an RNTI for the CG). The indication may indicate to the UE to terminate the SDT procedure and/or the subsequent transmission period, e.g., based on a field of the indication. The indication may indicate to the UE to initiate an RRC procedure (e.g., an RRC connection resume procedure, an RRC establishment procedure, and/or an RRC reestablishment procedure). The indication may indicate to the UE to switch/fallback the types for the SDT. Specifically, the types may be an RA-based SDT, a CG-based SDT, a 2-step RA, and a 4-step RA, etc.

In one example, the UE may stop an SDT TA timer/TA timer and/or consider the SDT TA timer/TA timer as expired when the UE receives a response from the NW. In one aspect, the response may be a MSG2/MSG4/MSGB and/or a response for a UL transmission via the CG resource. In one aspect, the response may be used for a contention resolution, e.g., for an RA procedure. In one aspect, the response may include an ACK/NACK, e.g., for a UL transmission via the CG resource. In one aspect, the response may contain a UL grant/DL assignment for a new transmission/retransmission. The response may be a PDCCH addressed to an RNTI (e.g., a C-RNTI, a CS-RNTI, a dedicated RNTI, an RNTI for the SDT, and/or an RNTI for the CG). In one aspect, the response may indicate a UL grant for a new transmission for the HARQ process used for the transmission of a UL transmission for small data (e.g., the UL message). In one aspect, the response may include a specific command, e.g., a TA command MAC CE. In one aspect, the response may be an RRCResume, an RRCSetup, an RRCRelease, an RRCRelease with a SuspendConfig, an RRCReestablishment, and/or an RRCReject message, etc.

In one example, the UE may stop an SDT TA timer/TA timer and/or consider the SDT TA timer/TA timer as expired upon a cell selection or re-selection. In one example, the UE may stop an SDT TA timer/TA timer and/or consider the SDT TA timer/TA timer as expired upon abortion of a connection establishment by upper layers. In one example, the UE may stop an SDT TAtimer/TA timer and/or consider the SDT TA timer/TA timer as expired upon an RNA update. In one example, the UE may stop an SDT TA timer/TA timer and/or consider the SDT TA timer/TA timer as expired when the UE changes the serving cell to another cell or when the UE camps on a new (suitable/acceptable) cell. Specifically, the timer/window may be stopped when/after the UE establishes/resumes an RRC connection from the RRC_INACTIVE state on a cell that is different from the cell where the CG configuration was provided. In one example, the UE may stop an SDT TA timer/TA timer and/or consider the SDT TA timer/TA timer as expired when the UE initiates an RRC re-establishment procedure. Specifically, the timer/window may be stopped when the UE sends an RRCReestablishmentRequest to the NW. In one example, the UE may stop an SDT TA timer/TA timer and/or consider the SDT TAtimer/TAtimer as expired when the UE is indicated, by the NW, to perform a carrier switching (e.g., from the NUL to the SUL or vice versa). In one example, the UE may stop an SDT TA timer/TA timer and/or consider the SDT TA timer/TA timer as expired when the UE is indicated, by the NW, to perform a (UL/DL) BWP switching. In one example, the UE may stop an SDT TA timer/TA timer and/or consider the SDT TA timer/TA timer as expired when the (CG and/or RA) configuration for the SDT is reconfigured. The (CG and/or RA) configuration for SDT may be reconfigured by the (suspendConfig of the) RRC Release message and/or broadcast SI (e.g., an SIB). The (CG and/or RA) configuration for the SDT may be reconfigured by the RRC reconfiguration message. The (CG and/or RA) configuration for the SDT may be reconfigured by an RRCResume, an RRCSetup, an RRCRelease, an RRCRelease with a suspendConfig and/or an RRCReject message.

TA Command

TA Command in RAR

MAC Payload for RAR

Figure 9:
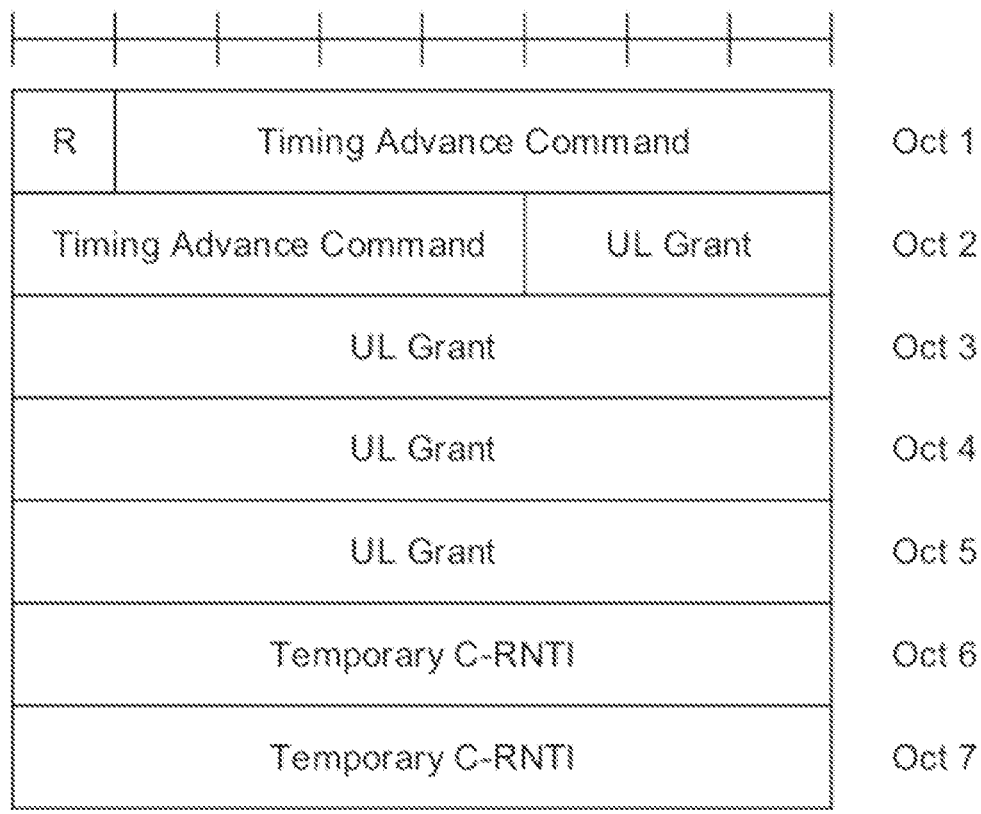
FIG. 9 illustrates a format of a MAC RAR, according to an example implementation of the present disclosure.

FIG. 9 illustrates a format of a MAC RAR 90, according to an example implementation of the present disclosure. In some implementations, as shown in FIG. 9, the MAC RAR 90 has a fixed size and includes the following fields:

R: Reserved bit, set to "0";

TA Command: This field indicates the index value TA used to control an amount of TA that is applied to the MAC entity, as specified in 3GPP TS 38.213. The size of the TA Command field is 12 bits; UL Grant: This field indicates the resources to be used on the UL, as specified in 3GPP TS 38.213. The size of the UL Grant field is 27 bits;

Temporary C-RNTI: This field indicates the temporary identity that is used by the MAC entity during the RA. The size of the Temporary C-RNTI field is 16 bits.

MAC Payload for MSGB (e.g., fallbackRAR and/or successRAR)

FIG. 10 illustrates a format of a fallbackRAR 100, according to an example implementation of the present disclosure. In some implementations, as shown in FIG. 10, the fallbackRAR 100 has a fixed size and includes the following fields:

R: Reserved bit, set to "0";

TA Command: This field indicates the index value TA used to control an amount of TA that is applied to the MAC entity, as specified in 3GPP TS 38.213. The size of the TA Command field is 12 bits;

UL Grant: This field indicates the resources to be used on the UL, as specified in 3GPP TS 38.213. The size of the UL Grant field is 27 bits;

Temporary C-RNTI: This field indicates the temporary identity that is used by the MAC entity during the RA. The size of the Temporary C-RNTI field is 16 bits.

FIG. 11 illustrates a format of a successRAR 110, according to an example implementation of the present disclosure. In some implementations, as shown in FIG. 11, the successRAR 110 has a fixed size and includes the following fields:

UE Contention Resolution Identity: This field includes the UL CCCH SDU. If the UL CCCH SDU is longer than 48 bits, this field includes the first 48 bits of the UL CCCH SDU.

R: Reserved bit, set to "0";

ChannelAccess-CPext: The channel access type and CP extension for the PUCCH resource includes the HARQ feedback for the MSGB in shared spectrum channel access, as specified in 3GPP TS 38.213. This field is only present when the MSGB HARQ feedback is to be transmitted with shared spectrum channel access, as specified in 3GPP TS 37.213. Alternatively, the field is not present and R bits are present instead. The size of the ChannelAccess-Cpext field is 2 bits;

TPC: The TPC command for the PUCCH resource includes the HARQ feedback for the MSGB, as specified in 3GPP TS 38.213. The size of the TPC field is 2 bits;

HARQ Feedback Timing Indicator: The PDSCH-to-HARQ feedback timing indicator field is for the MSGB HARQ feedback, as specified in 3GPP TS 38.213. The size of the HARQ Feedback Timing Indicator field is 3 bits;

PUCCH Resource Indicator: The PUCCH resource indicator is for the HARQ feedback for the MSGB, as specified in 3GPP TS 38.213. The size of the PUCCH resource Indicator field is 4 bits;

TA Command: This field indicates the index value TA used to control an amount of TA that is applied to the MAC entity, as specified in 3GPP TS 38.213. The size of the Timing Advance Command field is 12 bits;

C-RNTI: The C-RNTI field indicates the identity that is used by the MAC entity upon completion of the RA. The size of the C-RNTI field is 16 bits.

TA Command MAC CE

Figure 12:
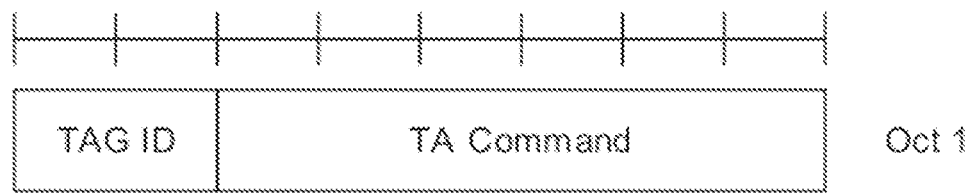
FIG. 12 illustrates a format of a TA Command MAC CE, according to an example implementation of the present disclosure.

FIG. 12 illustrates a format of a TA Command MAC CE 120, according to an example implementation of the present disclosure. In some implementations, as shown in FIG. 12, the TA Command MAC CE 120 may be identified by a MAC subheader with an LCID, as specified in Table 6.2.1-1 of 3GPP TS 38.321, and has a fixed size with the following:

TAG ID: This field indicates the TAG Identity of the addressed TAG. The TAG including the SpCell has the TAG Identity 0. The length of the field is 2 bits;

TA Command: This field indicates the index value TA (0, 1, 2 . . . 63) used to control an amount of TA that is applied to the MAC entity, as specified in 3GPP TS 38.213. The length of the field is 6 bits.

Absolute TA Command MAC CE

Figure 13:
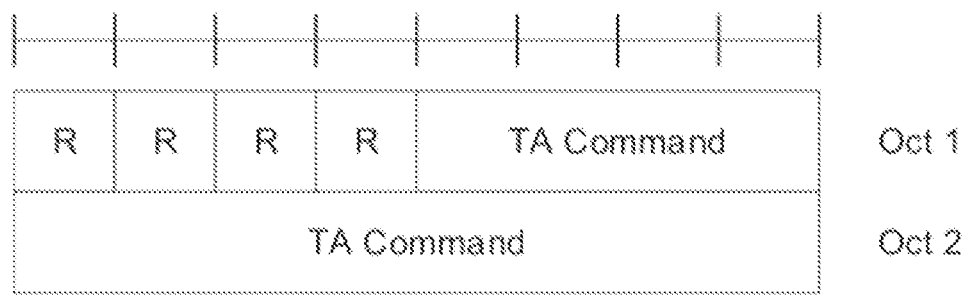
FIG. 13 illustrates a format of an Absolute TA Command MAC CE, according to an example implementation of the present disclosure.

FIG. 13 illustrates a format of an Absolute TA Command MAC CE 130, according to an example implementation of the present disclosure. In some implementations, as shown in FIG. 13, the Absolute Timing Advance Command MAC CE 130 is identified by a MAC subheader with an extended LCID (eLCID), as specified in Table 6.2.1-1b of 3GPP TS 38.321, and has a fixed size with the following:

TA Command: This field indicates the index value TA used to control an amount of TA that is applied to the MAC entity, as specified in 3GPP TS 38.213. The size of the field is 12 bits;

R: Reserved bit, set to "0".

UE Behaviors on the SDT TA Timer and/or TA Timer

In some implementations, some operations/explanations/descriptions of any one of the above timers are introduced with more details.

(Re-)Start the Timer

In one example, the SDT TA timer and/or TA timer may be (re-)started when the UE receives an RRC release message (with a suspend configuration.) The RRC release message may include a configuration(s) for the SDT. In one example, the SDT TA timer and/or TA timer may be (re-)started when the SDT procedure is initiated. In one example, the SDT TA timer and/or TA timer may be (re-)started when the RA procedure is initiated. In one example, the SDT TA timer and/or TA timer (for one or multiple or all CG configuration(s)) may be (re-)started when a CG configuration (that corresponds to the timer) is initialized. In one example, the SDT TA timer and/or TA timer may be (re-)started when the subsequent transmission period is started.

In one example, the SDT TA timer and/or TA timer may be (re-)started when the UE transmits or retransmits a UL message. In one aspect, the UL message may be transmitted via the MSG1/MSG3/MSGA/CG resource/a UL resource scheduled by the MSG2/MSGB/MSG4 (during the SDT procedure). In one aspect, the UL message may include an RRC resume request message (e.g., an RRCResumeRequest or an RRCResumeRequest1). In one aspect, the UL message may include small data (e.g., UL data associated with a specific SRB/DRB/LCH for the SDT). In one aspect, the UL message may include a MAC CE (e.g., a BSR MAC CE). In one aspect, if the UL message is (re-)transmitted based on a CG resource/configuration, the timer that corresponds to the CG configuration may be (re-)started. In one aspect, if the UL message is transmitted on a UL resource scheduled by a dynamic grant, and the dynamic grant used for retransmission of a HARQ process was used for transmitting a UL data via a CG resource, the timer that corresponds to the CG configuration may be (re-)started.

In one example, the SDT TA timer and/or TA timer may be (re-)started when the UE receives a response from the NW. In one aspect, the response may be the MSG2/MSG4/MSGB and/or a response for a UL transmission via the CG resource. In one aspect, the response may be used for a contention resolution, e.g., for an RA procedure. In one aspect, the response may include an ACK/NACK, e.g., for a UL transmission via the CG resource. Specifically, the timer that corresponds to the CG configuration of the CG resource may be (re-)started. In one aspect, the response may include a UL grant/DL assignment for a new transmission/retransmission. The response may be a PDCCH addressed to an RNTI (e.g., a C-RNTI, a CS-RNTI, a dedicated RNTI, an RNTI for the SDT, and/or an RNTI for the CG). Specifically, if the UL grant/DL assignment is used for indicating a retransmission of a HARQ process that was used for transmitting UL data via the CG resource, the timer that corresponds to the CG configuration may be (re-)started. In one aspect, the response may indicate a UL grant for a new transmission for the HARQ process that is used for a UL transmission for small data (e.g., the UL message). In one aspect, the response may include a specific command, e.g., a TA command MAC CE. In one aspect, the response may be an RRCResume, an RRCSetup, an RRCRelease, an RRCRelease with a SuspendConfig, an RRCReestablishment, and/or an RRCReject message, etc.

In one example, the SDT TA timer and/or TA timer may be (re-)started when the UE receives a PDCCH, e.g., addressed to an RNTI (e.g., a C-RNTI, a CS-RNTI, a dedicated RNTI, an RNTI for the SDT, and/or an RNTI for the CG). The timer/window may be (re-)started when the UE receives a DL assignment, e.g., on a PDCCH and/or a DL message/data, e.g., on a PDSCH.

In one example, the SDT TA timer and/or TA timer may be (re-)started when another timer (e.g., a HARQ RTT timer) expires. The other timer may indicate a minimum duration before a DL assignment and/or UL HARQ retransmission grant is expected by the UE/MAC entity.

In one example, the SDT TA timer and/or TA timer may be delayed to be (re-)started after a configured offset. The configured offset may indicate a minimum duration before a DL assignment and/or a UL HARQ retransmission grant is expected by the UE/MAC entity. The configured offset may also be configured per CG configuration.

Stop the Timer

In one example, the SDT TA timer and/or TA timer may be stopped when the SDT procedure is terminated.

In one example, the SDT TA timer and/or TA timer may be stopped when the RA procedure is stopped/aborted.

In one example, the SDT TA timer and/or TA timer (for one or multiple or all CG configuration(s)) may be stopped when the corresponding CG configuration is released/suspended/cleared.

In one example, the SDT TA timer and/or TA timer (for one or multiple or all CG configuration(s)) may be stopped when the corresponding CG configuration is considered as invalid, e.g., a TAT for the CG configuration expires.

In one example, the SDT TA timer and/or TA timer may be stopped when the UE receives an indication from the NW. In one aspect, the indication may be an RRCResume, an RRCSetup, an RRCRelease, an RRCRelease with a SuspendConfig, an RRCReestablishment, and/or an RRCReject message, etc. The indication may be a PDCCH addressed to an RNTI (e.g., a C-RNTI, a CS-RNTI, a dedicated RNTI, an RNTI for the SDT, and/or an RNTI for the CG). The indication may indicate to the UE to terminate the SDT procedure and/or the subsequent transmission period, e.g., based on a field of the indication. The indication may indicate to the UE to initiate an RRC procedure (e.g., an RRC connection resume procedure, an RRC establishment procedure, and/or an RRC reestablishment procedure). The indication may indicate to the UE to switch/fallback the types for the SDT, e.g., the types may be an RA-based SDT, a CG-based SDT, a 2-step RA, a 4-step RA, etc.

In one example, the SDT TA timer and/or TA timer may be stopped when the UE receives a response from the NW. In one aspect, the response may be the MSG2/MSG4/MSGB and/or a response for a UL transmission via the CG resource. In one aspect, the response may be used for a contention resolution, e.g., for an RA procedure. In one aspect, the response may include an ACK/NACK, e.g., for a UL transmission via the CG resource. In one aspect, the response may include a UL grant/DL assignment for a new transmission/retransmission. The response may be a PDCCH addressed to an RNTI (e.g., a C-RNTI, a CS-RNTI, a dedicated RNTI, an RNTI for the SDT, and/or an RNTI for the CG). In one aspect, the response may indicate a UL grant for a new transmission for the HARQ process that is used for the transmission of a UL transmission for small data (e.g., the UL message). In one aspect, the response may include a specific command, e.g., a TA command MAC CE. In one aspect, the response may be an RRCResume, an RRCSetup, an RRCRelease, an RRCRelease with a SuspendConfig, an RRCReestablishment, and/or an RRCReject message, etc.

In one example, the SDT TA timer and/or TA timer may be stopped upon a cell selection or re-selection. In one example, the SDT TA timer and/or TA timer may be stopped upon the UE moving to another RAT (e.g., E-UTRA). In one example, the SDT TA timer and/or TA timer may be stopped upon abortion of a connection establishment by upper layers. In one example, the SDT TA timer and/or TA timer may be stopped upon an RNA update. In one example, the SDT TA timer and/or TA timer may be stopped when the UE changes the serving cell to another cell or when the UE camps on a new (suitable/acceptable) cell. Specifically, the timer may be stopped when/after the UE establishes/resumes an RRC connection from the RRC_INACTIVE state on a cell that is different from the cell where the CG configuration was provided. In one example, the SDT TA timer and/or TA timer may be stopped when the UE initiates an RRC re-establishment procedure. Specifically, the timer may be stopped when the UE sends an RRCReestablishmentRequest to the NW. In one example, the SDT TA timer and/or TA timer may be stopped when the UE is indicated, by the NW, to perform a carrier switching (e.g., from the NUL to the SUL or vice versa). In one example, the SDT TA timer and/or TA timer may be stopped when the UE is indicated, by the NW, to perform a (UL/DL) BWP switching.

Upon Expiry of the Timer

In one example, upon expiry of the SDT TA timer and/or TA timer, the UE may enter the RRC_IDLE state. In one example, upon expiry of the SDT TA timer and/or TA timer, the UE may stay in the RRC_INACTIVE state. In one example, upon expiry of the SDT TA timer and/or TA timer, the UE may initiate an RRC establishment procedure, e.g., via an RRCSetupRequest. In one example, upon expiry of the SDT TA timer and/or TA timer, the UE may initiate an RRC reestablishment procedure, e.g., via an RRCRestablishmentRequest. In one example, upon expiry of the SDT TA timer and/or TA timer, the UE may initiate an RRC connection resume procedure, e.g., via an RRCResumeRequest. In one example, upon expiry of the SDT TA timer and/or TA timer, the UE may release/suspend a CG configuration (to which the timer corresponds). In one example, upon expiry of the SDT TA timer and/or TA timer, the UE may perform retransmission based on a CG resource/configuration (to which the timer corresponds).

Assumptions for SDT

In some implementations, some assumptions for the SDT are introduced in the following with more details. In one example, the SDT may be supported as a baseline for the RA-based SDT and the CG-based SDT schemes. In one example, stored "configuration" in the UE Context may be used for the RLC bearer configuration. In one example, the 2-step RACH or the 4-step RACH may be applied to the RA-based SDT in the RRC_INACTIVE state. In one example, the UL small data may be sent in an MSGA of the 2-step RACH and/or an MSG3 of the 4-step RACH. In one example, the SDT may be configured by the NW on a per-RB (e.g., one SRB/DRB) basis. In one example, data volume threshold may be used for the UE to decide whether to perform/select the SDT procedure (e.g., initiating the SDT procedure, initiating the RA procedure for the SDT, and/or initiating the SDT procedure with the CG) or perform/select the non-SDT procedure (e.g., initiating the RA procedure for a CCCH logical channel). In one example, UL/DL transmission following the UL SDT without transitioning to the RRC_CONNECTED state (e.g., from the RRC_INACTIVE state) may be applied. In one example, when the UE is in the RRC_INACTIVE state, the UE may send/receive one or multiple UL and DL packets as part of the same SDT procedure without transitioning to the RRC_CONNECTED state (e.g., the UE may remain in the RRC_INACTIVE state).

In one example, when the UE receives an RRC release message (with a suspend configuration), the UE may perform at least one of the following: the MAC entity may be reset, and default RB configuration may be released; the RLC entities for the SRB1 may be re-established; and the SRBs and DRBs may be suspended except for the SRB0;

In one example, upon initiating the SDT procedure (e.g., for the first transmission of small data), the UE may re-establish at least the PDCP entities (for the SDT) and/or resume the RBs (for the SDT).

In one example, the first UL message of the SDT (e.g., the MSG3 for the 4-step RACH, the MSGA for the 2-step RACH and/or the CG transmission) may include the following (which may depend on the size of the message):

CCCH message

In one example, the LCP may be used to determine the priority of the content that may include at least one of the following:

data from one or more RBs that are configured by the NW for the SDT;

MAC CEs (e.g., a BSR, a PHR, etc.); and padding bits.

In one example, the CCCH message may contain a ResumeMAC-I that is generated using the stored security key for an RRC integrity protection. In one example, for the CG-based SDT, the configuration of the CG resource for a UL SDT may be contained in the RRCRelease message. In one example, for CG-based SDT, a TA timer (e.g., a cg-SDT-TimeAlignmentTimer) for the TA maintenance specified for the CG-based SDT in the RRC_INACTIVE state may be applied. The TA timer may be configured together with the CG configuration in the RRCRelease message. In one example, for CG-based SDT, the configuration of the CG resource for the SDT may be valid only in the same serving cell (e.g., the configuration of the CG resource for the SDT may be invalid if the UE camps on another cell).

In one example, for CG-based SDT, the UE may use the CG-based SDT if at least one of the following criteria is fulfilled:

(1) user data is smaller than the data volume threshold;

(2) the CG resource is configured and valid; and (3) the UE has the valid TA.

In one example, for the CG-based SDT, an association between the CG resources and the SSBs may be required for the CG-based SDT. In one example, for the CG-based SDT, an SS-RSRP threshold may be configured for the SSB selection. The UE may select one of the SSB with an SS-RSRP above the threshold and select the associated CG resource for the UL data transmission. In one example, for the CG-based SDT, the CG-SDT resource configuration may be provided to the UE(s) in the RRC_CONNECTED state by the RRCRelease message. In one example, for the CG-based SDT, the CG resources (e.g., PUSCH resources) may be separately configured for the NUL and the SUL. In one example, for the CG-based SDT, an RRCRelease message may be used to reconfigure or release the CG-SDT configuration/resources while the UE is in the RRC_INACTIVE state. In one example, for the CG-based SDT, the subsequent data transmission may use the CG resource or the DG (e.g., dynamic grant addressed to UE's C-RNTI/CS-RNTI). The C-RNTI/CS-RNTI may be the same as the previous C-RNTI/CS-RNTI or may be configured explicitly by the NW. In one example, for the CG-based SDT, a TA timer (e.g., a cg-SDT-TimeAlignmentTimer) may be started upon receiving the TA configuration from the BS, e.g., via an RRCRelease message, and may be (re)started upon reception of the TA command. In one example, for the CG-based SDT, the UE may release the CG configuration/resources when the TAT expires in the RRC_INACTIVE state.

In one example, for the RA-based SDT, up to two preamble groups (corresponding to two different payload sizes for the MSGA/MSG3) may be configured by the NW. In one example, for the RA-based SDT, upon successful completion of the contention resolution, the UE may monitor the C-RNTI. In one example, for the RA-based SDT, the RACH resource (e.g., a combination of the RO and a preamble) may be different between the SDT (e.g., the RA for the SDT) and the non-SDT (e.g., the RA for the CCCH or the RA for the RRC connection resume).

In one example, for the RA-based SDT, the RRCRelease message may be sent at the end to terminate the SDT procedure (e.g., based on the perspective of the RRC). Specifically, the RRCRelease sent at the end of the SDT may contain the CG resource.

In one example, an RSRP threshold (e.g., an sdt-RSRP-Threshold) may be used to select between the SDT (e.g., initiating the SDT procedure, initiating the RA procedure for SDT, and/or initiating the SDT procedure with the CG) and non-SDT procedure (e.g., initiating the RA procedure for the CCCH logical channel).

In one example, for the SDT, the UE may perform the UL carrier selection (e.g., the UL selection and the SUL selection).

In one example, if the CG-SDT resources are configured on the selected UL carrier and are valid, the CG-based SDT may be selected to perform. Otherwise, if the 2-step RA resources (for the SDT) are configured on the UL carrier and criteria to select the 2-step RA (for the SDT) is met, the 2-step RA type (for the SDT) may be chosen;

else If the 4-step RA resources (for the SDT) are configured on the UL carrier and criteria to select the 4-step RA (for the SDT) is met, the 4-step RA type may be chosen;

else the UE does not perform the SDT procedure (e.g., the UE may perform the RRC connection resume procedure);

if both the 2-step RA (for the SDT) and the 4-step RA resources (for the SDT) are configured on the UL carrier, the RA type selection (e.g., the 2-step RA type selection and the 4-step RA type selection) may be performed based on an RSRP threshold (e.g., an sdt-MSGA-RSRP-Threshold).

In one example, except for the DRB, the SRB1 and the SRB2 may be configured for the SDT, e.g., for carrying the RRC message(s) and/or the NAS message(s). Upon initiating the SDT procedure and/or the RRC Resume procedure for the SDT initiation (e.g., for the first SDT transmission), the UE may resume the SRB (e.g., the SRB1, the SRB2, and/or the SRB3) that is configured for the SDT, e.g., in addition to the DRBs that are configured for the SDT.

In one example, a specific SS may be supported for monitoring the PDCCH addressed to the C-RNTI after a successful completion of the RACH procedure during the RA-SDT.

In one example, an RSRP threshold (e.g., an sdt-RSRP-Threshold) may be used to select between the SDT and the non-SDT procedure, if configured (an RSRP refers to the same RSRP measured for the carrier selection). In one example, an RSRP threshold (e.g., an sdt-RSRP-Threshold) to select between the SDT and the non-SDT procedure may be used for both the CG-SDT and the RA-SDT. In one example, an RSRP threshold (e.g., an sdt-RSRP-Threshold) to select between the SDT and the non-SDT procedure may be the same for both the CG-SDT and the RA-SDT.

In one example, an RSRP threshold for the carrier selection (e.g., an sdt-RSRP-ThresholdSSB-SUL) may be specific to the SDT (e.g., separately configured for the SDT). Specifically, this may be optional for the NW. In one example, an RSRP threshold for the RA type selection (an sdt-MSGA-RSRP-Threshold) may be specific to the SDT (e.g. separately configured for the SDT).

In one example, a data volume threshold (e.g., an sdt-DataVolumeThreshold) may be the same for the CG-SDT and the RA-SDT.

In one example, switching/fallback from the SDT procedure to the non-SDT procedure (e.g., an RRC connection resume procedure) may be applied based on some criteria. In one example, switching/fallback from the CG-SDT to the RA-SDT may be applied based on some criteria.

In one example, the UE may switch from the SDT procedure to the non-SDT procedure (e.g., an RRC connection resume procedure) in the following cases:

in one aspect, the UE may receive an indication from the NW to switch to the non-SDT procedure. For example, the NW may send an RRCResume; and may send an indication in a RAR/fallbackRAR/DCI to switch to the non-SDT procedure; and/or in one aspect, an initial UL transmission (in the MSGA/MSG3/CG resources) fails to reach a configured number of times.

In one example, the UE may perform a PDCP re-establishment implicitly, e.g., without an explicit indication for the PDCP re-establishment, when the UE initiates the SDT procedure.

In one example, an SR resource (e.g., a PUCCH resource for the SR) may not be configured for the SDT. When the BSR is triggered by SDT data, the UE may trigger the RA because the SR resource is not available.

In one example, an SDT failure detection timer may be started upon an initiation of the SDT procedure. In one example, upon an SDT failure detection timer expiry, the UE may transition to an RRC_IDLE state and/or attempts to initiate an RRC connection setup.

In one example, CG resources for the SDT may be configured at the same time on the NUL and the SUL. In one example, the UE may start a timer after a UL transmission, e.g., for the CG-SDT. In one example, CG resources for the SDT may be configured on BWPs other than the initial BWP. In one example, CG resources per CG configuration may be associated with a set of SSB(s) configured by an explicit signaling.

In one example, the specific SS may be a CSS to the UEs performing the RA-SDT. In one example, a USS may be configured for UEs performing the CG-SDT.

In one example, the UE may monitor paging after the UE initiates the SDT for SI change and/or PWS.

In one example, for the CG-based SDT, the SSB-to-PUSCH resource mapping within the CG configuration may be implicitly defined. In one aspect, the ordering of the SSB and the CG PUSCH resources may be captured, as specified in 3GPP RAN1 specifications (e.g., TS 38.213). In one aspect, a PUSCH resource may refer to a transmission occasion and a DMRS resource used for a PUSCH transmission.

In one example, the SSB subset for an RSRP-based TA validation may be determined at least based on a configured absolute RSRP threshold. The SSB subset may be at least one of the following:

within a set of SSBs that are configured per CG configuration;

within a set of SSBs that are configured for all CG configurations;

within a set of all SSBs that are actually transmitted as indicated in an SIB1; and highest N SSBs that are measured to derive the subset for one UE across all CG configurations.

RA Procedure

In some implementations, two types of RA procedure may be supported, e.g., the 4-step RA type with the MSG1 and the 2-step RA type with the MSGA. Both types of RA procedure may support the CBRA and the CFRA.

In some implementations, the UE may select the type of RA at an initiation of the RA procedure based on the NW's configuration. More details are introduced in the following.

In one example, when CFRA resources are not configured, an RSRP threshold may be used by the UE to select between the 2-step RA type and the 4-step RA type. In one example, when CFRA resources for the 4-step RA type are configured, the UE may perform the RA with the 4-step RA type. In one example, when CFRA resources for the 2-step RA type are configured, the UE may perform the RA with the 2-step RA type.

In some implementations, the NW may not configure CFRA resources for the 4-step RA type and the 2-step RA type at the same time for a BWP. The CFRA with the 2-step RA type is only supported for such handover.

In some implementations, the MSG1 of the 4-step RA type includes a preamble on a PRACH. After transmitting the MSG1, the UE may monitor for a response from the NW within a configured window. For the CFRA, a dedicated preamble for the MSG1 transmission is assigned by the NW and upon receiving a RAR from the NW, the UE may end the RA procedure. For the CBRA, upon reception of the RAR, the UE may send the MSG3 using the UL grant scheduled in the response and monitor contention resolution. If the contention resolution is not successful after MSG3 (re)transmission(s), the UE may switch to the MSG1 transmission.

In some implementations, the MSGA of the 2-step RA type includes a preamble on a PRACH and a payload on a PUSCH. After transmitting the MSGA, the UE may monitor for a response from the NW within a configured window. For the CFRA, a dedicated preamble and a PUSCH resource are configured for the MSGA transmission and upon receiving the NW's response, the UE may end the RA procedure. For the CBRA, if the contention resolution is successful upon receiving the NW's response, the UE may end the RA procedure; alternatively, if a fallback indication is received in the MSGB, the UE may perform the MSG3 transmission using the UL grant scheduled in the fallback indication and monitor the contention resolution. If the contention resolution is not successful after MSG3 (re)transmission(s), the UE may switch to the MSGA transmission.

In some implementations, if the RA procedure with the 2-step RA type is not completed after a number of the MSGA transmissions, the UE may be configured to switch to the CBRA with the 4-step RA type.

CG

In some implementations, with configured grants, the BS can allocate UL resources for the initial HARQ transmissions to UEs. Two types of configured UL grants are defined in the following: with a type 1 (e.g., a CG type 1), an RRC directly provides the configured UL grant (including the periodicity);

with a type 2 (e.g., a CG type 2), RRC defines the periodicity of the configured UL grant while a PDCCH addressed to a CS-RNTI may either signal and activate the configured UL grant, or deactivate it. Specifically, a PDCCH addressed to a CS-RNTI indicates that the UL grant may be implicitly reused according to the periodicity defined by the RRC until the CG is deactivated.

In some implementations, the NW and/or the RRC may configure the following parameters when the CG Type 1 is configured:

cs-RNTI: A CS-RNTI for retransmission;
periodicity: A periodicity of the configured grant Type 1;
timeDomainOffset: An offset of a resource with respect to SFN=0 in time domain;
timeDomainAllocation: Allocation of configured UL grant in time domain which includes a
startSymbolAndLength (e.g., SLIV in 3GPP TS 38.214);
nrofHARQ-Processes: a number of HARQ processes for configured grant.

In some implementations, upon configuration of a CG Type 1 for a serving cell by upper layers, the UE (or the MAC entity) may perform at least one of the following actions/operations:

store the UL grant provided by upper layers as a configured UL grant (for the indicated serving cell); and
initialize or re-initialize the configured UL grant to start in the symbol according to the timeDomainOffset and 'S' (as derived from the SLIV that is specified in 3GPP TS 38.214), and to reoccur with the periodicity.

RRC Connection Resume Procedure

In some implementations, the purpose of the RRC connection resume procedure may be to resume a suspended RRC connection, including resuming SRB(s) and DRB(s) or performing an RNA update.

In some implementations, the UE may initiate the RRC connection resume procedure when upper layers or AS (when responding to RAN paging, upon triggering RNA updates while the UE is in the RRC_INACTIVE state) request the resume of a suspended RRC connection.

In some implementations, the suspension of the RRC connection may be initiated by the NW. When the RRC connection is suspended, the UE may store the UE Inactive AS context and any configuration received from the NW and transition to the RRC_INACTIVE state. The RRC message to suspend the RRC connection may be integrally protected and ciphered.

In some implementations, the resumption of a suspended RRC connection may be initiated by upper layers when the UE needs to transition from the RRC_INACTIVE state to the RRC_CONNECTED state or by the RRC layer to perform a RNA update or by the RAN paging from the Next-Generation Radio Access Network (NG-RAN). When the RRC connection is resumed, the NW may configure the UE according to the RRC connection resume procedure based on the stored UE Inactive AS context and any RRC configuration received from the NW. The RRC connection resume procedure re-activates AS security and re-establishes SRB(s) and DRB(s).

In some implementations, in response to a request to resume the RRC connection, the NW may resume the suspended RRC connection and have the UE transition to the RRC_CONNECTED state or reject the request to resume and have the UE transition to the RRC_INACTIVE state (with a wait timer), or directly re-suspend the RRC connection and have the UE transition to the RRC_INACTIVE state, or directly release the RRC connection and have the UE transition to the RRC_IDLE state, or instruct the UE to initiate a NAS level recovery (in a case that the NW sends an RRC setup message). More details of the RRC connection resume procedure may be found in 3GPP TS 38.331 V16.4.1.

Figure 14:
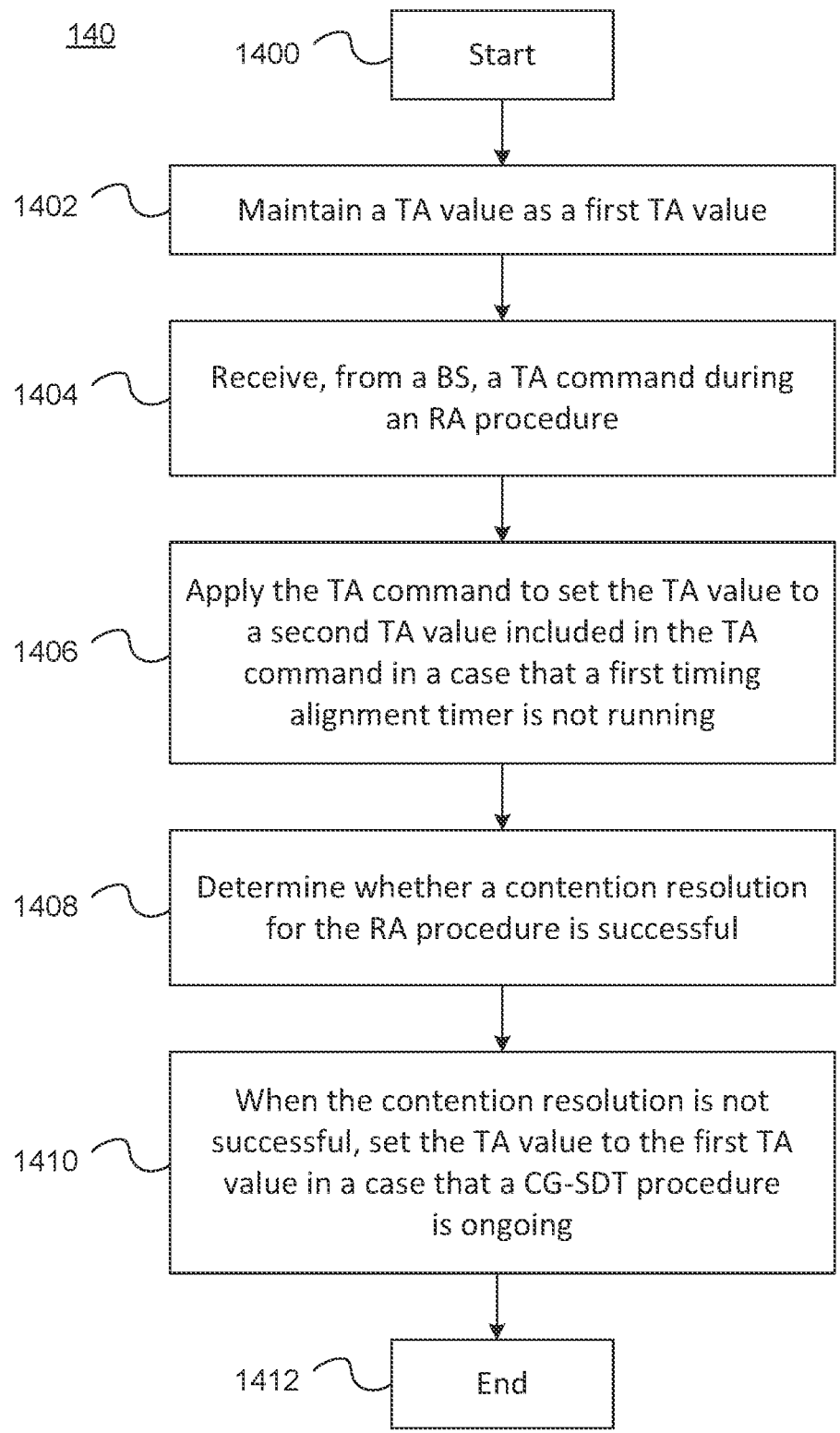
FIG. 14 illustrates a flowchart of a procedure performed by a UE for timing alignment, according to an example implementation of the present disclosure.

FIG. 14 illustrates a flowchart of a procedure 140 performed by a UE for timing alignment, according to an example implementation of the present disclosure. In some implementations, actions the procedure 140 are illustrated as separate actions represented as independent blocks. In some other implementations, these separate actions may not be construed as necessarily order dependent, where any two or more actions may also be performed and/or combined with each other or be integrated with other alternate methods, which is not limiting the scope of the implementation. Moreover, in some other implementations, one or more of the actions may be adaptively omitted.

As shown in FIG. 14, the procedure 140 for the UE includes the following actions:

Action 1400: Start.

Action 1402: Maintain a TA value as a first TA value.

Action 1404: Receive, from a BS, a TA command during an RA procedure.

Action 1406: Apply the TA command to set the TA value to a second TA value included in the TA command in a case that a first timing alignment timer is not running.

Action 1408: Determine whether a contention resolution for the RA procedure is successful.

Action 1410: When the contention resolution is not successful, set the TA value to the first TA value in a case that a CG-SDT procedure is ongoing.

Action 1412: End.

In some implementations, in action 1402, the UE may maintain the TA value as the first TA value. In action 1404, the UE may receive the TA command from the BS during the RA procedure. In one example, the TA command is received in a RAR. In one example, the TA command is received in a MSGB. In action 1406, the UE may apply the TA command to set the TA value to the second TA value that is included in the TA command in a case that the timing alignment timer is not running. In action 1408, the UE may determine whether the contention resolution for the RA procedure is successful. In action 1410, the UE may, when the contention resolution is not successful, set the TA value to the first TA value in a case that the CG-SDT procedure is ongoing.

In some implementations, the procedure 140 may further configure the UE to, when the contention resolution is successful, start or restart a CG-SDT timing alignment timer in a case that the CG-SDT procedure is ongoing. Specifically, the CG-SDT timing alignment timer may be configured by an RRC release message.

In some implementations, the procedure 140 may further configure the UE to, when the contention resolution is successful, stop the timing alignment timer in a case that the CG-SDT procedure is ongoing. In some implementations, the procedure 140 may further configure the UE to start the timing alignment timer in a case that the timing alignment timer is not running. In some implementations, the procedure 140 may further configure the UE to maintain the TA value when a CG-SDT timing alignment timer expires.

In some implementations, the procedure 140 may further configure the UE to receive, from the BS, a TA command MAC CE, and to, in a case that the CG-SDT procedure is ongoing, start or restart a CG-SDT timing alignment timer in response to receiving the TA command MAC CE. In some implementations, the procedure 140 may further configure the UE to, in a case that the CG-SDT procedure is ongoing, start or restart the timing alignment timer in response to receiving the TA command MAC CE.

Figure 15:
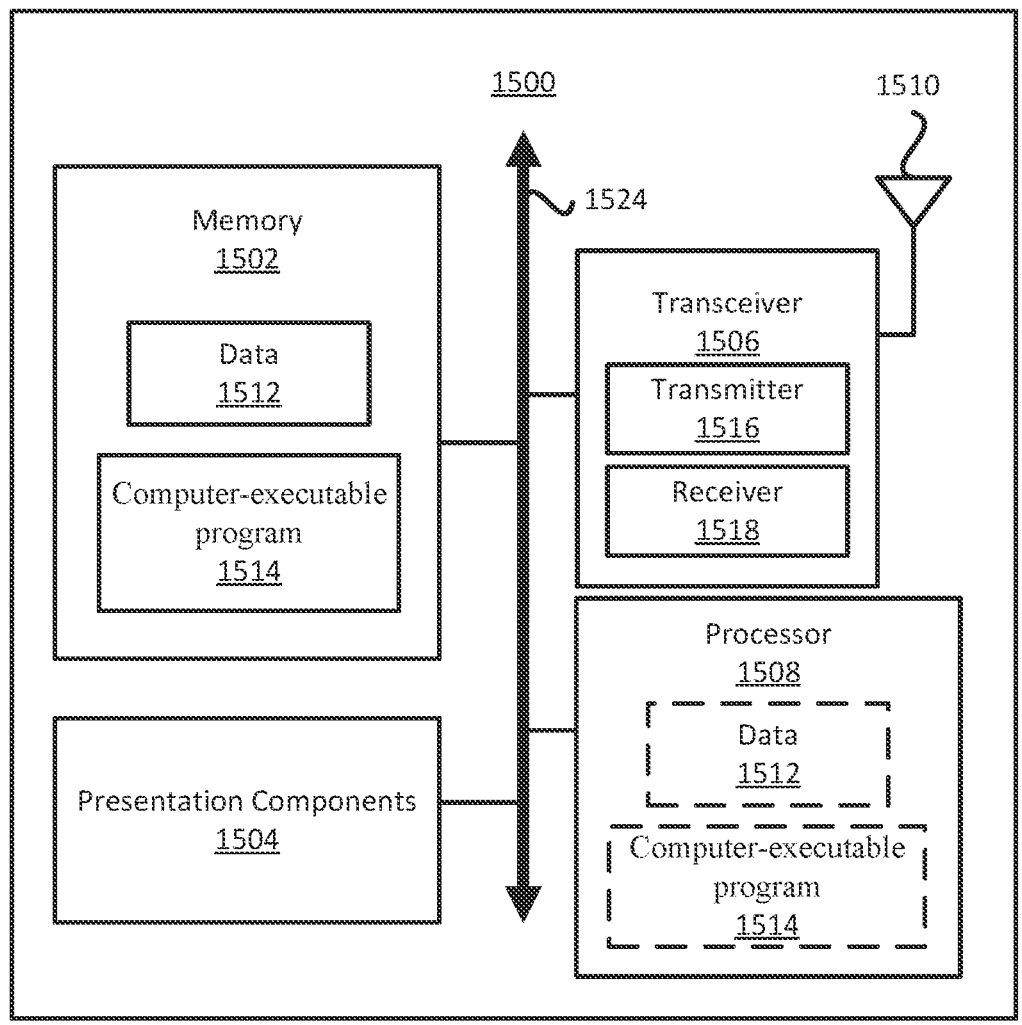
FIG. 15 is a block diagram illustrating a node for wireless communication, according to an implementation of the present disclosure.

Please refer to FIG. 15, which illustrates a block diagram of a node 1500 for wireless communication according to an implementation of the present disclosure. As illustrated in FIG. 15, the node 1500 includes a transceiver 1506, a processor 1508, a memory 1502, one or more presentation components 1504, and at least one antenna 1510. The node 1500 may also include a Radio Frequency (RF) spectrum band module, a BS communications module, an NW communications module, and a system communications management module, input/output (I/O) ports, I/O components, and power supply (not explicitly illustrated in FIG. 15). Each of these components may be in communication with each other, directly or indirectly, over one or more buses 1524. The node 1500 may be a UE, an NW, a cell/BS or any operating entity in the wireless communication system that performs various functions disclosed herein, for example, with reference to FIG. 14.

The transceiver 1506 includes a transmitter 1516 (e.g., transmitting/transmission circuitry) and a receiver 1518 (e.g., receiving/reception circuitry) and may be configured to transmit and/or receive time and/or frequency resource partitioning information. The transceiver 1506 may be configured to transmit in different types of subframes and slots, including, but not limited to, usable, non-usable and flexibly usable subframes and slot formats. The transceiver 1506 may be configured to receive data and control channels.

The node 1500 may include a variety of computer-readable media. Computer-readable media may be any available media that may be accessed by the node 1500 and include both volatile (and non-volatile) media and removable (and non-removable) media. By way of example, and not limitation, computer-readable media may include computer storage media and communication media. Computer storage media may include both volatile (and non-volatile) and removable (and non-removable) media implemented according to any method or technology for storage of information such as computer-readable.

Computer storage media includes RAM, ROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media does not include a propagated data signal. Communication media may typically embody computer-readable instructions, data structures, program modules, or other data in a modulated data signal such as a carrier wave or other transport mechanism and include any information delivery media.

The term "modulated data signal" may refer to a signal that has one or more of its characteristics set or changed in such a manner as to encode information in the signal. By way of example, and not limitation, communication media may include wired media, such as a wired NW or direct-wired connection, and wireless media, such as acoustic, RF, infrared, and other wireless media. Combinations of any of the previous disclosure should also be included within the scope of computer-readable media.

The memory 1502 may include computer-storage media in the form of volatile and/or non-volatile memory. The memory 1502 may be removable, non-removable, or a combination thereof. For example, the memory 1502 may include solid-state memory, hard drives, optical-disc drives, etc.

As illustrated in FIG. 15, the memory 1502 may store a computer-executable (or readable) program 1514 (e.g., software codes or instructions) that are configured to, when executed, cause the processor 1508 to perform various functions disclosed herein, for example, with reference to FIG. 14. Alternatively, the computer-executable program 1514 may not be directly executable by the processor 1508 but may be configured to cause the node 1500 (e.g., when compiled and executed) to perform various functions disclosed herein.

The processor 1508 (e.g., having processing circuitry) may include an intelligent hardware device, a CPU, a microcontroller, an ASIC, etc. The processor 1508 may include memory. The processor 1508 may process the data 1512 and the computer-executable program 1514 received from the memory 1502, and information received via the transceiver 1506, the baseband communications module, and/or the NW communications module. The processor 1508 may also process information to be sent to the transceiver 1506 for transmission through the antenna 1510 to the NW communications module for subsequent transmission to a CN.

One or more presentation components 1504 may present data to a person or other device. Examples of presentation components 1504 may include a display device, speaker, printing component, vibrating component, etc.

From the present disclosure, it is manifested that various techniques may be used for implementing the disclosed concepts without departing from the scope of those concepts. Moreover, while the concepts have been disclosed with specific reference to certain implementations, a person of ordinary skill in the art would recognize that changes may be made in form and detail without departing from the scope of those concepts. As such, the disclosed implementations are to be considered in all respects as illustrative and not restrictive. It should also be understood that the present disclosure is not limited to the particular disclosed implementations. Many rearrangements, modifications, and substitutions are possible without departing from the scope of the present disclosure.

What is claimed is:

1. A method performed by a User Equipment (UE) for timing alignment, the method comprising:
    maintaining a Timing Advance (TA) value as a first TA value;
    receiving, from a Base Station (BS), a TA command during a Random Access (RA) procedure;
    applying the TA command to set the TA value to a second TA value included in the TA command in a case that a first timing alignment timer is not running;
    determining whether a contention resolution for the RA procedure is successful; and
    when the contention resolution is not successful, setting the TA value to the first TA value in a case that a Configured Grant-based Small Data Transmission (CG-SDT) procedure is ongoing.

2. The method of claim 1, further comprising:
    when the contention resolution is successful, starting or restarting a CG-SDT timing alignment timer in a case that the CG-SDT procedure is ongoing.

3. The method of claim 2, wherein the CG-SDT timing alignment timer is configured by a Radio Resource Control (RRC) release message.

4. The method of claim 1, further comprising:
    when the contention resolution is successful, stopping the first timing alignment timer in a case that the CG-SDT procedure is ongoing.

5. The method of claim 1, further comprising:
    starting the first timing alignment timer in a case that the first timing alignment timer is not running.

6. The method of claim 1, wherein the TA command is received in a Random Access Response (RAR).

7. The method of claim 1, wherein the TA command is received in a Message B (MSGB).

8. The method of claim 1, further comprising:
    maintaining the TA value when a CG-SDT timing alignment timer expires.

9. The method of claim 1, further comprising:
    receiving, from the BS, a TA command Medium Access Control (MAC) Control Element (CE); and
    in a case that the CG-SDT procedure is ongoing, starting or restarting a CG-SDT timing alignment timer in response to receiving the TA command MAC CE.

10. The method of claim 9, further comprising:
    in a case that the CG-SDT procedure is ongoing, further starting or restarting the first timing alignment timer in response to receiving the TA command MAC CE.

11. A User Equipment (UE) in a wireless communication system for timing alignment, the UE comprising:
    at least one processor; and
    at least one non-transitory computer-readable medium coupled to the at least one processor and storing one or more computer-executable instructions that, when executed by the at least one processor, cause the UE to:
        maintain a Timing Advance (TA) value as a first TA value;
        receive, from a Base Station (BS), a TA command during a Random Access (RA) procedure;
        apply the TA command to set the TA value to a second TA value included in the TA command in a case that a first timing alignment timer is not running;
        determine whether a contention resolution for the RA procedure is successful; and
        when the contention resolution is not successful, set the TA value to the first TA value in a case that a Configured Grant-based Small Data Transmission (CG-SDT) procedure is ongoing.

12. The UE of claim 11, wherein the one or more computer-executable instructions, when executed by the at least one processor, further cause the UE to:
    when the contention resolution is successful, start or restart a CG-SDT timing alignment timer in a case that the CG-SDT procedure is ongoing.

13. The UE of claim 12, wherein the CG-SDT timing alignment timer is configured by a Radio Resource Control (RRC) release message.

14. The UE of claim 11, wherein the one or more computer-executable instructions, when executed by the at least one processor, further cause the UE to:
    when the contention resolution is successful, stop the first timing alignment timer in a case that the CG-SDT procedure is ongoing.

15. The UE of claim 11, wherein the one or more computer-executable instructions, when executed by the at least one processor, further cause the UE to:
    start the first timing alignment timer in a case that the first timing alignment timer is not running.

16. The UE of claim 11, wherein the TA command is received in a Random Access Response (RAR).

17. The UE of claim 11, wherein the TA command is received in a Message B (MSGB).

18. The UE of claim 11, wherein the one or more computer-executable instructions, when executed by the at least one processor, further cause the UE to:
    maintain the TA value when a CG-SDT timing alignment timer expires.

19. The UE of claim 11, wherein the one or more computer-executable instructions, when executed by the at least one processor, further cause the UE to:
    receive, from the BS, a TA command Medium Access Control (MAC) Control Element (CE); and in a case that the CG-SDT procedure is ongoing, start or restart a CG-SDT timing alignment timer in response to receiving the TA command MAC CE.

20. The UE of claim 19, wherein the one or more computer-executable instructions, when executed by the at least one processor, further cause the UE to:
in a case that the CG-SDT procedure is ongoing, further start or restart the first timing alignment timer in response to receiving the TA command MAC CE.

* * * * *